(12) United States Patent
Zhao et al.

(10) Patent No.: US 11,044,494 B2
(45) Date of Patent: Jun. 22, 2021

(54) METHOD, APPARATUS AND MEDIUM FOR DECODING OR ENCODING

(71) Applicant: TENCENT AMERICA LLC, Palo Alto, CA (US)

(72) Inventors: Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/869,122

(22) Filed: May 7, 2020

(65) Prior Publication Data

US 2020/0267413 A1    Aug. 20, 2020

Related U.S. Application Data

(63) Continuation of application No. 16/225,982, filed on Dec. 19, 2018, now Pat. No. 10,687,081.

(60) Provisional application No. 62/692,658, filed on Jun. 29, 2018.

(51) Int. Cl.
| | |
|---|---|
| *H04N 19/61* | (2014.01) |
| *H04N 19/122* | (2014.01) |
| *H04N 19/147* | (2014.01) |
| *H04N 19/597* | (2014.01) |
| *H04N 19/176* | (2014.01) |

(Continued)

(52) U.S. Cl.
CPC .......... *H04N 19/61* (2014.11); *H04N 19/105* (2014.11); *H04N 19/122* (2014.11); *H04N 19/147* (2014.11); *H04N 19/159* (2014.11); *H04N 19/176* (2014.11); *H04N 19/597* (2014.11)

(58) Field of Classification Search
CPC .. H04N 19/147; H04N 19/176; H04N 19/122; H04N 19/597; H04N 19/61; H04N 19/105; H04N 19/159
See application file for complete search history.

(56) References Cited

U.S. PATENT DOCUMENTS

| | | |
|---|---|---|
| 9,081,733 B2 | 7/2015 | Reznik et al. |
| 2012/0082212 A1 | 4/2012 | Sadafale et al. |
| 2013/0003856 A1 | 1/2013 | Saxena et al. |

(Continued)

OTHER PUBLICATIONS

Fuldseth, et al., "Transform design for HEVC with 16 bit intermediate data representation", Joint Collaborative Team on Video Coding (JCT-VC) of ITU-T SG16 WP3 and ISO/IEC JTC1/SC29/WG11, Cisco Systems, Texas Instruments Inc., Mar. 2011 (16 pages).

(Continued)

*Primary Examiner* — Neil R Mikeska
(74) *Attorney, Agent, or Firm* — Sughrue Mion, PLLC

(57) ABSTRACT

A method of utilizing an 8-bit primary transform core matrix to decode compressed video or image data or encode uncompressed video or image data. The method may include determining whether to use a first transform core matrix that is of a first size type or a second transform core matrix that is of a second size type that is smaller than the first size type. When a result of the determination is to use the first transform core matrix, encoding or decoding the target file using the 8-bit primary transform core matrix that has the size that is 64-point or larger. If not, the method may include extracting the second transform core matrix of the second size type from the first transform matrix and encoding or decoding the target file using the extracted second transform core matrix.

20 Claims, 7 Drawing Sheets

(51) Int. Cl.
*H04N 19/105* (2014.01)
*H04N 19/159* (2014.01)

(56) References Cited

U.S. PATENT DOCUMENTS

| | | |
|---|---|---|
| 2016/0021369 A1 | 1/2016 | Hampali |
| 2016/0219290 A1 | 7/2016 | Zhao et al. |
| 2016/0353113 A1 | 12/2016 | Zhang et al. |
| 2017/0094314 A1 | 3/2017 | Zhao et al. |
| 2018/0020218 A1 | 1/2018 | Zhao et al. |
| 2018/0098081 A1 | 4/2018 | Zhao et al. |
| 2018/0205946 A1 | 7/2018 | Zhang et al. |
| 2018/0205949 A1 | 7/2018 | Hsiang |
| 2018/0262777 A1 | 9/2018 | Filippov et al. |
| 2018/0288439 A1 | 10/2018 | Hsu et al. |
| 2018/0332289 A1 | 11/2018 | Huang |
| 2018/0359483 A1 | 12/2018 | Chen et al. |
| 2019/0075293 A1 | 3/2019 | Lim et al. |

OTHER PUBLICATIONS

Jianle Chen, "International Organization for Standardization Organisation Internationale De Normalisation ISO/IEC JTC1/SC29/WG11 Coding of Moving Pictures and Audio", JVET, JVET-J1002-v2, Apr. 2018, San Diego, CA, 10 pages.

A. Fuldseth et al., "Transform design for HEVC with 16 bit intermediate data representation", Joint Collaborative Team on Video Coding (JCT-VC) of ITU-T SG16 WP3 and ISO/IEC JTC1/SC29/WG11, 5th Meeting, Mar. 2011, Geneva, CH, 15 pages.

FIG. 4    Encoder 203

Computer System 700

{}# METHOD, APPARATUS AND MEDIUM FOR DECODING OR ENCODING

PRIORITY INFORMATION

This is a continuation of U.S. application Ser. No. 16/225,982, filed Dec. 19, 2018, which claims priority from U.S. Provisional Application No. 62/692,658, filed on Jun. 29, 2018, in the United States Patent & Trademark Office, the disclosures of which are incorporated herein by reference in their entireties.

BACKGROUND

Field

This disclosure is directed towards video compression technologies. In particular, the present disclosure is directed towards next-generation video coding technologies including video coding/decoding technologies beyond High Efficiency Video Coding (HEVC), such as Versatile Video Coding (VVC). More specifically, an aspect of the disclosure is directed towards a VVC primary transform method, device and computer medium that use a large, 8-bit transform core having a size that is equal to or greater than 64×64.

Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 hertz (Hz). Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A person of ordinary skill generally understands video compression/decompression technology. In general, to compress video or image data, a series of functional steps are performed to result in a compressed video or image file. Although an image, such as a 360° image (e.g., captured by a 360° camera) may be suitable for compression, for ease of reading, compression of a video file will be explained. To generate a compressed video file, under conventional standards (e.g., H.264, H.265) an uncompressed video sample stream that is received from a video source may be partitioned or parsed, which results in a block of samples of two or more reference pictures.

Bi-Prediction can relate to techniques where a prediction unit (PU), such as a predicted block of samples, can be predicted from two motion compensated blocks of samples of two or more reference pictures. Bi-prediction was first introduced into video coding standards in MPEG-1, and has also been included in other video coding technologies and standards such as MPEG-2 Part 2 (or H.262), H.264 and H.265 as well.

When decompressing a compressed video file, during the reconstruction of a sample of a bi-predicted PU, motion compensated and interpolated input samples from each reference block can be multiplied by a weighting factor that can be different for each reference block, and such weighted sample values of the two reference blocks can be added to generate the sample under reconstruction. Such sample can be processed further by mechanisms such as loop filtering.

In MPEG-1 and MPEG-2, the weighting factors can be determined based on the relative temporal distance between the picture to which the PU under reconstruction belongs to, and the two reference pictures. This is possible because, in MPEG-1 and MPEG-2, one of the two reference I or P pictures was in the "past", and the other in the "future" (in terms of presentation order) of the B-picture under reconstruction, and because in MPEG-1 and MPEG-2, there was a well-defined timing relationship established for any picture under reconstruction in relation to its reference pictures.

Starting with H.264, the reference picture selection concepts for bi-predicted pictures were relaxed such that the reference pictures only needed to be earlier in decoding order, but not in presentation order. Further, the notion of time was also relaxed in that neither H.264 nor H.265 require a constrained/fixed picture interval in the time domain. Therefore, a decoder cannot calculate weighting factors any more based on the timing information available in the bitstream. Instead, H.264 and H.265 include a "default" of 0.5 as the weighting factor for the reference samples of a bi-predicted picture. This default can be overwritten by a syntax available in the slice header known as pred_weight_table( ). The default of 0.5 or the information in the pred_weight_table may apply to all bi-predicted PUs in a given slice.

Non-Patent Literature 1 shows the H.265/HEVC standard. However, a need for standardization of future video coding technology with a compression capability that significantly exceeds that of the HEVC standard (including its extensions) has been studied by the inventors.

Non-Patent Literature 2 discloses a recently launched standardization format for next-generation video coding beyond HEVC called Versatile Video Coding (VVC) with a version VTM (VVC Test Model). VVC may generally provide a large (e.g., 64-point or higher) transform core using a 10-bit integer matrix.

LISTING OF RELATED ART

Non-Patent Literature 1: "Transform design for HEVC with 16 bit intermediate data representation"; published by: Joint Collaborative Team on Video Coding (JCT-VC) of ITU-T SG16 WP3 and ISO/IEC JTC1/SC29/WG11, 5th Meeting: Geneva, CH, Mar. 16-23, 2011 (Document:

JCTVC-E243). The H.265/HEVC (High Efficiency Video Coding) standard may include Version 1 (2013), Version 2 (2014), Version 3 (2015) and Version 4 (2016) published by ITU-T VCEG (Q6/16) ISO/IEC MPEG (JTC 1/SC 29/WG 11).

Non-Patent Literature 2: "Algorithm description for Versatile Video Coding and Test Model 1 (VTM 1)"; published by Joint Video Experts Team (WET) of ITU-T SG 16 WP 3 and ISO/IEC JTC 1/SC 29/WG 11, 10th Meeting: San Diego, US, Apr. 10-20, 2018 (Document: WET-J1002-v2).

Problem(s) to be Solved

However, a need exists for an 8-bit, large (e.g., 64-point or higher) core in the VVC to reduce complexity, reduce memory for storing transform cores and/or reduce input bit-width of multiplier/add/sub operations. In general, the 2-, 4-, 8-, 16- and 32-point DCT-2 transform core, which are 8-bit, cannot be extracted from, for example, a 64-point DCT-2 transform core, which is 10-bit in conventional VVC, thus inevitably increasing the cost of applying primary transform because a separate 64-point transform core would need extra storage and logic for implementation. Comparing to 10-bit primary transform cores, the 8-bit primary transform core reduces the complexity because of the reduced memory for storing transform cores and reduced input bit-width of multiplier/add/sub operations.

SUMMARY

According to an aspect of the disclosure, a method of utilizing an 8-bit primary transform core matrix to decode compressed video or image data or encode uncompressed video or image data may include: receiving information regarding a target file for encoding or decoding, the target file for encoding or decoding being one of: a compressed video or image data file or an uncompressed video or image data file, and determining, for the encoding or decoding of the target file, whether to use a first transform core matrix that is of a first size type or a second transform core matrix that is of a second size type that is smaller than the first size type, wherein the first size type is the 8-bit primary transform core matrix, which has the core matrix that is represented by 8-bits and that has a size that is 64-point or larger. The method according to the aspect of the disclosure may further include: when a result of the determination is to use the first transform core matrix of the first size type, causing or transmitting information that causes the target file for encoding or decoding to be encoded or decoded using the 8-bit primary transform core matrix that has the size that is 64-point or larger, and when a result of the determination is to use the second transform core matrix of the second size type that is smaller than the first size type: extracting the second transform core matrix of the second size type from the 8-bit primary transform core matrix that is 64-point or larger and causing or transmitting information that causes the target file for encoding or decoding to be encoded or decoded using the extracted second transform core matrix of the second type.

According to an aspect of the disclosure, an apparatus for utilizing an 8-bit primary transform core matrix to decode compressed video or image data or encode uncompressed video or image data may include: at least one memory configured to store computer program code, and at least one processor configured to access the at least one memory and operate according to the computer program code. The computer program code may comprise first applying code, second applying code, third applying code and fourth applying code.

The first applying code may be configured to cause the at least one processor to receive information regarding a target file for encoding or decoding. The target file for encoding or decoding may be one of: a compressed video or image data file or an uncompressed video or image data file. The second applying code may be configured to cause the at least one processor to determine, for the encoding or decoding of the target file, whether to use a first transform core matrix that is of a first size type or a second transform core matrix that is of a second size type that is smaller than the first size type, where the first size type is the 8-bit primary transform core matrix, which has the core matrix that is represented by 8-bits and that has a size that is 64-point or larger.

The third applying code may be configured cause the at least one processor to when a result of the determination is to use the first transform core matrix of the first size type, cause or transmit information that causes the target file for encoding or decoding to be encoded or decoded using the 8-bit primary transform core matrix that has the size that is 64-point or larger. The fourth applying code configured to cause the at least one processor to when a result of the determination is to use the second transform core matrix of the second size type that is smaller than the first size type: extract the second transform core matrix of the second size type from the 8-bit primary transform core matrix that is 64-point or larger and cause or transmit information that causes the target file for encoding or decoding to be encoded or decoded using the extracted second transform core matrix of the second type.

According to an aspect of the disclosure, a non-transitory computer-readable storage medium storing may store instructions that cause one or more processors to: receive information regarding a target file for encoding or decoding, the target file for encoding or decoding being one of: a compressed video or image data file or an uncompressed video or image data file; and determine, for the encoding or decoding of the target file, whether to use a first transform core matrix that is of a first size type or a second transform core matrix that is of a second size type that is smaller than the first size type, wherein the first size type is the 8-bit primary transform core matrix, which has the core matrix that is represented by 8-bits and that has a size that is 64-point or larger.

The stored instructions of the non-transitory computer-readable storage medium may further cause the one or more processors to: when a result of the determination is to use the first transform core matrix of the first size type, cause or transmit information that causes the target file for encoding or decoding to be encoded or decoded using the 8-bit primary transform core matrix that has the size that is 64-point or larger; and when a result of the determination is to use the second transform core matrix of the second size type that is smaller than the first size type: extract the second transform core matrix of the second size type from the 8-bit primary transform core matrix that is 64-point or larger and cause or transmit information that causes the target file for encoding or decoding to be encoded or decoded using the extracted second transform core matrix of the second type.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
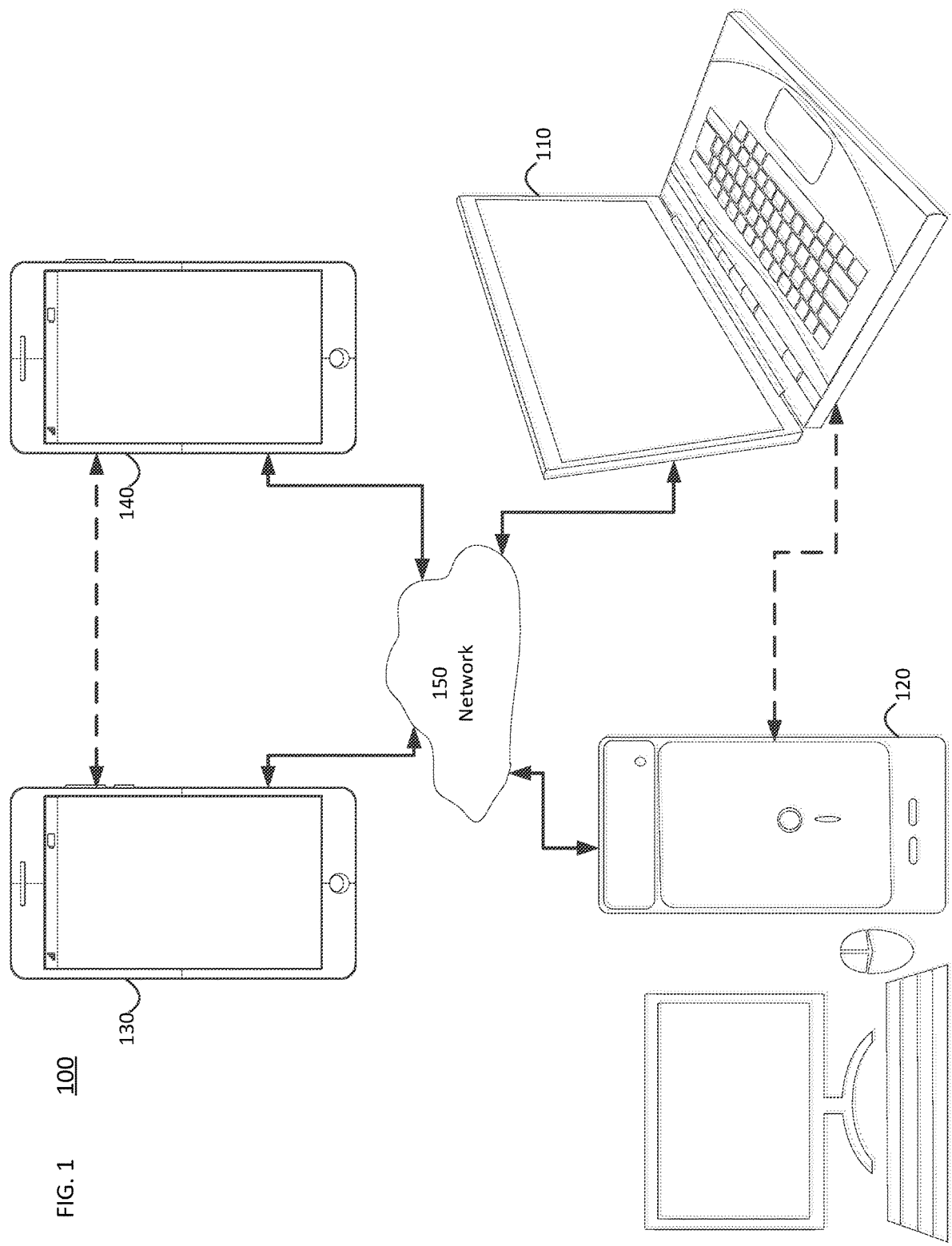
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as a laptop 110, a server 120, and smartphones 130 and 140, but the principles of the present disclosure are not so limited. Embodiments of the present disclosure find application with other equipment including but not limited to laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
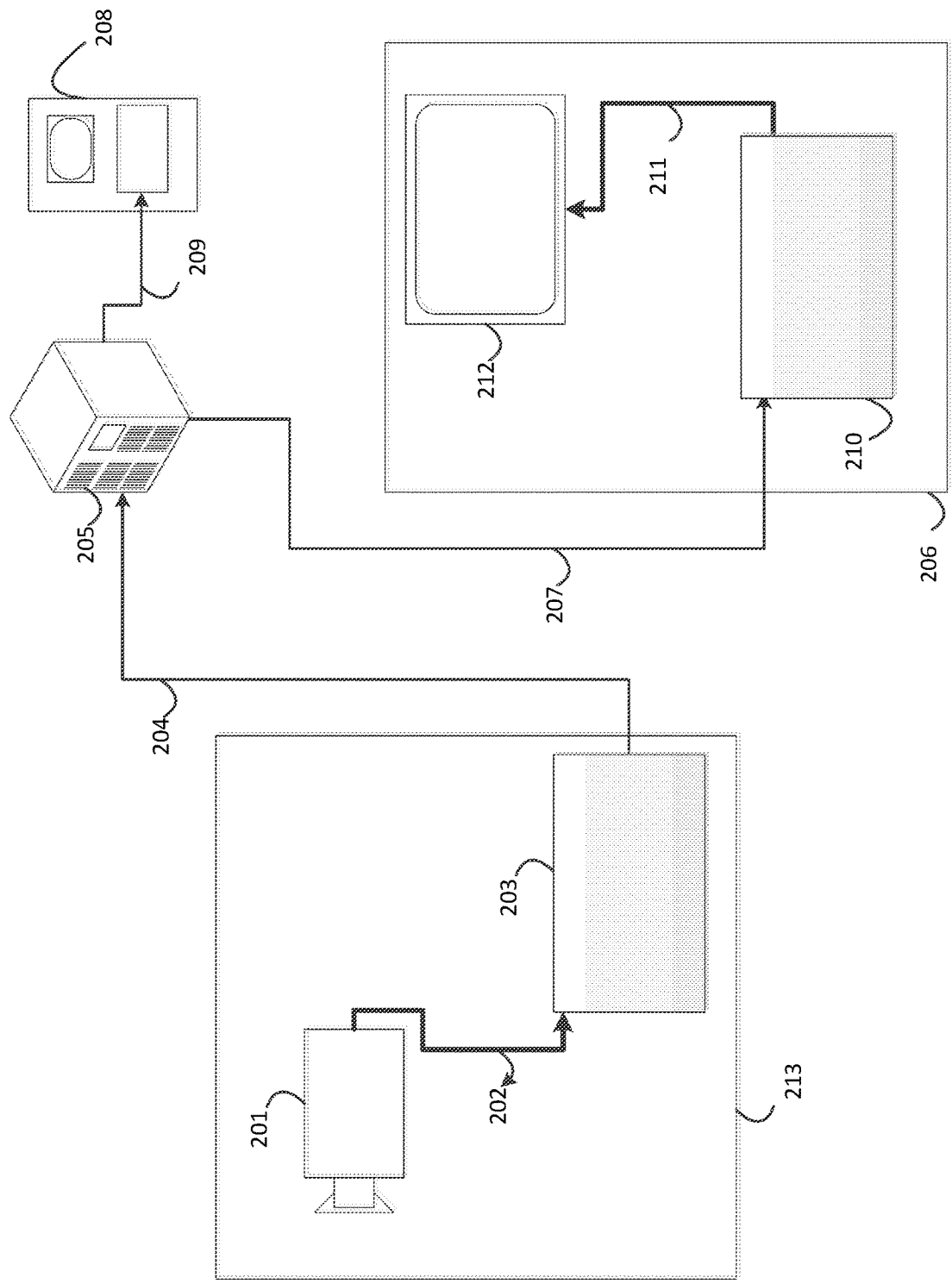
FIG. 2 is a schematic illustration of a simplified block diagram of a streaming system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), which can include a video source (201), for example a digital camera, which may create an uncompressed video sample stream (202). That sample stream (202), depicted as a bold line to emphasize a high data volume when compared to encoded video bit streams, can be processed by an encoder (203) coupled to the camera (201). The encoder (203) can include hardware (e.g., a processor or circuit and memory), software, or a combination thereof to enable or implement aspects of the disclosed subject matter as described in more detail below. The encoded video bit stream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted).

Figure 3:
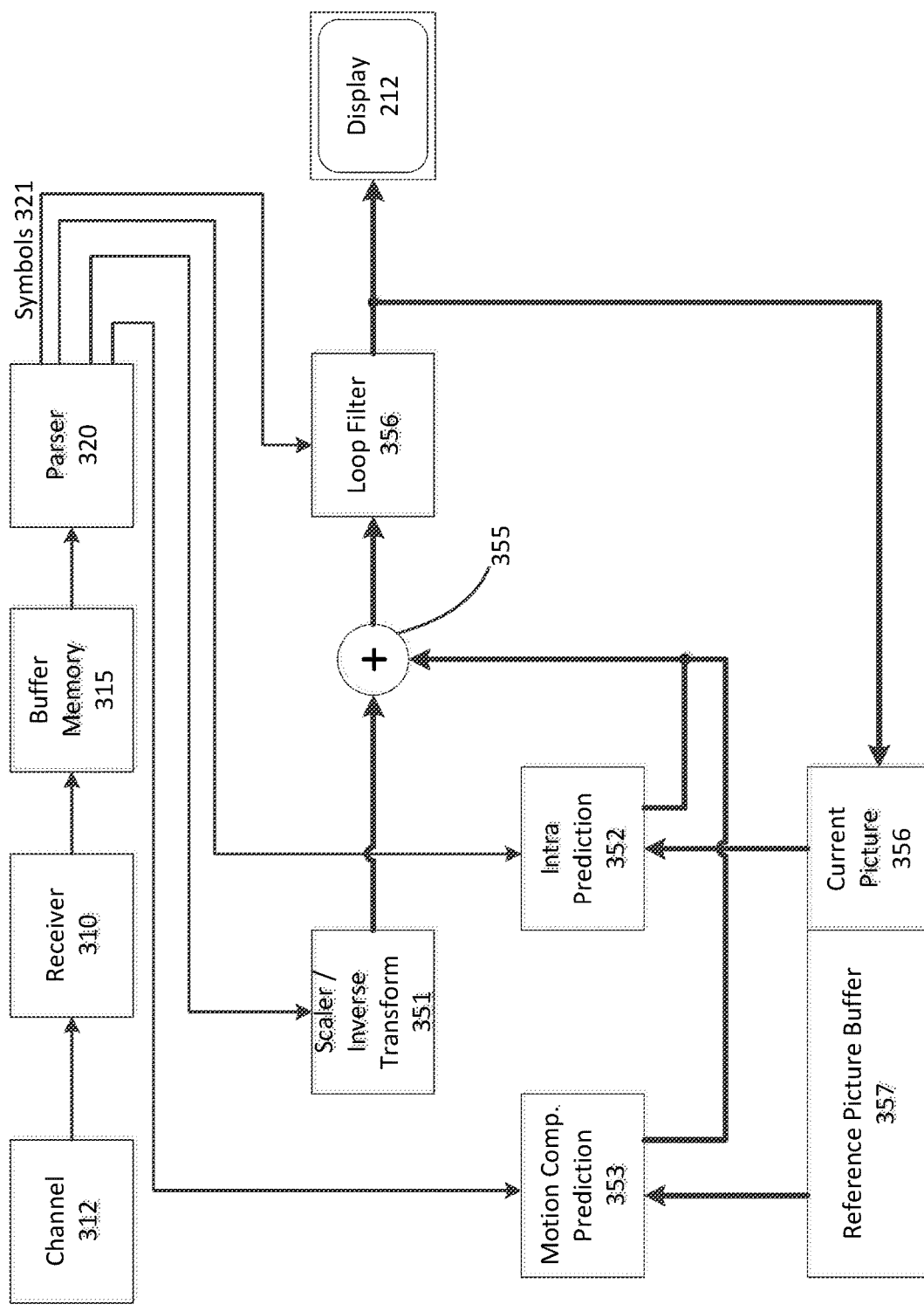
FIG. 3 is a schematic illustration of a simplified block diagram of a decoder in accordance with an embodiment.

FIG. 3 illustrates a functional block diagram of a video decoder (210) according to an embodiment of the present disclosure. As shown in FIG. 3, a receiver (310) may receive one or more codec video sequences to be decoded by the decoder (210). In the same or another embodiment, one coded video sequence may be received at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, which can be comparatively large and can advantageously be of adaptive size.

The video decoder (310) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIGS. 2 and 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so as to create symbols (321). Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit may be the scaler/inverse transform unit (351). The scaler/inverse transform unit (351) may receive a quantized transform coefficient as well as control information, including which transform to use, a block size, a quantization factor, quantization scaling matrices, etc. as symbol(s) (321) from the parser (320). It can output blocks comprising sample values that can be input into an aggregator (355).

In some cases, the output samples of the scaler/inverse transform (351) can pertain to an intra-coded block, which is a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter-coded block, and a potentially motion compensated block. In such a case, a Motion Compensation Prediction unit (353) can access reference a picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (356) can become part of the reference picture buffer (357), and a fresh current picture memory can be reallocated before commencing the reconstruction of the following coded picture.

The video decoder 320 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), and/or maximum reference picture size. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (320) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
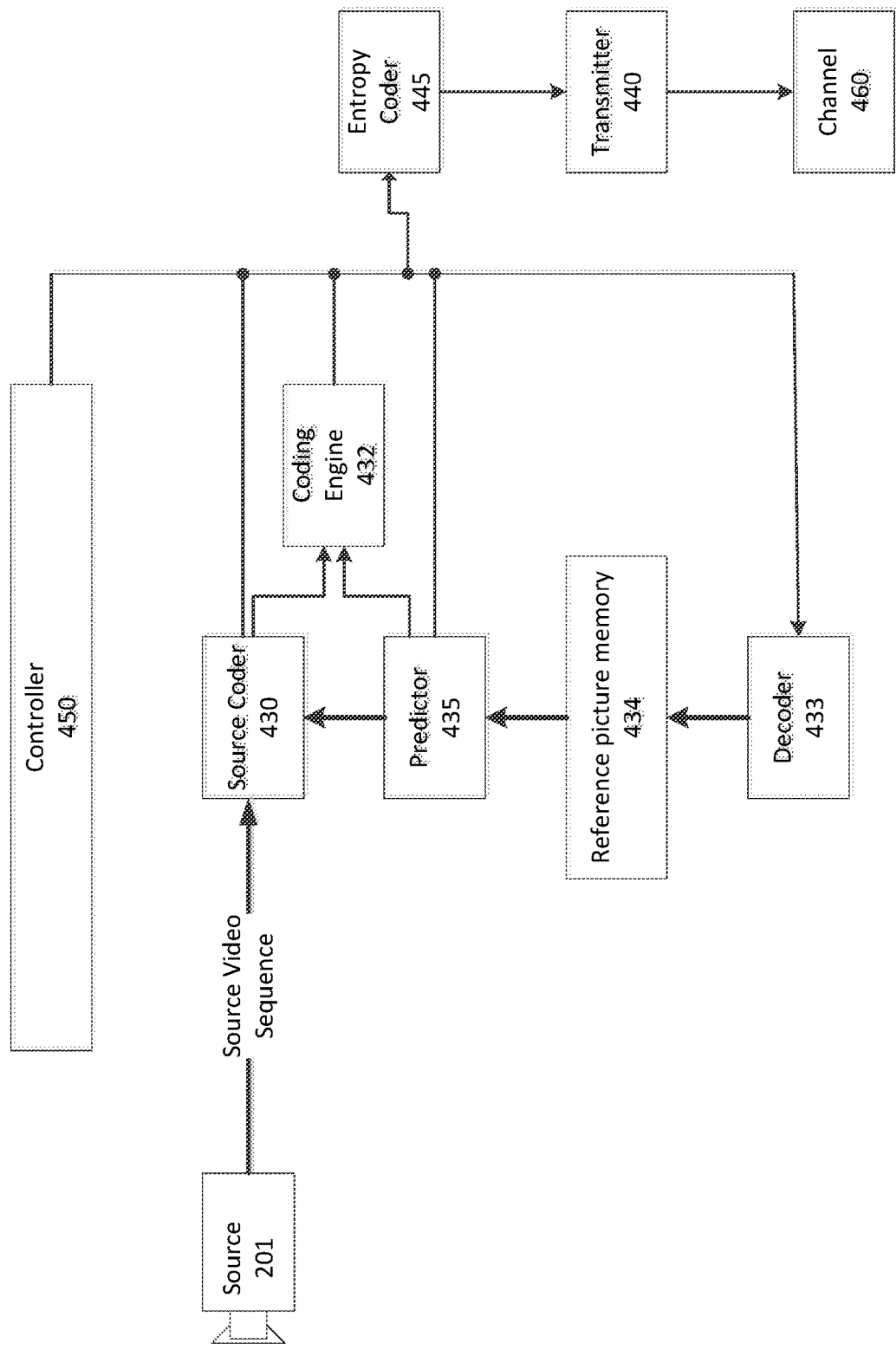
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device, which may include a memory and processor, that stores previously prepared video. In a videoconferencing system, the video source (203) may include a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of controller (450). Controller controls other functional units as described below and is functionally coupled to these units. The coupling is not depicted for clarity. Parameters set by the controller can include rate control related parameters (e.g., picture skip, quantizer, lambda value of rate-distortion optimization techniques), a picture size, a group of pictures (GOP) layout, a maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop." As an oversimplified description, a coding loop can consist of the encoding part of an encoder (430) ("source coder" henceforth), which is responsible for creating symbols based on an input picture to be coded, and a reference picture(s), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of a decoder location (local or remote), the reference picture buffer content is also bit exact between local encoder and remote encoder. In other words, the prediction part of an encoder "sees," as reference picture samples, exactly the same sample values as a decoder would "see" when using prediction during decoding. This fundamental principle of reference picture synchronicity (and resulting drift, if synchronicity cannot be maintained, for example, because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210) (including channel (312), receiver (310), buffer (315), and parser (320)) may not be fully implemented in local decoder (433).

An observation that can be made at this point is that any decoder technology except the parsing/entropy decoding that is present in a decoder also necessarily needs to be present, in substantially identical functional form, in a corresponding encoder. The description of encoder technologies are the inverse of the described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder may translate the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types from among, for example, an Intra Picture (I picture), a Predictive picture (P picture) and a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

As discussed above, the coding of the coded video sequence can be in accordance with a video coding technology or standard, and can follow principles well known to a person skilled in the art, including variable length coding, Huffman coding, arithmetic coding with or without context sensitivity, and so forth. In some streaming systems, the video bitstreams (204, 207, 209) can be encoded according to certain video coding/compression standards. An example of those standards include ITU-T HEVC Recommendation of H.265.

In HEVC, the primary transforms may have 4-point, 8-point, 16-point or 32-point DCT-2 transform core matrices, and the transform core matrices may be represented using 8-bit integers, (i.e., an 8-bit transform core matrix). The HEVC transform core matrices of smaller DCT-2 are part of larger DCT-2, as shown below:

---

4 × 4 DCT-2 transform

{64, 64, 64, 64}
{83, 36, −36, −83}
{64, −64, −64, 64}
{36, −83, 83, −36}

8 × 8 DCT-2 transform

{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}

16 × 16 DCT-2 transform

{64 64 64 64 64 64 64 64 64 64 64 64 64 64 64 64}
{90 87 80 70 57 43 25 9 −9 −25 −43 −57 −70 −80 −87 −90}
{89 75 50 18 −18 −50 −75 −89 −89 −75 −50 −18 18 50 75 89}
{87 57 9 −43 −80 −90 −70 −25 25 70 90 80 43 −9 −57 −87}
{83 36 −36 −83 −83 −36 36 83 83 36 −36 −83 −83 −36 36 83}
{80 9 −70 −87 −25 57 90 43 −43 −90 −57 25 87 70 −9 −80}
{75 −18 −89 −50 50 89 18 −75 −75 18 89 50 −50 −89 −18 75}
{70 −43 −87 9 90 25 −80 −57 57 80 −25 −90 −9 87 43 −70}
{64 −64 −64 64 64 −64 −64 64 64 −64 −64 64 64 −64 −64 64}
{57 −80 −25 90 −9 −87 43 70 −70 −43 87 9 −90 25 80 −57}
{50 −89 18 75 −75 −18 89 −50 −50 89 −18 −75 75 18 −89 50}
{43 −90 57 25 −87 70 9 −80 80 −9 −70 87 −25 −57 90 −43}
{36 −83 83 −36 −36 83 −83 36 36 −83 83 −36 −36 83 −83 36}
{25 −70 90 −80 43 9 −57 87 −87 57 −9 −43 80 −90 70 −25}
{18 −50 75 −89 89 −75 50 −18 −18 50 −75 89 −89 75 −50 18}
{9 −25 43 −57 70 −80 87 −90 90 −87 80 −70 57 −43 25 −9}

32 × 32 DCT-2 transform

{64 64 64 64 64 64 64 64 64 64 64 64 64 64 64 64 64 64 64 64 64 64 64 64 64 64 64 64 64 64 64 64}
{90 90 88 85 82 78 73 67 61 54 46 38 31 22 13 4 −4 −13 −22 −31 −38 −46 −54 −61 −67 −73 −78 −82 −85 −88 −90 −90}
{90 87 80 70 57 43 25 9 −9 −25 −43 −57 −70 −80 −87 −90 −90 −87 −80 −70 −57 −43 −25 −9 9 25 43 57 70 80 87 90}
{90 82 67 46 22 −4 −31 −54 −73 −85 −90 −88 −78 −61 −38 −13 13 38 61 78 88 90 85 73 54 31 4 −22 −46 −67 −82 −90}
{89 75 50 18 −18 −50 −75 −89 −89 −75 −50 −18 18 50 75 89 89 75 50 18 −18 −50 −75 −89 −89 −75 −50 −18 18 50 75 89}
{88 67 31 −13 −54 −82 −90 −78 −46 −4 38 73 90 85 61 22 −22 −61 −85 −90 −73 −38 4 46 78 90 82 54 13 −31 −67 −88}
{87 57 9 −43 −80 −90 −70 −25 25 70 90 80 43 −9 −57 −87 −87 −57 −9 43 80 90 70 25 −25 −70 −90 −80 −43 9 57 87}
{85 46 −13 −67 −90 −73 −22 38 82 88 54 −4 −61 −90 −78 −31 31 78 90 61 4 −54 −88 −82 −38 22 73 90 67 13 −46 −85}
{83 36 −36 −83 −83 −36 36 83 83 36 −36 −83 −83 −36 36 83 83 36 −36 −83 −83 −36 36 83 83 36 −36 −83 −83 −36 36 83}
{82 22 −54 −90 −61 13 78 85 31 −46 −90 −67 4 73 88 38 −38 −88 −73 −4 67 90 46 −31 −85 −78 −13 61 90 54 −22 −82}
{80 9 −70 −87 −25 57 90 43 −43 −90 −57 25 87 70 −9 −80 −80 −9 70 87 25 −57 −90 −43 43 90 57 −25 −87 −70 9 80}
{78 −4 −82 −73 13 85 67 −22 −88 −61 31 90 54 −38 −90 −46 46 90 38 −54 −90 −31 61 88 22 −67 −85 −13 73 82 4 −78}
{75 −18 −89 −50 50 89 18 −75 −75 18 89 50 −50 −89 −18 75 75 −18 −89 −50 50 89 18 −75 −75 18 89 50 −50 −89 −18 75}
{73 −31 −90 −22 78 67 −38 −90 −13 82 61 −46 −88 −4 85 54 −54 −85 4 88 46 −61 −82 13 90 38 −67 −78 22 90 31 −73}
{70 −43 −87 9 90 25 −80 −57 57 80 −25 −90 −9 87 43 −70 −70 43 87 −9 −90 −25 80 57 −57 −80 25 90 9 −87 −43 70}
{67 −54 −78 38 85 −22 −90 4 90 13 −88 −31 82 46 −73 −61 61 73 −46 −82 31 88 −13 −90 −4 90 22 −85 −38 78 54 −67}
{64 −64 −64 64 64 −64 −64 64 64 −64 −64 64 64 −64 −64 64 64 −64 −64 64 64 −64 −64 64 64 −64 −64 64 64 −64 −64 64}
{61 −73 −46 82 31 −88 −13 90 −4 −90 22 85 −38 −78 54 67 −67 −54 78 38 −85 −22 90 4 −90 13 88 −31 −82 46 73 −61}
{57 −80 −25 90 −9 −87 43 70 −70 −43 87 9 −90 25 80 −57 −57 80 25 −90 9 87 −43 −70 70 43 −87 −9 90 −25 −80 57}
{54 −85 −4 88 −46 −61 82 13 −90 38 67 −78 −22 90 −31 −73 73 31 −90 22 78 −67 −38 90 −13 −82 61 46 −88 4 85 −54}
{50 −89 18 75 −75 −18 89 −50 −50 89 −18 −75 75 18 −89 50 50 −89 18 75 −75 −18 89 −50 −50 89 −18 −75 75 18 −89 50}
{46 −90 38 54 −90 31 61 −88 22 67 −85 13 73 −82 4 78 −78 −4 82 −73 −13 85 −67 −22 88 −61 −31 90 −54 −38 90 −46}
{43 −90 57 25 −87 70 9 −80 80 −9 −70 87 −25 −57 90 −43 −43 90 −57 −25 87 −70 −9 80 −80 9 70 −87 25 57 −90 43}
{38 −88 73 −4 −67 90 −46 −31 85 −78 13 61 −90 54 22 −82 82 −22 −54 90 −61 −13 78 −85 31 46 −90 67 4 −73 88 −38}
{36 −83 83 −36 −36 83 −83 36 36 −83 83 −36 −36 83 −83 36 36 −83 83 −36 −36 83 −83 36 36 −83 83 −36 −36 83 −83 36}
{31 −78 90 −61 4 54 −88 82 −38 −22 73 −90 67 −13 −46 85 −85 46 13 −67 90 −73 22 38 −82 88 −54 −4 61 −90 78 −31}
{25 −70 90 −80 43 9 −57 87 −87 57 −9 −43 80 −90 70 −25 −25 70 −90 80 −43 −9 57 −87 87 −57 9 43 −80 90 −70 25}
{22 −61 85 −90 73 −38 −4 46 −78 90 −82 54 −13 −31 67 −88 88 −67 31 13 −54 82 −90 78 −46 4 38 −73 90 −85 61 −22}
{18 −50 75 −89 89 −75 50 −18 −18 50 −75 89 −89 75 −50 18 18 −50 75 −89 89 −75 50 −18 −18 50 −75 89 −89 75 −50 18}
{13 −38 61 −78 88 −90 85 −73 54 −31 4 22 −46 67 −82 90 −90 82 −67 46 −22 −4 31 −54 73 −85 90 −88 78 −61 38 −13}
{9 −25 43 −57 70 −80 87 −90 90 −87 80 −70 57 −43 25 −9 −9 25 −43 57 −70 80 −87 90 −90 87 −80 70 −57 43 −25 9}
{4 −13 22 −31 38 −46 54 −61 67 −73 78 −82 85 −88 90 −90 90 −90 88 −85 82 −78 73 −67 61 −54 46 −38 31 −22 13 −4}

As shown above, each of the DCT-2 cores show symmetry/anti-symmetry characteristics. Thus, a so-called "partial butterfly" implementation may be supported to reduce the number of operation counts (multiplications, adds/subs, shifts), and identical results of matrix multiplication can be obtained using a partial butterfly implementation. More details regarding HEVC transform design can be found in Non-Patent Literature 1.

Under development is a video coding standard informally known as Versatile Video Coding (VVC). The disclosed subject matter may be used in the context of VVC.

For a primary transform in VVC, besides 4-point, 8-point, 16-point and 32-point DCT-2 transforms, which are the same as with HEVC, additional 2-point, 64-point and 128-point DCT-2 may also be included. The 2-point DCT-2 core can be an 8-bit integer matrix which is aligned with the HEVC primary transform design, but the 64-point and 128-point DCT-2 use 10-bit transform cores, which means the 2-point, 4-point, 8-point, 16-point and 32-point DCT-2 transforms cannot be extracted from the 64-point DCT-2 core or 128-point DCT-2 core in VVC.

Parts of an exemplary 64-point DCT-2 core defined in VVC are shown below, where {aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck}={256, 334, 139, 355, 301, 201, 71, 360, 346, 319, 280, 230, 171, 105, 35, 362, 358, 351, 341, 327, 311, 291, 268, 243, 216, 186, 155, 122, 88, 53, 18, 362, 361, 359, 357, 353, 349, 344, 338, 331, 323, 315, 306, 296, 285, 274, 262, 250, 236, 223, 208, 194, 178, 163, 147, 130, 114, 97, 79, 62, 44, 27, 9}:
{aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa}
{bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck, -ck, -cj, -ci, -ch, -cg, -cf, -ce, -cd, -cc, -cb, -ca, -bz, -by, -bx, -bw, -bv, -bu, -bt, -bs, -br, -bq, -bp, -bo, -bn, -bm, -bl, -bk, -bj, -bi, -bh, -bg, -bf}
{ap, aq, ar, as, at, au, av, aw, ax, ay, az, ba, bb, bc, bd, be, -be, -bd, -bc, -bb, -ba, -az, -ay, -ax, -aw, -av, -au, -at, -as, -ar, -aq, -ap, -ap, -aq, -ar, -as, -at, -au, -av, -aw, -ax, -ay, -az, -ba, -bb, -bc, -bd, -be, be, bd, bc, bb, ba, az, ay, ax, aw, av, au, at, as, ar, aq, ap}
{bg, bj, bm, bp, bs, bv, by, cb, ce, ch, ck, -ci, -cf, -cc, -bz, -bw, -bt, -bq, -bn, -bk, -bh, -bf, -bi, -bl, -bo, -br, -bu, -bx, -ca, -cd, -cg, -cj, cj, cg, cd, ca, bx, bu, br, bo, bl, bi, bf, bh, bk, bn, bq, bt, bw, bz, cc, cf, ci, -ck, -ch, -ce, -cb, -by, -bv, -bs, -bp, -bm, -bj, -bg}
{ah, ai, aj, ak, al, am, an, ao, -ao, -an, -am, -al, -ak, -aj, -ai, -ah, -ah, -ai, -aj, -ak, -al, -am, -an, -ao, ao, an, am, al, ak, aj, ai, ah, ah, ai, aj, ak, al, am, an, ao, -ao, -an, -am, -al, -ak, -aj, -ai, -ah, -ah, -ai, -aj, -ak, -al, -am, -an, -ao, ao, an, am, al, ak, aj, ai, ah}
{bh, bm, br, bw, cb, cg, -ck, -cf, -ca, -bv, -bq, -bl, -bg, -bi, -bn, -bs, -bx, -cc, -ch, cj, ce, bz, bu, bp, bk, bf, bj, bo, bt, by, cd, ci, -ci, -cd, -by, -bt, -bo, -bj, -bf, -bk, -bp, -bu, -bz, -ce, -cj, ch, cc, bx, bs, bn, bi, bg, bl, bq, bv, ca, cf, ck, -cg, -cb, -bw, -br, -bm, -bh}
{aq, at, aw, az, bc, -be, -bb, -ay, -av, -as, -ap, -ar, -au, -ax, -ba, -bd, bd, ba, ax, au, ar, ap, as, av, ay, bb, be, -bc, -az, -aw, -at, -aq, -aq, -at, -aw, -az, -bc, be, bb, ay, av, as, ap, ar, au, ax, ba, bd, -bd, -ba, -ax, -au, -ar, -ap, -as, -av, -ay, -bb, -be, bc, az, aw, at, aq}
{bi, bp, bw, cd, ck, -ce, -bx, -bq, -bj, -bh, -bo, -bv, -cc, -cj, cf, by, br, bk, bg, bn, bu, cb, ci, -cg, -bz, -bs, -bl, -bf, -bm, -bt, -ca, -ch, ch, ca, bt, bm, bf, bl, bs, bz, cg, -ci, -cb, -bu, -bn, -bg, -bk, -br, -by, -cf, cj, cc, bv, bo, bh, bj, bq, bx, ce, -ck, -cd, -bw, -bp, -bi}
{ad, ae, af, ag, -ag, -af, -ae, -ad, -ad, -ae, -af, -ag, ag, af, ae, ad, ad, ae, af, ag, -ag, -af, -ae, -ad, -ad, -ae, -af, -ag, ag, af, ae, ad, ad, ae, af, ag, -ag, -af, -ae, -ad, -ad, -ae, -af, -ag, ag, af, ae, ad, ad, ae, af, ag, -ag, -af, -ae, -ad, -ad, -ae, -af, -ag, ag, af, ae, ad}
{bj, bs, cb, ck, -cc, -bt, -bk, -bi, -br, -ca, -cj, cd, bu, bl, bh, bq, bz, ci, -ce, -bv, -bm, -bg, -bp, -by, -ch, cf, bw, bn, bf, bo, bx, cg, -cg, -bx, -bo, -bf, -bn, -bw, -cf, ch, bv, bp, bg, bm, bv, ce, -ci, -bz, -bq, -bh, -bl, -bu, -cd, cj, ca, br, bi, bk, bt, cc, -ck, -cb, -bs, -bj}
{ar, aw, bb, -bd, -ay, -at, -ap, -au, -az, -be, ba, av, aq, as, ax, bc, -bc, -ax, -as, -aq, -av, -ba, be, az, au, ap, at, ay, bd, -bb, -aw, -ar, -ar, -aw, -bb, bd, ay, at, ap, au, az, be, -ba, -av, -aq, -as, -ax, -bc, bc, ax, as, aq, av, ba, -be, -az, -au, -ap, -at, -ay, -bd, bb, aw, ar}
{bk, bv, cg, -ce, -bt, -bi, -bm, -bx, -ci, cc, br, bg, bo, bz, ck, -ca, -bp, -bf, -bq, -cb, cj, by, bn, bh, bs, cd, -ch, -bw, -bl, -bj, -bu, -cf, cf, bu, bj, bl, bw, ch, -cd, -bs, -bh, -bn, -by, -cj, cb, bq, bf, bp, ca, -ck, -bz, -bo, -bg, -br, -cc, ci, bx, bm, bi, bt, ce, -cg, -bv, -bk}
{ai, al, ao, -am, -aj, -ah, -ak, -an, an, ak, ah, aj, am, -ao, -al, -ai, -ai, -al, -ao, am, aj, ah, ak, an, -an, -ak, -ah, -aj, -am, ao, al, ai, ai, al, ao, -am, -aj, -ah, -ak, -an, an, ak, ah, aj, am, -ao, -al, -ai, -ai, -al, -ao, am, aj, ah, ak, an, -an, -ak, -ah, -aj, -am, ao, al, ai}
{bl, by, -ck, -bx, -bk, -bm, -bz, cj, bw, bj, bn, ca, -ci, -bv, -bi, -bo, -cb, ch, bu, bh, bp, cc, -cg, -bt, -bg, -bq, -cd, cf, bs, bf, br, ce, -ce, -br, -bf, -bs, -cf, cd, bq, bg, bt, cg, -cc, -bp, -bh, -bu, -ch, cb, bo, bi, bv, ci, -ca, -bn, -bj, -bw, -cj, bz, bm, bk, bx, ck, -by, -bl}
{as, az, -bd, -aw, -ap, -av, -bc, ba, at, ar, ay, -be, -ax, -aq, -au, -bb, bb, au, aq, ax, be, -ay, -ar, -at, -ba, bc, av, ap, aw, bd, -az, -as, -as, -az, bd, aw, ap, av, bc, -ba, -at, -ar, -ay, be, ax, aq, au, bb, -bb, -au, -aq, -ax, -be, ay, ar, at, ba, -bc, -av, -ap, -aw, -bd, az, as}
{bm, cb, -cf, -bq, -bi, -bx, cj, bu, bf, bt, ci, -by, -bj, -bp, -ce, cc, bn, bl, ca, -cg, -br, -bh, -bw, ck, bv, bg, bs, ch, -bz, -bk, -bo, -cd, cd, bo, bk, bz, -ch, -bs, -bg, -bv, -ck, bw, bh, br, cg, -ca, -bl, -bn, -cc, ce, bp, bj, by, -ci, -bt, -bf, -bu, -cj, bx, bi, bq, cf, -cb, -bm}
{ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab}
{bn, ce, -ca, -bj, -br, -ci, bw, bf, bv, -cj, -bs, -bi, -bz, cf, bo, bm, cd, -cb, -bk, -bq, -ch, bx, bg, bu, -ck, -bt, -bh, -by, cg, bp, bl, cc, -cc, -bl, -bp, -cg, by, bh, bt, ck, -bu, -bg, -bx, ch, bq, bk, cb, -cd, -bm, -bo, -cf, bz, bi, bs, cj, -bv, -bf, -bw, ci, br, bj, ca, -ce, -bn}
{at, bc, -ay, -ap, -ax, bd, au, as, bb, -az, -aq, -aw, be, av, ar, ba, -ba, -ar, -av, -be, aw, aq, az, -bb, -as, -au, -bd, ax, ap, ay, -bc, -at, -at, -bc, ay, ap, ax, -bd, -au, -as, -bb, az, aq, aw, -be, -av, -ar, -ba, ba, ar, av, be, -aw, -aq, -az, bb, as, au, bd, -ax, -ap, -ay, bc, at}
{bo, ch, -bv, -bh, -ca, cc, bj, bt, -cj, -bq, -bm, -cf, bx, bf, by, -ce, -bl, -br, -ck, bs, bk, cd, -bz, -bg, -bw, cg, bn, bp, ci, -bu, -bi, -cb, cb, bi, bu, -ci, -bp, -bn, -cg, bw, bg, bz, -cd, -bk, -bs, ck, br, bl, ce, -by, -bf, -bx, cf, bm, bq, cj, -bt, -bj, -cc, ca, bh, bv, -ch, -bo}
{aj, ao, -ak, -ai, -an, al, ah, am, -am, -ah, -al, an, ai, ak, -ao, -aj, -aj, -ao, ak, ai, an, -al, -ah, -am, am, ah, al, -an, -ai, -ak, ao, aj, aj, ao, -ak, -ai, -an, al, ah, am, -am, -ah, -al, an, ai, ak, -ao, -aj, -aj, -ao, ak, ai, an, -al, -ah, -am, am, ah, al, -an, -ai, -ak, ao, aj}
{bp, ck, -bq, -bo, -cj, br, bn, ci, -bs, -bm, -ch, bt, bl, cg, -bu, -bk, -cf, bv, bj, ce, -bw, -bi, -cd, bx, bh, cc, -by, -bg, -cb, bz, bf, ca, -ca, -bf, -bz, cb, bg, by, -cc, -bh, -bx, cd, bi, bw, -ce, -bj, -bv, cf, bk, bu, -cg, -bl, -bt, ch, bm, bs, -ci, -bn, -br, cj, bo, bq, -ck, -bp}
{au, -be, -at, -av, bd, as, aw, -bc, -ar, -ax, bb, aq, ay, -ba, -ap, -az, az, ap, ba, -ay, -aq, -bb, ax, ar, bc, -aw, -as, -bd, av, at, be, -au, -au, be, at, av, -bd, -as, -aw, bc, ar, ax, -bb, -aq, -ay, ba, ap, az, -az, -ap, -ba, ay, aq, bb, -ax, -ar, -bc, aw, as, bd, -av, -at, -be, au}
{bq, -ci, -bl, -bv, cd, bg, ca, -by, -bi, -cf, bt, bn, ck, -bo, -bs, cg, bj, bx, -cb, -bf, -cc, bw, bk, ch, -br, -bp, cj, bm, bu, -ce, -bh, -bz, bz, bh, ce, -bu, -bm, -cj, bp, br, -ch, -bk, -bw, cc, bf, cb, -bx, -bj, -cg, bs, bo, -ck, -bn, -bt, cf, bi, by, -ca, -bg, -cd, bv, bl, ci, -bq}
{ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae}
{br, -cf, -bg, -cc, bu, bo, -ci, -bj, -bz, bx, bl, ck, -bm, -bw, ca, bi, ch, -bp, -bt, cd, bf, ce, -bs, -bq, cg, bh, cb, -bv, -bn, cj, bk, by, -by, -bk, -cj, bn, bv, -cb, -bh, -cg, bq, bs, -ce, -bf, -cd, bt, bp, -ch, -bi, -ca, bw, bm, -ck, -bl, -bx, bz, bj, ci, -bo, -bu, cc, bg, cf, -br}
{av, -bb, -ap, -bc, au, aw, -ba, -aq, -bd, at, ax, -az, -ar, -be, as, ay, -ay, -as, be, ar, az, -ax, -at, bd, aq, ba, -aw, -au, bc, ap, bb, -av, -av, bb, ap, bc, -au, -aw, ba, aq, bd, -at, -ax, az, ar, be, -as, -ay, ay, as, -be, -ar, -az, ax, at, -bd, -aq, -ba, aw, au, -bc, -ap, -bb, av}
{bs, -cc, -bi, -cj, bl, bz, -bv, -bp, cf, bf, cg, -bo, -bw, by, bm, -ci, -bh, -cd, br, bt, -cb, -bj, -ck, bk, ca, -bu, -bq, ce, bg, ch, -bn, -bx, bx, bn, -ch, -bg, -ce, bq, bu, -ca, -bk, ck, bj, cb, -bt, -br, cd, bh, ci, -bm, -by, bw, bo, -cg, -bf, -cf, bp, bv, -bz, -bl, cj, bi, cc, -bs}
{ak, -am, -ai, ao, ah, an, -aj, -al, al, aj, -an, -ah, -ao, ai, am, -ak, -ak, am, ai, -ao, -ah, -an, aj, al, -al, -aj, an, ah, ao, -ai, -am, ak, ak, -am, -ai, ao, ah, an, -aj, -al, al, aj, -an, -ah, -ao, ai, am, -ak, -ak, am, ai, -ao, -ah, -an, aj, al, -al, -aj, an, ah, ao, -ai, -am, ak}
{bt, -bz, -bn, cf, bh, ck, -bi, -ce, bo, bv, -bu, -bs, ca, bm, -cg, -bg, -cj, bj, cd, -bp, -bx, bv, br, -cb, -bl, ch, bf, ci, -bk, -cc, bq, bw, -bw, -bq, cc, bk, -ci, -bf, -ch, bl, cb, -br, -bv, bx, bp, -cd, -bj, cj, bg, cg, -bm, -ca, bs, bu, -bv, -bo, ce, bi, -ck, -bh, -cf, bn, bz, -bt}
{aw, -ay, -au, ba, as, -bc, -aq, be, ap, bd, -ar, -bb, at, az, -av, -ax, ax, av, -az, -at, bb, ar, -bd, -ap, -be, aq, bc, -as, -ba, au, ay, -aw, -aw, ay, au, -ba, -as, bc, aq, -be, -ap, -bd, ar, bb, -at, -az, av, ax, -ax, -av, az, at, -bb, -ar, bd, ap, be, -aq, -bc, as, ba, -au, -ay, aw}

{bu, -bw, -bs, by, bq, -ca, -bo, cc, bm, -ce, -bk, cg, bi, -ci, -bg, ck, bf, cj, -bh, -ch, bj, cf, -bl, -cd, bn, cb, -bp, -bz, br, bx, -bt, -bv, by, bt, -bx, -br, bz, bp, -cb, -bn, cd, bl, -cf, -bj, ch, bh, -cj, -bf, -ck, bg, ci, -bi, -cg, bk, ce, -bm, -cc, bo, ca, -bq, -by, bs, bw, -bu}

{aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa}

{bv, -bt, -bx, br, bz, -bp, -cb, bn, cd, -bl, -cf, bj, ch, -bh, -cj, bf, -ck, -bg, ci, bi, -cg, -bk, ce, bm, -cc, -bo, ca, bq, -by, -bs, bw, bu, -bu, -bw, bs, by, -bq, -ca, bo, cc, -bm, -ce, bk, cg, -bi, -ci, bg, ck, -bf, cj, bh, -ch, -bj, cf, bl, -cd, -bn, cb, bp, -bz, -br, bx, bt, -by}

{ax, -av, -az, at, bb, -ar, -bd, ap, -be, -aq, bc, as, -ba, -au, ay, aw, -aw, -ay, au, ba, -as, -bc, aq, be, -ap, bd, ar, -bb, -at, az, av, -ax, -ax, av, az, -at, -bb, ar, bd, -ap, be, aq, -bc, -as, ba, au, -ay, -aw, aw, ay, -au, -ba, as, bc, -aq, -be, ap, -bd, -ar, bb, at, -az, -av, ax}

{bw, -bq, -cc, bk, ci, -bf, ch, bl, -cb, -br, bv, bx, -bp, -cd, bj, cj, -bg, cg, bm, -ca, -bs, bu, by, -bo, -ce, bi, ck, -bh, cf, bn, -bz, -bt, bt, bz, -bn, -cf, bh, -ck, -bi, ce, bo, -bv, -bu, bs, ca, -bm, -cg, bg, -cj, -bj, cd, bp, -bx, -bv, br, cb, -bl, -ch, bf, -ci, -bk, cc, bq, -bw}

{al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al, al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al}

{bx, -bn, -ch, bg, -ce, -bq, bu, ca, -bk, -ck, bj, -cb, -bt, br, cd, -bh, ci, bm, -by, -bw, bo, cg, -bf, cf, bp, -bv, -bz, bl, cj, -bi, cc, bs, -bs, -cc, bi, -cj, -bl, bz, bv, -bp, -cf, bf, -cg, -bo, bw, by, -bm, -ci, bh, -cd, -br, bt, cb, -bj, ck, bk, -ca, -bu, bq, ce, -bg, ch, bn, -bx}

{ay, -as, -be, ar, -az, -ax, at, bd, -aq, ba, aw, -au, -bc, ap, -bb, -av, av, bb, -ap, bc, au, -aw, -ba, aq, -bd, -at, ax, az, -ar, be, as, -ay, -ay, as, be, -ar, az, ax, -at, -bd, aq, -ba, -aw, au, bc, -ap, bb, av, -av, -bb, ap, -bc, -au, aw, ba, -aq, bd, at, -ax, -az, ar, -be, -as, ay}

{by, -bk, cj, bn, -bv, -cb, bh, -cg, -bq, bs, ce, -bf, cd, bt, -bp, -ch, bi, -ca, -bw, bm, ck, -bl, bx, bz, -bj, ci, bo, -bu, -cc, bg, -cf, -br, br, cf, -bg, cc, bu, -bo, -ci, bj, -bz, -bx, bl, -ck, -bm, bw, ca, -bi, ch, bp, -bt, -cd, bf, -ce, -bs, bq, cg, -bh, cb, bv, -bn, -cj, bk, -by}

{af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af}

{bz, -bh, ce, bu, -bm, cj, bp, -br, -ch, bk, -bw, -cc, bf, -cb, -bx, bj, -cg, -bs, bo, ck, -bn, bt, cf, -bi, by, ca, -bg, cd, bv, -bl, ci, bq, -bq, -ci, bl, -bv, -cd, bg, -ca, -by, bi, -cf, -bt, bn, -ck, -bo, bs, cg, -bj, bx, cb, -bf, cc, bw, -bk, ch, br, -bp, -cj, bm, -bu, -ce, bh, -bz}

{az, -ap, ba, ay, -aq, bb, ax, -ar, bc, aw, -as, bd, av, -at, be, au, -au, -be, at, -av, -bd, as, -aw, -bc, ar, -ax, -bb, aq, -ay, -ba, ap, -az, -az, ap, -ba, -ay, aq, -bb, -ax, ar, -bc, -aw, as, -bd, -av, at, -be, -au, au, be, -at, av, bd, -as, aw, bc, -ar, ax, bb, -aq, ay, ba, -ap, az}

{ca, -bf, bz, cb, -bg, by, cc, -bh, bx, cd, -bi, bw, ce, -bj, bv, cf, -bk, bu, cg, -bl, bt, ch, -bm, bs, ci, -bn, br, cj, -bo, bq, ck,

-bp, bp, -ck, -bq, bo, -cj, -br, bn, -ci, -bs, bm, -ch, -bt, bl, -cg, -bu, bk, -cf, -bv, bj, -ce, -bw, bi, -cd, -bx, bh, -cc, -by, bg, -cb, -bz, bf, -ca}

{am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am, am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am}

{cb, -bi, bu, ci, -bp, bn, -cg, -bw, bg, -bz, -cd, bk, -bs, -ck, br, -bl, ce, by, -bf, bx, cf, -bm, bq, -cj, -bt, bj, -cc, -ca, bh, -bv, -ch, bo, -bo, ch, bv, -bh, ca, cc, -bj, bt, cj, -bq, bm, -cf, -bx, bf, -by, -ce, bl, -br, ck, bs, -bk, cd, bz, -bg, bw, cg, -bn, bp, -ci, -bu, bi, -cb}

{ba, -ar, av, -be, -aw, aq, -az, -bb, as, -au, bd, ax, -ap, ay, bc, -at, at, -bc, -ay, ap, -ax, -bd, au, -as, bb, az, -aq, aw, be, -av, ar, -ba, -ba, ar, -av, be, aw, -aq, az, bb, -as, au, -bd, -ax, ap, -ay, -bc, at, -at, bc, ay, -ap, ax, bd, -au, as, -bb, -az, aq, -aw, -be, av, -ar, ba}

{cc, -bl, bp, -cg, -by, bh, -bt, ck, bu, -bg, bx, ch, -bq, bk, -cb, -cd, bm, -bo, cf, bz, -bi, bs, -cj, -bv, bf, -bw, -ci, br, -bj, ca, ce, -bn, bn, -ce, -ca, bj, -br, ci, bw, -bf, bv, cj, -bs, bi, -bz, -cf, bo, -bm, cd, cb, -bk, bq, -ch, -bx, bg, -bu, -ck, bt, -bh, by, cg, -bp, bl, -cc}

{ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac}

{cd, -bo, bk, -bz, -ch, bs, -bg, bv, -ck, -bw, bh, -br, cg, ca, -bl, bn, -cc, -ce, bp, -bj, by, ci, -bt, bf, -bu, cj, bx, -bi, bq, -cf, -cb, bm, -bm, cb, cf, -bq, bi, -bx, -cj, bu, -bf, bt, -ci, -by, bj, -bp, ce, cc, -bn, bl, -ca, -cg, br, -bh, bw, ck, -bv, bg, -bs, ch, bz, -bk, bo, -cd}

{bb, -au, aq, -ax, be, ay, -ar, at, -ba, -bc, av, -ap, aw, -bd, -az, as, -as, az, bd, -aw, ap, -av, bc, ba, -at, ar, -ay, -be, ax, -aq, au, -bb, -bb, au, -aq, ax, -be, -ay, ar, -at, ba, bc, -av, ap, -aw, bd, az, -as, as, -az, -bd, aw, -ap, av, -bc, -ba, at, -ar, ay, be, -ax, aq, -au, bb}

{ce, -br, bf, -bs, cf, cd, -bq, bg, -bt, cg, cc, -bp, bh, -bu, ch, cb, -bo, bi, -bv, ci, ca, -bn, bj, -bw, cj, bz, -bm, bk, -bx, ck, by, -bl, bl, -by, -ck, bx, -bk, bm, -bz, -cj, bw, -bj, bn, -ca, -ci, bv, -bi, bo, -cb, -ch, bu, -bh, bp, -cc, -cg, bt, -bg, bq, -cd, -cf, bs, -bf, br, -ce}

{an, -ak, ah, -aj, am, ao, -al, ai, -ai, al, -ao, -am, aj, -ah, ak, -an, -an, ak, -ah, aj, -am, -ao, al, -ai, ai, -al, ao, am, -aj, ah, -ak, an, an, -ak, ah, -aj, am, ao, -al, ai, -ai, al, -ao, -am, aj, -ah, ak, -an, -an, ak, -ah, aj, -am, -ao, al, -ai, ai, -al, ao, am, -aj, ah, -ak, an}

{cf, -bu, bj, -bl, bw, -ch, -cd, bs, -bh, bn, -by, cj, cb, -bq, bf, -bp, ca, ck, -bz, bo, -bg, br, -cc, -ci, bx, -bm, bi, -bt, ce, cg, -bv, bk, -bk, bv, -cg, -ce, bt, -bi, bm, -bx, ci, cc, -br, bg, -bo, bz, -ck, -ca, bp, -bf, bq, -cb, -cj, by, -bn, bh, -bs, cd, ch, -bw, bl, -bj, bu, -cf}

{bc, -ax, as, -aq, av, -ba, -be, az, -au, ap, -at, ay, -bd, -bb, aw, -ar, ar, -aw, bb, bd, -ay, at, -ap, au, -az, be, ba, -av, aq, -as, ax, -bc, -bc, ax, -as, aq, -av, ba, be, -az, au, -ap, at, -ay, bd, bb, -aw, ar, -ar, aw, -bb, -bd, ay, -at, ap, -au, az, -be, -ba, av, -aq, as, -ax, bc}

{cg, -bx, bo, -bf, bn, -bw, cf, ch, -by, bp, -bg, bm, -bv, ce, ci, -bz, bq, -bh, bl, -bu, cd, cj, -ca, br, -bi, bk, -bt, cc, ck, -cb, bs, -bj, bj, -bs, cb, -ck, -cc, bt, -bk, bi, -br, ca, -cj, -cd, bu, -bl, bh, -bq, bz, -ci, -ce, bv, -bm, bg, -bp, by, -ch, -cf, bw, -bn, bf, -bo, bx, -cg}

{ag, -af, ae, -ad, ad, -ae, af, -ag, -ag, af, -ae, ad, -ad, ae, -af, ag, ag, -af, ae, -ad, ad, -ae, af, -ag, -ag, af, -ae, ad, -ad, ae,

-af, ag, ag, -af, ae, -ad, ad, -ae, af, -ag, -ag, af, -ae, ad, -ad,
ae, -af, ag, ag, -af, ae, -ad, ad, -ae, af, -ag, -ag, af, -ae, ad,
-ad, ae, -af, ag}
{ch, -ca, bt, -bm, bf, -bl, bs, -bz, cg, ci, -cb, bu, -bn, bg, -bk,
br, -by, cf, cj, -cc, bv, -bo, bh, -bj, bq, -bx, ce, ck, -cd, bw,
-bp, bi, -bi, bp, -bw, cd, -ck, -ce, bx, -bq, bj, -bh, bo, -bv, cc,
-cj, -cf, by, -br, bk, -bg, bn, -bu, cb, -ci, -cg, bz, -bs, bl, -bf,
bm, -bt, ca, -ch}
{bd, -ba, ax, -au, ar, -ap, as, -av, ay, -bb, be, bc, -az, aw, -at,
aq, -aq, at, -aw, az, -bc, -be, bb, -ay, av, -as, ap, -ar, au, -ax,
ba, -bd, -bd, ba, -ax, au, -ar, ap, -as, av, -ay, bb, -be, -bc, az,
-aw, at, -aq, aq, -at, aw, -az, bc, be, -bb, ay, -av, as, -ap, ar,
-au, ax, -ba, bd}
{ci, -cd, by, -bt, bo, -bj, bf, -bk, bp, -bu, bz, -ce, cj, ch, -cc,
bx, -bs, bn, -bi, bg, -bl, bq, -bv, ca, -cf, ck, cg, -cb, bw, -br,
bm, -bh, bh, -bm, br, -bw, cb, -cg, -ck, cf, -ca, bv, -bq, bl, -bg,
bi, -bn, bs, -bx, cc, -ch, -cj, ce, -bz, bu, -bp, bk, -bf, bj, -bo,
bt, -by, cd, -ci}
{ao, -an, am, -al, ak, -aj, ai, -ah, ah, -ai, aj, -ak, al, -am, an,
-ao, -ao, an, -am, al, -ak, aj, -ai, ah, -ah, ai, -aj, ak, -al, am,
-an, ao, ao, -an, am, -al, ak, -aj, ai, -ah, ah, -ai, aj, -ak, al, -am,
an, -ao, -ao, an, -am, al, -ak, aj, -ai, ah, -ah, ai, -aj, ak, -al,
am, -an, ao}
{cj, -cg, cd, -ca, bx, -bu, br, -bo, bl, -bi, bf, -bh, bk, -bn, bq,
-bt, bw, -bz, cc, -cf, ci, ck, -ch, ce, -cb, by, -bv, bs, -bp, bm,
-bj, bg, -bg, bj, -bm, bp, -bs, bv, -by, cb, -ce, ch, -ck, -ci, cf,
-cc, bz, -bw, bt, -bq, bn, -bk, bh, -bf, bi, -bl, bo, -br, bu, -bx,
ca, -cd, cg, -cj}
{be, -bd, bc, -bb, ba, -az, ay, -ax, aw, -av, au, -at, as, -ar, aq,
-ap, ap, -aq, ar, -as, at, -au, av, -aw, ax, -ay, az, -ba, bb, -bc,
bd, -be, -be, bd, -bc, bb, -ba, az, -ay, ax, -aw, av, -au, at, -as,
ar, -aq, ap, -ap, aq, -ar, as, -at, au, -av, aw, -ax, ay, -az, ba,
-bb, bc, -bd, be}
{ck, -cj, ci, -ch, cg, -cf, ce, -cd, cc, -cb, ca, -bz, by, -bx, bw,
-bv, bu, -bt, bs, -br, bq, -bp, bo, -bn, bm, -bl, bk, -bj, bi, -bh,
bg, -bf, bf, -bg, bh, -bi, bj, -bk, bl, -bm, bn, -bo, bp, -bq, br,
-bs, bt, -bu, bv, -bw, bx, -by, bz, -ca, cb, -cc, cd, -ce, cf, -cg,
ch, -ci, cj, -ck}

An exemplary 128-point DCT-2 core defined in VVC is shown below, where {aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck, cl, cm, cn, co, cp, cq, cr, cs, ct, cu, cv, cw, cx, cy, cz, da, db, dc, dd, de, df, dg, dh, di, dj, dk, dl, dm, dn, d_, dp, dq, dr, ds, dt, du, dv, dw, dx, dy, dz, ea, eb, ec, ed, ee, ef, eg, eh, ei, ej, ek, el, em, en, eo, ep, eq, er, es, et, eu, ev, ew}={256, 334, 139, 355, 301, 201, 71, 360, 346, 319, 280, 230, 171, 105, 35, 362, 358, 351, 341, 327, 311, 291, 268, 243, 216, 186, 155, 122, 88, 53, 18, 362, 361, 359, 357, 353, 349, 344, 338, 331, 323, 315, 306, 296, 285, 274, 262, 250, 236, 223, 208, 194, 178, 163, 147, 130, 114, 97, 79, 62, 44, 27, 9, 362, 362, 361, 361, 360, 359, 357, 356, 354, 352, 350, 348, 345, 342, 339, 336, 333, 329, 325, 321, 317, 313, 308, 303, 299, 293, 288, 283, 277, 271, 265, 259, 253, 246, 240, 233, 226, 219, 212, 205, 197, 190, 182, 175, 167, 159, 151, 143, 134, 126, 118, 109, 101, 92, 84, 75, 66, 58, 49, 40, 31, 22, 13, 4}.

The 128-point DCT-2 core is shown below, only the left half of the 128×128 transform core is described, the right half can be derived according to the symmetry/anti-symmetry characteristics of DCT-2:

{aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa}
{cl, cm, cn, co, cp, cq, cr, cs, ct, cu, cv, cw, cx, cy, cz, da,
db, dc, dd, de, df, dg, dh, di, dj, dk, dl, dm, dn, d_, dp, dq,
dr, ds, dt, du, dv, dw, dx, dy, dz, ea, eb, ec, ed, ee, ef, eg, eh,
ei, ej, ek, el, em, en, eo, ep, eq, er, es, et, eu, ev, ew}
{bf, bg, bh, bi, bj, bk, bl, bm, bn, bo, bp, bq, br, bs, bt, bu,
bv, bw, bx, by, bz, ca, cb, cc, cd, ce, cf, cg, ch, ci, cj, ck, -ck,
-cj, -ci, -ch, -cg, -cf, -ce, -cd, -cc, -cb, -ca, -bz, -by, -bx, -bw,
-bv, -bu, -bt, -bs, -br, -bq, -bp, -bo, -bn, -bm, -bl, -bk, -bj, -bi,
-bh, -bg, -bf}
{cm, cp, cs, cv, cy, db, de, dh, dk, dn, dq, dt, dw, dz, ec, ef,
ei, el, eo, er, eu, -ew, -et, -eq, -en, -ek, -eh, -ee, -eb, -dy, -dv,
-ds, -dp, -dm, -dj, -dg, -dd, -da, -cx, -cu, -cr, -co, -cl, -cn, -cq,
-ct, -cw, -cz, -dc, -df, -di, -dl, -d_, -dr, -du, -dx, -ea, -ed, -eg,
-ej, -em, -ep, -es, -ev}
{ap, aq, ar, as, at, au, av, aw, ax, ay, az, ba, bb, bc, bd, be,
-be, -bd, -b c, -bb, -ba, -az, -ay, -ax, -aw, -av, -au, -at, -as, -ar,
-aq, -ap, -ap, -aq, -ar, -as, -at, -au, -av, -aw, -ax, -ay, -az, -ba,
-bb, -b c, -bd, -be, be, bd, bc, bb, ba, az, ay, ax, aw, av, au,
at, as, ar, aq, ap}
{cn, cs, cx, dc, dh, dm, dr, dw, eb, eg, el, eq, ev, -et, -eo, -ej,
-ee, -dz, -du, -dp, -dk, -df, -da, -cv, -cq, -cl, -cp, -cu, -cz, -de,
-dj, -d_, -dt, -dy, -ed, -ei, -en, -es, ew, er, em, eh, ec, dx, ds,
dn, di, dd, cy, ct, co, cm, Cr, cw, db, dg, dl, dq, dv, ea, ef, ek,
ep, eu}
{bg, bj, bm, bp, bs, bv, by, cb, ce, ch, ck, -ci, -cf, -cc, -bz,
-bw, -bt, -bq, -bn, -bk, -bh, -bf, -bi, -bl, -bo, -br, -bu, -bx, -ca,
-cd, -cg, -cj, cj, cg, cd, ca, bx, bu, br, bo, bl, bi, bf, bh, bk,
bn, bq, bt, bw, bz, cc, cf, ci, -ck, -ch, -ce, -cb, -by, -bv, -bs,
-bp, -bm, -bj, -bg}
{co, cv, dc, dj, dq, dx, ee, el, es, -eu, -en, -eg, -dz, -ds, -dl,
-de, -cx, -cq, -cm, -ct, -da, -dh, -d_, -dv, -ec, -ej, -eq, ew, ep,
ei, eb, du, dn, dg, cz, cs, cl, Cr, cy, df, dm, dt, ea, eh, eo, ev,
-er, -ek, -ed, -dw, -dp, -di, -db, -cu, -cn, -cp, -cw, -dd, -dk,
-dr, -dy, -ef, -em, -et}
{ah, ai, aj, ak, al, am, an, ao, -ao, -an, -am, -al, -ak, -aj, -ai,
-ah, -ah, -ai, -aj, -ak, -al, -am, -an, -ao, ao, an, am, al, ak, aj,
ai, ah, ah, ai, aj, ak, al, am, an, ao, -ao, -an, -am, -al, -ak, -aj,
-ai, -ah, -ah, -ai, -aj, -ak, -al, -am, -an, -ao, ao, an, am, al, ak,
aj, ai, ah}
{cp, cy, dh, dq, dz, ei, er, -et, -ek, -eb, -ds, -dj, -da, -cr, -cn,
-cw, -df, -d_, -dx, -eg, -ep, ev, em, ed, du, dl, dc, ct, cl, cu,
dd, dm, dv, ee, en, ew, -eo, -ef, -dw, -dn, -de, -cv, -cm, -cs,
-db, -dk, -dt, -ec, -el, -eu, eq, eh, dy, dp, dg, cx, co, cq, cz,
di, dr, ea, ej, es}
{bh, bm, br, bw, cb, cg, -ck, -cf, -ca, -bv, -bq, -bl, -bg, -bi,
-bn, -bs, -bx, -cc, -ch, cj, ce, bz, bu, bp, bk, bf, bj, bo, bt, by,
cd, ci, -ci, -cd, -by, -bt, -bo, -bj, -bf, -bk, -bp, -bu, -bz, -ce,
-cj, ch, cc, bx, bs, bn, bi, bg, bl, bq, bv, ca, cf, ck, -cg, -cb,
-bw, -br, -bm, -bh}
{cq, db, dm, dx, ei, et, -ep, -ee, -dt, -di, -cx, -cm, -cu, -df,
-dq, -eb, -em, ew, el, ea, dp, de, ct, cn, cy, dj, du, ef, eq, -es,
-eh, -dw, -dl, -da, -cp, -cr, -dc, -dn, -dy, -ej, -eu, eo, ed, ds,
dh, cw, cl, cv, dg, dr, ec, en, -ev, -ek, -dz, -d_, -dd, -cs, -co,
-cz, -dk, -dv, -eg, -er}
{aq, at, aw, az, bc, -be, -bb, -ay, -av, -as, -ap, -ar, -au, -ax,
-ba, -bd, bd, ba, ax, au, ar, ap, as, av, ay, bb, be, -bc, -az, -aw,
-at, -aq, -aq, -at, -aw, -az, -bc, be, bb, ay, av, as, ap, ar, au,
ax, ba, bd, -bd, -ba, -ax, -au, -ar, -ap, -as, -av, -ay, -bb, -be,
bc, az, aw, at, aq}
{cr, de, dr, ee, er, -ep, -ec, -dp, -dc, -cp, -ct, -dg, -dt, -eg, -et,
en, ea, dn, da, cn, cv, di, dv, ei, ev, -el, -dy, -dl, -cy, -cl, -cx,
-dk, -dx, -ek, ew, ej, dw, dj, cw, cm, cz, dm, dz, em, -eu, -eh,
-du, -dh, -cu, -co, -db, -d_, -eb, -eo, es, ef, ds, df, cs, cq, dd,
dq, ed, eq}
{bi, bp, bw, cd, ck, -ce, -bx, -bq, -bj, -bh, -bo, -bv, -cc, -cj,
cf, by, br, bk, bg, bn, bu, cb, ci, -cg, -bz, -bs, -bl, -bf, -bm,

{-bt, -ca, -ch, ch, ca, bt, bm, bf, bl, bs, bz, cg, -ci, -cb, -bu, -bn, -bg, -bk, -br, -by, -cf, cj, cc, bv, bo, bh, bj, bq, bx, ce, -ck, -cd, -bw, -bp, -bi}

{cs, dh, dw, el, -et, -ee, -dp, -da, -cl, -cz, -d_, -ed, -es, em, dx, di, ct, Cr, dg, dv, ek, -eu, -ef, -dq, -db, -cm, -cy, -dn, -ec, -er, en, dy, dj, cu, cq, df, du, ej, -ev, -eg, -dr, -dc, -cn, -cx, -dm, -eb, -eq, eo, dz, dk, cv, cp, de, dt, ei, -ew, -eh, -ds, -dd, -co, -cw, -dl, -ea, -ep}

{ad, ae, af, ag, -ag, -af, -ae, -ad, -ad, -ae, -af, -ag, ag, af, ae, ad, ad, ae, af, ag, -ag, -af, -ae, -ad, -ad, -ae, -af, -ag, ag, af, ae, ad, ad, ae, af, ag, -ag, -af, -ae, -ad, -ad, -ae, -af, -ag, ag, af, ae, ad, ad, ae, af, ag, -ag, -af, -ae, -ad, -ad, -ae, -af, -ag, ag, af, ae, ad}

{ct, dk, eb, es, -ek, -dt, -dc, -cl, -db, -ds, -ej, et, ec, dl, cu, cs, dj, ea, er, -el, -du, -dd, -cm, -da, -dr, -ei, eu, ed, dm, cv, cr, di, dz, eq, -em, -dv, -de, -cn, -cz, -dq, -eh, ev, ee, dn, cw, cq, dh, dy, ep, -en, -dw, -df, -co, -cy, -dp, -eg, ew, ef, d_, cx, cp, dg, dx, eo}

{bj, bs, cb, ck, -cc, -bt, -bk, -bi, -br, -ca, -cj, cd, bu, bl, bh, bq, bz, ci, -ce, -bv, -bm, -bg, -bp, -by, -ch, cf, bw, bn, bf, bo, bx, cg, -cg, -bx, -bo, -bf, -bn, -bw, -cf, ch, by, bp, bg, bm, bv, ce, -ci, -bz, -bq, -bh, -bl, -bu, -cd, cj, ca, br, bi, bk, bt, cc, -ck, -cb, -bs, -bj}

{cu, dn, eg, -eu, -eb, -di, -cp, -cz, -ds, -el, ep, dw, dd, cl, de, dx, eq, -ek, -dr, -cy, -cq, -dj, -ec, -ev, ef, dm, ct, cv, d_, eh, -et, -ea, -dh, -co, -da, -dt, -em, eo, dv, dc, cm, df, dy, er, -ej, -dq, -cx, -cr, -dk, -ed, -ew, ee, dl, cs, cw, dp, ei, -es, -dz, -dg, -cn, -db, -du, -en}

{ar, aw, bb, -bd, -ay, -at, -ap, -au, -az, -be, ba, av, aq, as, ax, bc, -bc, -ax, -as, -aq, -av, -ba, be, az, au, ap, at, ay, bd, -bb, -aw, -ar, -ar, -aw, -bb, bd, ay, at, ap, au, az, be, -ba, -av, -aq, -as, -ax, -bc, bc, ax, as, aq, av, ba, -be, -az, -au, -ap, -at, -ay, -bd, bb, aw, ar}

{cv, dq, el, -en, -ds, -cx, -ct, -d_, -ej, ep, du, cz, cr, dm, eh, -er, -dw, -db, -cp, -dk, -ef, et, dy, dd, cn, di, ed, -ev, -ea, -df, -cl, -dg, -eb, -ew, ec, dh, cm, de, dz, eu, -ee, -dj, -co, -dc, -dx, -es, eg, dl, cq, da, dv, eq, -ei, -dn, -cs, -cy, -dt, -eo, ek, dp, cu, cw, dr, em}

{bk, bv, cg, -ce, -bt, -bi, -bm, -bx, -ci, cc, br, bg, bo, bz, ck, -ca, -bp, -bf, -bq, -cb, cj, by, bn, bh, bs, cd, -ch, -bw, -bl, -bj, -bu, -cf, cf, bu, bj, bl, bw, ch, -cd, -bs, -bh, -bn, -by, -cj, cb, bq, bf, bp, ca, -ck, -bz, -bo, -bg, -br, -cc, ci, bx, bm, bi, bt, ce, -cg, -bv, -bk}

{cw, dt, eq, -eg, -dj, -cm, -dg, -ed, et, dw, cz, ct, dq, en, -ej, -dm, -cp, -dd, -ea, ew, dz, dc, cq, dn, ek, -em, -dp, -cs, -da, -dx, -eu, ec, df, cn, dk, eh, -ep, -ds, -cv, -cx, -du, -er, ef, di, cl, dh, ee, -es, -dv, -cy, -cu, -dr, -eo, ei, dl, co, de, eb, -ev, -dy, -db, -cr, -d_, -el}

{ai, al, ao, -am, -aj, -ah, -ak, -an, an, ak, ah, aj, am, -ao, -al, -ai, -ai, -al, -ao, am, aj, ah, ak, an, -an, -ak, -ah, -aj, -am, ao, al, ai, ai, al, ao, -am, -aj, -ah, -ak, -an, an, ak, ah, aj, am, -ao, -al, -ai, -ai, -al, -ao, am, aj, ah, ak, an, -an, -ak, -ah, -aj, -am, ao, al, ai}

{cx, dw, ev, -dz, -da, -cu, -dt, -es, ec, dd, cr, dq, ep, -ef, -dg, -co, -dn, -em, ei, dj, cl, dk, ej, -el, -dm, -cn, -dh, -eg, eo, dp, cq, de, ed, -er, -ds, -ct, -db, -ea, eu, dv, cw, cy, dx, ew, -dy, -cz, -cv, -du, -et, eb, dc, cs, dr, eq, -ee, -df, -cp, -d_, -en, eh, di, cm, dl, ek}

{bl, by, -ck, -bx, -bk, -bm, -bz, cj, bw, bj, bn, ca, -ci, -bv, -bi, -bo, -cb, ch, bu, bh, bp, cc, -cg, -bt, -bg, -bq, -cd, cf, bs, bf, br, ce, -ce, -br, -bf, -bs, -cf, cd, bq, bg, bt, cg, -cc, -bp, -bh, -bu, -ch, cb, bo, bi, bv, ci, -ca, -bn, -bj, -bw, -cj, bz, bm, bk, bx, ck, -by, -bl}

{cy, dz, -et, -ds, -cr, -df, -eg, em, dl, cl, dm, en, -ef, -de, -cs, -dt, -eu, dy, cx, cz, ea, -es, -dr, -cq, -dg, -eh, dk, cm, dn, eo, -ee, -dd, -ct, -du, -ev, dx, cw, da, eb, -er, -dq, -cp, -dh, -ei, ek, dj, cn, d_, ep, -ed, -dc, -cu, -dv, -ew, dw, cv, db, ec, -eq, -dp, -co, -di, -ej}

{as, az, -bd, -aw, -ap, -av, -bc, ba, at, ar, ay, -be, -ax, -aq, -au, -bb, bb, au, aq, ax, be, -ay, -ar, -at, -ba, bc, av, ap, aw, bd, -az, -as, -as, -az, bd, aw, ap, av, bc, -ba, -at, -ar, -ay, be, ax, aq, au, bb, -bb, -au, -aq, -ax, -be, ay, ar, at, ba, -bc, -av, -ap, -aw, -bd, az, as}

{cz, ec, -eo, -dl, -cn, -dq, -et, dx, cu, de, eh, -ej, -dg, -cs, -dv, ev, ds, cp, dj, em, -ee, -db, -cx, -ea, eq, dn, cl, d_, er, -dz, -cw, -dc, -ef, el, di, cq, dt, ew, -du, -cr, -dh, -ek, eg, dd, cv, dy, -es, -dp, -cm, -dm, -ep, eb, cy, da, ed, -en, -dk, -co, -dr, -eu, dw, ct, df, ei}

{bm, cb, -cf, -bq, -bi, -bx, cj, bu, bf, bt, ci, -by, -bj, -bp, -ce, cc, bn, bl, ca, -cg, -br, -bh, -bw, ck, bv, bg, bs, ch, -bz, -bk, -bo, -cd, cd, bo, bk, bz, -ch, -bs, -bg, -bv, -ck, bw, bh, br, cg, -ca, -bl, -bn, -cc, ce, bp, bj, by, -ci, -bt, -bf, -bu, -cj, bx, bi, bq, cf, -cb, -bm}

{da, ef, -ej, -de, -cw, -eb, en, di, cs, dx, -er, -dm, -co, -dt, ev, dq, cl, dp, eu, -du, -cp, -dl, -eq, dy, ct, dh, em, -ec, -cx, -dd, -ei, eg, db, cz, ee, -ek, -df, -cv, -ea, eo, dj, cr, dw, -es, -dn, -cn, -ds, ew, dr, cm, d_, et, -dv, -cq, -dk, -ep, dz, cu, dg, el, -ed, -cy, -dc, -eh}

{ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab}

{db, ei, -ee, -cx, -df, -em, ea, ct, dj, eq, -dw, -cp, -dn, -eu, ds, cl, dr, -ev, -d_, -co, -dv, er, dk, cs, dz, -en, -dg, -cw, -ed, ej, dc, da, eh, -ef, -cy, -de, -el, eb, cu, di, ep, -dx, -cq, -dm, -et, dt, cm, dq, -ew, -dp, -cn, -du, es, dl, cr, dy, -eo, -dh, -cv, -ec, ek, dd, cz, eg}

{bn, ce, -ca, -bj, -br, -ci, bw, bf, bv, -cj, -bs, -bi, -bz, cf, bo, bm, cd, -cb, -bk, -bq, -ch, bx, bg, bu, -ck, -bt, -bh, -by, cg, bp, bl, cc, -cc, -bl, -bp, -cg, by, bh, bt, ck, -bu, -bg, -bx, ch, bq, bk, cb, -cd, -bm, -bo, -cf, bz, bi, bs, cj, -bv, -bf, -bw, -ce, br, bj, ca, -ce, -bn}

{dc, el, -dz, -cq, -d_, ew, dn, cr, ea, -ek, -db, -dd, -em, dy, cp, dp, -ev, -dm, -cs, -eb, ej, da, de, en, -dx, -co, -dq, eu, dl, ct, ec, -ei, -cz, -df, -eo, dw, cn, dr, -et, -dk, -cu, -ed, eh, cy, dg, ep, -dv, -cm, -ds, es, dj, cv, ee, -eg, -cx, -dh, -eq, du, cl, dt, -er, -ci, -cw, -ef}

{at, bc, -ay, -ap, -ax, bd, au, as, bb, -az, -aq, -aw, be, av, ar, ba, -ba, -ar, -av, -be, aw, aq, az, -bb, -as, -au, -bd, ax, ap, ay, -bc, -at, -at, -bc, ay, ap, ax, -bd, -au, -as, -bb, az, aq, aw, -be, -av, -ar, -ba, ba, ar, av, be, -aw, -aq, -az, bb, as, au, bd, -ax, -ap, -ay, bc, at}

{dd, eo, -du, -cm, -dx, el, da, dg, er, -dr, -cp, -ea, ei, cx, dj, eu, -d_, -cs, -ed, ef, cu, dm, -ew, -dl, -cv, -eg, ec, cr, dp, -et, -di, -cy, -ej, dz, co, ds, eq, -df, -db, -em, dw, cl, dv, -en, -dc, -de, -ep, dt, cn, dy, -ek, -cz, -dh, -es, dq, cq, eb, -eh, -cw, -dk, -ev, dn, ct, ee}

{bo, ch, -bv, -bh, -ca, cc, bj, bt, -cj, -bq, -bm, -cf, bx, bf, by, -ce, -bl, -br, -ck, bs, bk, cd, -bz, -bg, -bw, cg, bn, bp, ci, -bu, -bi, -cb, cb, bi, bu, -ci, -bp, -bn, -cg, bw, bg, bz, -cd, -bk, -bs, ck, br, bl, ce, -by, -bf, -bx, cf, bm, bq, cj, -bt, -bj, -cc, ca, bh, bv, -ch, -bo}

{de, er, -dp, -ct, -eg, ea, cn, dv, -el, -cy, -dk, ew, dj, cz, em, -du, -co, -eb, ef, cs, dq, -eq, -dd, -df, -es, d_, cu, eh, -dz, -cm, -dw, ek, cx, dl, -ev, -di, -da, -en, dt, cp, ec, -ee, -cr, -dr, ep, dc, dg, et, -dn, -cv, -ei, dy, cl, dx, -ej, -cw, -dm, eu, dh, db, eo, -ds, -cq, -ed}

{aj, ao, -ak, -ai, -an, al, ah, am, -am, -ah, -al, an, ai, ak, -ao, -aj, -aj, -ao, ak, ai, an, -al, -ah, -am, am, ah, al, -an, -ai, -ak,

{ao, aj, aj, ao, -ak, -ai, -an, al, ah, am, -am, -ah, -al, an, ai, ak, -ao, -aj, -aj, -ao, ak, ai, an, -al, -ah, -am, am, ah, al, -an, -ai, -ak, ao, aj}

{df, eu, -dk, -da, -ep, dp, cv, ek, -du, -cq, -ef, dz, cl, ea, -ee, -cp, -dv, ej, cu, dq, -eo, -cz, -dl, et, de, dg, ev, -dj, -db, -eq, d_, cw, el, -dt, -cr, -eg, dy, cm, eb, -ed, -co, -dw, ei, ct, dr, -en, -cy, -dm, es, dd, dh, ew, -di, -dc, -er, dn, cx, em, -ds, -cs, -eh, dx, cn, ec}

{bp, ck, -bq, -bo, -cj, br, bn, ci, -bs, -bm, -ch, bt, bl, cg, -bu, -bk, -cf, bv, bj, ce, -bw, -bi, -cd, bx, bh, cc, -by, -bg, -cb, bz, bf, ca, -ca, -bf, -bz, cb, bg, by, -cc, -bh, -bx, cd, bi, bw, -ce, -bj, -bv, cf, bk, bu, -cg, -bl, -bt, ch, bm, bs, -ci, -bn, -br, cj, bo, bq, -ck, -bp}

{dg, -ew, -df, -dh, ev, de, di, -eu, -dd, -dj, et, dc, dk, -es, -db, -dl, er, da, dm, -eq, -cz, -dn, ep, cy, d_, -eo, -cx, -dp, en, cw, dq, -em, -cv, -dr, el, cu, ds, -ek, -ct, -dt, ej, cs, du, -ei, -cr, -dv, eh, cq, dw, -eg, -cp, -dx, ef, co, dy, -ee, -cn, -dz, ed, cm, ea, -ec, -cl, -eb}

{au, -be, -at, -av, bd, as, aw, -bc, -ar, -ax, bb, aq, ay, -ba, -ap, -az, az, ap, ba, -ay, -aq, -bb, ax, ar, bc, -aw, -as, -bd, av, at, be, -au, -au, be, at, av, -bd, -as, -aw, bc, ar, ax, -bb, -aq, -ay, ba, ap, az, -az, -ap, -ba, ay, aq, bb, -ax, -ar, -bc, aw, as, bd, -av, -at, -be, au}

{dh, -et, -da, -d_, em, ct, dv, -ef, -cm, -ec, dy, cq, ej, -dr, -cx, -eq, dk, de, -ew, -dd, -dl, ep, cw, ds, -ei, -cp, -dz, eb, cn, eg, -du, -cu, -en, dn, db, eu, -dg, -di, es, cz, dp, -el, -cs, -dw, ee, cl, ed, -dx, -cr, -ek, dq, cy, er, -dj, -df, ev, dc, dm, -eo, -cv, -dt, eh, co, ea}

{bq, -ci, -bl, -bv, cd, bg, ca, -by, -bi, -cf, bt, bn, ck, -bo, -bs, cg, bj, bx, -cb, -bf, -cc, bw, bk, ch, -br, -bp, cj, bm, bu, -ce, -bh, -bz, bz, bh, ce, -bu, -bm, -cj, bp, br, -ch, -bk, -bw, cc, bf, cb, -bx, -bj, -cg, bs, bo, -ck, -bn, -bt, cf, bi, by, -ca, -bg, -cd, bv, bl, ci, -bq}

{di, -eq, -cv, -dv, ed, cn, ei, -dq, -da, -ev, dd, dn, -el, -cq, -ea, dy, cs, en, -dl, -df, et, cy, ds, -eg, -cl, -ef, dt, cx, es, -dg, -dk, eo, ct, dx, -eb, -cp, -ek, d_, dc, -ew, -db, -dp, ej, co, ec, -dw, -cu, -ep, dj, dh, -er, -cw, -du, ee, cm, eh, -dr, -cz, -eu, de, dm, -em, -cr, -dz}

{ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae}

{dj, -en, -cq, -ec, du, cy, ev, -db, -dr, ef, cn, ek, -dm, -dg, eq, ct, dz, -dx, -cv, -es, de, d_, -ei, -cl, -eh, dp, dd, -et, -cw, -dw, ea, cs, ep, -dh, -dl, el, co, ee, -ds, -da, ew, cz, dt, -ed, -cp, -em, dk, di, -eo, -cr, -eb, dv, cx, eu, -dc, -dq, eg, cm, ej, -dn, -df, er, cu, dy}

{br, -cf, -bg, -cc, bu, bo, -ci, -bj, -bz, bx, bl, ck, -bm, -bw, ca, bi, ch, -bp, -bt, cd, bf, ce, -bs, -bq, cg, bh, cb, -bv, -bn, cj, bk, by, -by, -bk, -cj, bn, bv, -cb, -bh, -cg, bq, bs, -ce, -bf, -cd, bt, bp, -ch, -bi, -ca, bw, bm, -ck, -bl, -bx, bz, bj, ci, -bo, -bu, cc, bg, cf, -br}

{dk, -ek, -cl, -ej, dl, dj, -el, -cm, -ei, dm, di, -em, -cn, -eh, dn, dh, -en, -co, -eg, d_, dg, -eo, -cp, -ef, dp, df, -ep, -cq, -ee, dq, de, -eq, -cr, -ed, dr, dd, -er, -cs, -ec, ds, dc, -es, -ct, -eb, dt, db, -et, -cu, -ea, du, da, -eu, -cv, -dz, dv, cz, -ev, -cw, -dy, dw, cy, -ew, -cx, -dx}

{av, -bb, -ap, -bc, au, aw, -ba, -aq, -bd, at, ax, -az, -ar, -be, as, ay, -ay, -as, be, ar, az, -ax, -at, bd, aq, ba, -aw, -au, bc, ap, bb, -av, -av, bb, ap, bc, -au, -aw, ba, aq, bd, -at, -ax, az, ar, be, -as, -ay, ay, as, -be, -ar, -az, ax, at, -bd, -aq, -ba, aw, au, -bc, -ap, -bb, av}

{dl, -eh, -cp, -eq, dc, du, -dy, -cy, eu, ct, ed, -dp, -dh, el, cl, em, -dg, -dq, ec, cu, ev, -cx, -dz, dt, dd, -ep, -co, -ei, dk, dm, -eg, -cq, -er, db, dv, -dx, -cz, et, cs, ee, -d_, -di, ek, cm, en, -df, -dr, eb, cv, ew, -cw, -ea, ds, de, -eo, -cn, -ej, dj, dn, -ef, -cr, -es, da, dw}

{bs, -cc, -bi, -cj, bl, bz, -by, -bp, cf, bf, cg, -bo, -bw, bv, bm, -ci, -bh, -cd, br, bt, -cb, -bj, -ck, bk, ca, -bu, -bq, ce, bg, ch, -bn, -bx, bx, bn, -ch, -bg, -ce, bq, bu, -ca, -bk, ck, bj, cb, -bt, -br, cd, bh, ci, -bm, -by, bw, bo, -cg, -bf, -cf, bp, bv, -bz, -bl, cj, bi, cc, -bs}

{dm, -ee, -cu, ew, ct, ef, -dl, -dn, ed, cv, -ev, -cs, -eg, dk, d_, -ec, -cw, eu, cr, eh, -dj, -dp, eb, cx, -et, -cq, -ei, di, dq, -ea, -cy, es, cp, ej, -dh, -dr, dz, cz, -er, -co, -ek, dg, ds, -dy, -da, eq, cn, el, -df, -dt, dx, db, -ep, -cm, -em, de, du, -dw, -dc, eo, cl, en, -dd, -dv}

{ak, -am, -ai, ao, ah, an, -aj, -al, al, aj, -an, -ah, -ao, ai, am, -ak, -ak, am, ai, -ao, -ah, -an, aj, al, -al, -aj, an, ah, ao, -ai, -am, ak, ak, -am, -ai, ao, ah, an, -aj, -al, al, aj, -an, -ah, -ao, ai, am, -ak, -ak, am, ai, -ao, -ah, -an, aj, al, -al, -aj, an, ah, ao, -ai, -am, ak}

{dn, -eb, -cz, ep, cl, eq, -cy, -ec, dm, d, -ea, -da, eo, cm, er, -cx, -ed, dl, dp, -dz, -db, en, cn, es, -cw, -ee, dk, dq, -dy, -dc, em, co, et, -cv, -ef, dj, dr, -dx, -dd, el, cp, eu, -cu, -eg, di, ds, -dw, -de, ek, cq, ev, -ct, -eh, dh, dt, -dv, -df, ej, cr, ew, -cs, -ei, dg, du}

{bt, -bz, -bn, cf, bh, ck, -bi, -ce, bo, bv, -bu, -bs, ca, bm, -cg, -bg, -cj, bj, cd, -bp, -bx, bv, br, -cb, -bl, ch, bf, ci, -bk, -cc, bq, bw, -bw, -bq, cc, bk, -ci, -bf, -ch, bl, cb, -br, -bv, bx, bp, -cd, -bj, cj, bg, cg, -bm, -ca, bs, bu, -by, -bo, ce, bi, -ck, -bh, -cf, bn, bz, -bt}

{d_, -dy, -de, ei, cu, -es, -cl, -er, cv, eh, -df, -dx, dp, dn, -dz, -dd, ej, ct, -et, -cm, -eq, cw, eg, -dg, -dw, dq, dm, -ea, -dc, ek, cs, -eu, -cn, -ep, cx, ef, -dh, -dv, dr, dl, -eb, -db, el, cr, -ev, -co, -eo, cy, ee, -di, -du, ds, dk, -ec, -da, em, cq, -ew, -cp, -en, cz, ed, -dj, -dt}

{aw, -ay, -au, ba, as, -bc, -aq, be, ap, bd, -ar, -bb, at, az, -av, -ax, ax, av, -az, -at, bb, ar, -bd, -ap, -be, aq, bc, -as, -ba, au, ay, -aw, -aw, ay, au, -ba, -as, bc, aq, -be, -ap, -bd, ar, bb, -at, -az, av, ax, -ax, -av, az, at, -bb, -ar, bd, ap, be, -aq, -bc, as, ba, -au, -ay, aw}

{dp, -dv, -dj, eb, dd, -eh, -cx, en, cr, -et, -cl, -eu, cq, eo, -cw, -ei, dc, ec, -di, -dw, d_, dq, -du, -dk, ea, de, -eg, -cy, em, cs, -es, -cm, -ev, cp, ep, -cv, -ej, db, ed, -dh, -dx, dn, dr, -dt, -dl, dz, df, -ef, -cz, el, ct, -er, -cn, -ew, co, eq, -cu, -ek, da, ee, -dg, -dy, dm, ds}

{bu, -bw, -bs, by, bq, -ca, -bo, cc, bm, -ce, -bk, cg, bi, -ci, -bg, ck, bf, cj, -bh, -ch, bj, cf, -bl, -cd, bn, cb, -bp, -bz, br, bx, -bt, -bv, by, bt, -bx, -br, bz, bp, -cb, -bn, cd, bl, -cf, -bj, ch, bh, -cj, -bf, -ck, bg, ci, -bi, -cg, bk, ce, -bm, -cc, bo, ca, -bq, -by, bs, bw, -bu}

{dq, -ds, -d_, du, dm, -dw, -dk, dy, di, -ea, -dg, ec, de, -ee, -dc, eg, da, -ei, -cy, ek, cw, -em, -cu, eo, cs, -eq, -cq, es, co, -eu, -cm, ew, cl, ev, -cn, -et, cp, er, -cr, -ep, ct, en, -cv, -el, cx, ej, -cz, -eh, db, ef, -dd, -ed, df, eb, -dh, -dz, dj, dx, -dl, -dv, dn, dt, -dp, -dr}

{aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa}

{dr, -dp, -dt, dn, dv, -dl, -dx, dj, dz, -dh, -eb, df, ed, -dd, -ef, db, eh, -cz, -ej, cx, el, -cv, -en, ct, ep, -cr, -er, cp, et, -cn, -ev, cl, -ew, -cm, eu, co, -es, -cq, eq, cs, -eo, -cu, em, cw, -ek, -cy, ei, da, -eg, -dc, ee, de, -ec, -dg, ea, di, -dy, -dk, dw, dm, -du, -d_, ds, dq}

{bv, -bt, -bx, br, bz, -bp, -cb, bn, cd, -bl, -cf, bj, ch, -bh, -cj, bf, -ck, -bg, ci, bi, -cg, -bk, ce, bm, -cc, -bo, ca, bq, -by, -bs,

{bw, bu, -bu, -bw, bs, by, -bq, -ca, bo, cc, -bm, -ce, bk, cg, -bi, -ci, bg, ck, -bf, cj, bh, -ch, -bj, cf, bl, -cd, -bn, cb, bp, -bz, -br, bx, bt, -by}

{ds, -dm, -dy, dg, ee, -da, -ek, cu, eq, -co, -ew, cn, -er, -ct, el, cz, -ef, -df, dz, dl, -dt, -dr, dn, dx, -dh, -ed, db, ej, -cv, -ep, cp, ev, -cm, es, cs, -em, -cy, eg, de, -ea, -dk, du, dq, -d_, -dw, di, ec, -dc, -ei, cw, eo, -cq, -eu, cl, -et, -cr, en, cx, -eh, -dd, eb, dj, -dv, -dp}

{ax, -av, -az, at, bb, -ar, -bd, ap, -be, -aq, bc, as, -ba, -au, ay, aw, -aw, -ay, au, ba, -as, -bc, aq, be, -ap, bd, ar, -bb, -at, az, av, -ax, -ax, av, az, -at, -bb, ar, bd, -ap, be, aq, -bc, -as, ba, au, -ay, -aw, aw, ay, -au, -ba, as, bc, -aq, -be, ap, -bd, -ar, bb, at, -az, -av, ax}

{dt, -dj, -ed, cz, en, -cp, ew, cq, -em, -da, ec, dk, -ds, -du, di, ee, -cy, -eo, co, -ev, -cr, el, db, -eb, -dl, dr, dv, -dh, -ef, cx, ep, -cn, eu, cs, -ek, -dc, ea, dm, -dq, -dw, dg, eg, -cw, -eq, cm, -et, -ct, ej, dd, -dz, -dn, dp, dx, -df, -eh, cv, er, -cl, es, cu, -ei, -de, dy, d_}

{bw, -bq, -cc, bk, ci, -bf, ch, bl, -cb, -br, bv, bx, -bp, -cd, bj, cj, -bg, cg, bm, -ca, -bs, bu, by, -bo, -ce, bi, ck, -bh, cf, bn, -bz, -bt, bt, bz, -bn, -cf, bh, -ck, -bi, ce, bo, -bv, -bu, bs, ca, -bm, -cg, bg, -cj, -bj, cd, bp, -bx, -bv, br, cb, -bl, -ch, bf, -ci, -bk, cc, bq, -bw}

{du, -dg, -ei, cs, ew, -cr, ej, df, -dv, -dt, dh, eh, -ct, -ev, cq, -ek, -de, dw, ds, -di, -eg, cu, eu, -cp, el, dd, -dx, -dr, dj, ef, -cv, -et, co, -em, -dc, dy, dq, -dk, -ee, cw, es, -cn, en, db, -dz, -dp, dl, ed, -cx, -er, cm, -eo, -da, ea, d_, -dm, -ec, cy, eq, -cl, ep, cz, -eb, -dn}

{al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al, al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al}

{dv, -dd, -en, cl, -eo, -dc, dw, du, -de, -em, cm, -ep, -db, dx, dt, -df, -el, cn, -eq, -da, dy, ds, -dg, -ek, co, -er, -cz, dz, dr, -dh, -ej, cp, -es, -cy, ea, dq, -di, -ei, cq, -et, -cx, eb, dp, -dj, -eh, cr, -eu, -cw, ec, d_, -dk, -eg, cs, -ev, -cv, ed, dn, -dl, -ef, ct, -ew, -cu, ee, dm}

{bx, -bn, -ch, bg, -ce, -bq, bu, ca, -bk, -ck, bj, -cb, -bt, br, cd, -bh, ci, bm, -by, -bw, bo, cg, -bf, cf, bp, -bv, -bz, bl, cj, -bi, cc, bs, -bs, -cc, bi, -cj, -bl, bz, bv, -bp, -cf, bf, -cg, -bo, bw, by, -bm, -ci, bh, -cd, -br, bt, cb, -bj, ck, bk, -ca, -bu, bq, ce, -bg, ch, bn, -bx}

{dw, -da, -es, cr, -ef, -dn, dj, ej, -cn, eo, de, -ds, -ea, cw, ew, -cv, eb, dr, -df, -en, cm, -ek, -di, d_, ee, -cs, et, cz, -dx, -dv, db, er, -cq, eg, dm, -dk, -ei, co, -ep, -dd, dt, dz, -cx, -ev, cu, -ec, -dq, dg, em, -cl, el, dh, -dp, -ed, ct, -eu, -cy, dy, du, -dc, -eq, cp, -eh, -dl}

{ay, -as, -be, ar, -az, -ax, at, bd, -aq, ba, aw, -au, -bc, ap, -bb, -av, av, bb, -ap, bc, au, -aw, -ba, aq, -bd, -at, ax, az, -ar, be, as, -ay, -ay, as, be, -ar, az, ax, -at, -bd, aq, -ba, -aw, au, bc, -ap, bb, av, -av, -bb, ap, -bc, -au, aw, ba, -aq, bd, at, -ax, -az, ar, -be, -as, ay}

{dx, -cx, ew, cy, -dw, -dy, cw, -ev, -cz, dv, dz, -cv, eu, da, -du, -ea, cu, -et, -db, dt, eb, -ct, es, dc, -ds, -ec, cs, -er, -dd, dr, ed, -cr, eq, de, -dq, -ee, cq, -ep, -df, dp, ef, -cp, eo, dg, -d_, -eg, co, -en, -dh, dn, eh, -cn, em, di, -dm, -ei, cm, -el, -dj, dl, ej, -cl, ek, dk}

{by, -bk, cj, bn, -bv, -cb, bh, -cg, -bq, bs, ce, -bf, cd, bt, -bp, -ch, bi, -ca, -bw, bm, ck, -bl, bx, bz, -bj, ci, bo, -bu, -cc, bg, -cf, -br, br, cf, -bg, cc, bu, -bo, -ci, bj, -bz, -bx, bl, -ck, -bm, bw, ca, -bi, ch, bp, -bt, -cd, bf, -ce, -bs, bq, cg, -bh, cb, bv, -bn, -cj, bk, -by}

{dy, -cu, er, df, -dn, -ej, cm, -eg, -dq, dc, eu, -cx, dv, eb, -cr, eo, di, -dk, -em, cp, -ed, -dt, cz, -ew, -da, ds, ee, -co, el, dl,

-dh, -ep, cs, -ea, -dw, cw, -et, -dd, dp, eh, -cl, ei, d_, -de, -es, cv, -dx, -dz, ct, -eq, -dg, dm, ek, -cn, ef, dr, -db, -ev, cy, -du, -ec, cq, -en, -dj}

{af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af}

{dz, -cr, em, dm, -de, -eu, cz, -dr, -eh, cm, -ee, -du, cw, -er, -dh, dj, ep, -cu, dw, ec, -co, ej, dp, -db, ew, dc, -d_, -ek, cp, -eb, -dx, ct, -eo, -dk, dg, es, -cx, dt, ef, -cl, eg, ds, -cy, et, df, -dl, -en, cs, -dy, -ea, cq, -el, -dn, dd, ev, -da, dq, ei, -cn, ed, dv, -cv, eq, di}

{bz, -bh, ce, bu, -bm, cj, bp, -br, -ch, bk, -bw, -cc, bf, -cb, -bx, bj, -cg, -bs, bo, ck, -bn, bt, cf, -bi, by, ca, -bg, cd, bv, -bl, ci, bq, -bq, -ci, bl, -bv, -cd, bg, -ca, -by, bi, -cf, -bt, bn, -ck, -bo, bs, cg, -bj, bx, cb, -bf, cc, bw, -bk, ch, br, -bp, -cj, bm, -bu, -ce, bh, -bz}

{ea, -co, eh, dt, -cv, eo, dm, -dc, ev, df, -dj, -er, cy, -dq, -ek, cr, -dx, -ed, cl, -ee, -dw, cs, -el, -dp, cz, -es, -di, dg, eu, -db, dn, en, -cu, du, eg, -cn, eb, dz, -cp, ei, ds, -cw, ep, dl, -dd, ew, de, -dk, -eq, cx, -dr, -ej, cq, -dy, -ec, cm, -ef, -dv, ct, -em, -d_, da, -et, -dh}

{az, -ap, ba, ay, -aq, bb, ax, -ar, bc, aw, -as, bd, av, -at, be, au, -au, -be, at, -av, -bd, as, -aw, -bc, ar, -ax, -bb, aq, -ay, -ba, ap, -az, -az, ap, -ba, -ay, aq, -bb, -ax, ar, -bc, -aw, as, -bd, -av, at, -be, -au, au, be, -at, av, bd, -as, aw, bc, -ar, ax, bb, -aq, ay, ba, -ap, az}

{eb, -cl, ec, ea, -cm, ed, dz, -cn, ee, dy, -co, ef, eg, dw, -cq, eh, dv, -cr, ei, du, -cs, ej, dt, -ct, ek, ds, -cu, el, dr, -cv, em, dq, -cw, en, dp, -cx, eo, d_, -cy, ep, dn, -cz, eq, dm, -da, er, dl, -db, es, dk, -dc, et, dj, -dd, eu, di, -de, ev, dh, -df, ew, dg}

{ca, -bf, bz, cb, -bg, by, cc, -bh, bx, cd, -bi, bw, ce, -bj, bv, cf, -bk, bu, cg, -bl, bt, ch, -bm, bs, ci, -bn, br, cj, -bo, bq, ck, -bp, bp, -ck, -bq, bo, -cj, -br, bn, -ci, -bs, bm, -ch, -bt, bl, -cg, -bu, bk, -cf, -bv, bj, -ce, -bw, bi, -cd, -bx, bh, -cc, -by, bg, -cb, -bz, bf, -ca}

{ec, -cn, dx, eh, -cs, ds, em, -cx, dn, er, -dc, di, ew, -dh, dd, -es, -dm, cy, -en, -dr, ct, -ei, -dw, co, -ed, -eb, cm, -dy, -eg, cr, -dt, -el, cw, -d_, -eq, db, -dj, -ev, dg, -de, et, dl, -cz, eo, dq, -cu, ej, dv, -cp, ee, ea, -cl, dz, ef, -cq, du, ek, -cv, dp, ep, -da, dk, eu, -df}

{am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am, am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am}

{ed, -cq, ds, eo, -db, dh, -eu, -dm, cw, -ej, -dx, cl, -dy, -ei, cv, -dn, -et, dg, -dc, ep, dr, -cr, ee, ec, -cp, dt, en, -da, di, -ev, -dl, cx, -ek, -dw, cm, -dz, -eh, cu, -d_, -es, df, -dd, eq, dq, -cs, ef, eb, -co, du, em, -cz, dj, -ew, -dk, cy, -el, -dv, cn, -ea, -eg, ct, -dp, -er, de}

{cb, -bi, bu, ci, -bp, bn, -cg, -bw, bg, -bz, -cd, bk, -bs, -ck, br, -bl, ce, by, -bf, bx, cf, -bm, bq, -cj, -bt, bj, -cc, -ca, bh, -bv, -ch, bo, -bo, ch, bv, -bh, ca, cc, -bj, bt, cj, -bq, bm, -cf, -bx, bf, -by, -ce, bl, -br, ck, bs, -bk, cd, bz, -bg, bw, cg, -bn, bp, -ci, -bu, bi, -cb}

{ee, -ct, dn, ev, -dk, cw, -eh, -eb, cq, -dq, -es, dh, -cz, ek, dy, -cn, dt, ep, -de, dc, -en, -dv, cl, -dw, -em, db, -df, eq, ds, -co, dz, ej, -cy, di, -et, -dp, cr, -ec, -eg, cv, -dl, ew, dm, -cu, ef, ed, -cs, d_, eu, -dj, cx, -ei, -ea, cp, -dr, -er, dg, -da, el, dx, -cm, du, eo, -dd}

{ba, -ar, av, -be, -aw, aq, -az, -bb, as, -au, bd, ax, -ap, ay, bc, -at, at, -bc, -ay, ap, -ax, -bd, au, -as, bb, az, -aq, aw, be, -av, ar, -ba, -ba, ar, -av, be, aw, -aq, az, bb, -as, au, -bd, -ax, ap, -ay, -bc, at, -at, bc, ay, -ap, ax, bd, -au, as, -bb, -az, aq, -aw, -be, av, -ar, ba}

{ef, -cw, di, -er, -dt, cl, -du, -eq, dh, -cx, eg, ee, -cv, dj, -es, -ds, cm, -dv, -ep, dg, -cy, eh, ed, -cu, dk, -et, -dr, cn, -dw, -eo, df, -cz, ei, ec, -ct, dl, -eu, -dq, co, -dx, -en, de, -da, ej, eb, -cs, dm, -ev, -dp, cp, -dy, -em, dd, -db, ek, ea, -cr, dn, -ew, -d_, cq, -dz, -el, dc}

{cc, -bl, bp, -cg, -by, bh, -bt, ck, bu, -bg, bx, ch, -bq, bk, -cb, -cd, bm, -bo, cf, bz, -bi, bs, -cj, -bv, bf, -bw, -ci, br, -bj, ca, ce, -bn, bn, -ce, -ca, bj, -br, ci, bw, -bf, bv, cj, -bs, bi, -bz, -cf, bo, -bm, cd, cb, -bk, bq, -ch, -bx, bg, -bu, -ck, bt, -bh, by, cg, -bp, bl, -cc}

{eg, -cz, dd, -ek, -ec, cv, -dh, eo, dy, -cr, dl, -es, -du, cn, -dp, ew, dq, -cm, dt, et, -dm, cq, -dx, -ep, di, -cu, eb, el, -de, cy, -ef, -eh, da, -dc, ej, ed, -cw, dg, -en, -dz, cs, -dk, er, dv, -co, d_, -ev, -dr, cl, -ds, -eu, dn, -cp, dw, eq, -dj, ct, -ea, -em, df, -cx, ee, ei, -db}

{ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac}

{eh, -dc, cy, -ed, -el, dg, -cu, dz, ep, -dk, cq, -dv, -et, d_, -cm, dr, -ew, -ds, cn, -dn, es, dw, -cr, dj, -eo, -ea, cv, -df, ek, ee, -cz, db, -eg, -ei, dd, -cx, ec, em, -dh, ct, -dy, -eq, dl, -cp, du, eu, -dp, cl, -dq, ev, dt, -co, dm, -er, -dx, cs, -di, en, eb, -cw, de, -ej, -ef, da}

{cd, -bo, bk, -bz, -ch, bs, -bg, bv, -ck, -bw, bh, -br, cg, ca, -bl, bn, -cc, -ce, bp, -bj, by, ci, -bt, bf, -bu, cj, bx, -bi, bq, -cf, -cb, bm, -bm, cb, cf, -bq, bi, -bx, -cj, bu, -bf, bt, -ci, -by, bj, -bp, ce, cc, -bn, bl, -ca, -cg, br, -bh, bw, ck, -bv, bg, -bs, ch, bz, -bk, bo, -cd}

{ei, -df, ct, -dw, -eu, dr, -co, dk, -en, -ed, da, -cy, eb, ep, -dm, cm, -dp, es, dy, -cv, dd, -eg, -ek, dh, -cr, du, ew, -dt, cq, -di, el, ef, -dc, cw, -dz, -er, d_, -cl, dn, -eq, -ea, cx, -db, ee, em, -dj, cp, -ds, ev, dv, -cs, dg, -ej, -eh, de, -cu, dx, et, -dq, cn, -dl, eo, ec, -cz}

{bb, -au, aq, -ax, be, ay, -ar, at, -ba, -bc, av, -ap, aw, -bd, -az, as, -as, az, bd, -aw, ap, -av, bc, ba, -at, ar, -ay, -be, ax, -aq, au, -bb, -bb, au, -aq, ax, -be, -ay, ar, -at, ba, bc, -av, ap, -aw, bd, az, -as, as, -az, -bd, aw, -ap, av, -bc, -ba, at, -ar, ay, be, -ax, aq, -au, bb}

{ej, -di, co, -dp, eq, ec, -db, cv, -dw, -ew, dv, -cu, dc, -ed, -ep, d_, -cn, dj, -ek, -ei, dh, -cp, dq, -er, -eb, da, -cw, dx, ev, -du, ct, -dd, ee, eo, -dn, cm, -dk, el, eh, -dg, cq, -dr, es, ea, -cz, cx, -dy, -eu, dt, -cs, de, -ef, -en, dm, -cl, dl, -em, -eg, df, -cr, ds, -et, -dz, cy}

{ce, -br, bf, -bs, cf, cd, -bq, bg, -bt, cg, cc, -bp, bh, -bu, ch, cb, -bo, bi, -bv, ci, ca, -bn, bj, -bw, cj, bz, -bm, bk, -bx, ck, by, -bl, bl, -by, ck, bx, -bk, bm, -bz, -cj, bw, -bj, bn, -ca, -ci, bv, -bi, bo, -cb, -ch, bu, -bh, bp, -cc, -cg, bt, -bg, bq, -cd, -cf, bs, -bf, br, -ce}

{ek, -dl, cm, -di, eh, en, -d_, cp, -df, ee, eq, -dr, cs, -dc, eb, et, -du, cv, -cz, dy, ew, -dx, cy, -cw, dv, -eu, -ea, db, -ct, ds, -er, -ed, de, -cq, dp, -eo, -eg, dh, -cn, dm, -el, -ej, dk, -cl, dj, -ei, -em, dn, -co, dg, -ef, -ep, dq, -cr, dd, -ec, -es, dt, -cu, da, -dz, -ev, dw, -cx}

{an, -ak, ah, -aj, am, ao, -al, ai, -ai, al, -ao, -am, aj, -ah, ak, -an, -an, ak, -ah, aj, -am, -ao, al, -ai, ai, -al, ao, am, -aj, ah, -ak, an, an, -ak, ah, -aj, am, ao, -al, ai, -ai, al, -ao, -am, aj, -ah, ak, -an, -an, ak, -ah, aj, -am, -ao, al, -ai, ai, -al, ao, am, -aj, ah, -ak, an}

{el, -d_, cr, -db, dy, -ev, -eb, de, -co, dl, -ei, -eo, dr, -cu, cy, -dv, es, ee, -dh, cl, -di, ef, er, -du, cx, -cv, ds, -ep, -eh, dk,

-cn, df, -ec, -eu, dx, -da, cs, -dp, em, ek, -dn, cq, -dc, dz, -ew, -ea, dd, -cp, dm, -ej, -en, dq, -ct, cz, -dw, et, ed, -dg, cm, -dj, eg, eq, -dt, cw}

{cf, -bu, bj, -bl, bw, -ch, -cd, bs, -bh, bn, -by, cj, cb, -bq, bf, -bp, ca, ck, -bz, bo, -bg, br, -cc, -ci, bx, -bm, bi, -bt, ce, cg, -bv, bk, -bk, bv, -cg, -ce, bt, -bi, bm, -bx, ci, cc, -br, bg, -bo, bz, -ck, -ca, bp, -bf, bq, -cb, -cj, by, -bn, bh, -bs, cd, ch, -bw, bl, -bj, bu, -cf}

{em, -dr, cw, -cu, dp, -ek, -eo, dt, -cy, cs, -dn, ei, eq, -dv, da, -cq, dl, -eg, -es, dx, -dc, co, -dj, ee, eu, -dz, de, -cm, dh, -ec, -ew, eb, -dg, cl, -df, ea, -ev, -ed, di, -cn, dd, -dy, et, ef, -dk, cp, -db, dw, -er, -eh, dm, -cr, cz, -du, ep, ej, -d_, ct, -cx, ds, -en, -el, dq, -cv}

{bc, -ax, as, -aq, av, -ba, -be, az, -au, ap, -at, ay, -bd, -bb, aw, -ar, ar, -aw, bb, bd, -ay, at, -ap, au, -az, be, ba, -av, aq, -as, ax, -bc, -bc, ax, -as, aq, -av, ba, be, -az, au, -ap, at, -ay, bd, bb, -aw, ar, -ar, aw, -bb, -bd, ay, -at, ap, -au, az, -be, -ba, av, -aq, as, -ax, be}

{en, -du, db, -cn, dg, -dz, es, ei, -dp, cw, -cs, dl, -ee, -ew, ed, -dk, cr, -cx, dq, -ej, -er, dy, -df, cm, -dc, dv, -eo, -em, dt, -da, co, -dh, ea, -et, -eh, d_, -cv, ct, -dm, ef, ev, -ec, dj, -cq, cy, -dr, ek, eq, -dx, de, -cl, dd, -dw, ep, el, -ds, cz, -cp, di, -eb, eu, eg, -dn, cu}

{cg, -bx, bo, -bf, bn, -bw, cf, ch, -by, bp, -bg, bm, -bv, ce, ci, -bz, bq, -bh, bl, -bu, cd, cj, -ca, br, -bi, bk, -bt, cc, ck, -cb, bs, -bj, bj, -bs, cb, -ck, -cc, bt, -bk, bi, -br, ca, -cj, -cd, bu, -bl, bh, -bq, bz, -ci, -ce, bv, -bm, bg, -bp, by, -ch, -cf, bw, -bn, bf, -bo, bx, -cg}

{eo, -dx, dg, -cp, cx, -d_, ef, -ew, -eg, dp, -cy, co, -df, dw, -en, -ep, dy, -dh, cq, -cw, dn, -ee, ev, eh, -dq, cz, -cn, de, -dv, em, eq, -dz, di, -cr, cv, -dm, ed, -eu, -ei, dr, -da, cm, -dd, du, -el, -er, ea, -dj, cs, -cu, dl, -ec, et, ej, -ds, db, -cl, dc, -dt, ek, es, -eb, dk, -ct}

{ag, -af, ae, -ad, ad, -ae, af, -ag, -ag, af, -ae, ad, -ad, ae, -af, ag, ag, -af, ae, -ad, ad, -ae, af, -ag, -ag, af, -ae, ad, -ad, ae, -af, ag, ag, -af, ae, -ad, ad, -ae, af, -ag, -ag, af, -ae, ad, -ad, ae, -af, ag, ag, -af, ae, -ad, ad, -ae, af, -ag, -ag, af, -ae, ad, -ad, ae, -af, ag}

{ep, -ea, dl, -cw, co, -dd, ds, -eh, ew, ei, -dt, de, -cp, cv, -dk, dz, -eo, -eq, eb, -dm, cx, -cn, dc, -dr, eg, -ev, -ej, du, -df, cq, -cu, dj, -dy, en, er, -ec, dn, -cy, cm, -db, dq, -ef, eu, ek, -dv, dg, -cr, ct, -di, dx, -em, -es, ed, -d_, cz, -cl, da, -dp, ee, -et, -el, dw, -dh, cs}

{ch, -ca, bt, -bm, bf, -bl, bs, -bz, cg, ci, -cb, bu, -bn, bg, -bk, br, -by, cf, cj, -cc, bv, -bo, bh, -bj, bq, -bx, ce, ck, -cd, bw, -bp, bi, -bi, bp, -bw, cd, -ck, -ce, bx, -bq, bj, -bh, bo, -bv, cc, -cj, -cf, by, -br, bk, -bg, bn, -bu, cb, -ci, -cg, bz, -bs, bl, -bf, bm, -bt, ca, -ch}

{eq, -ed, dq, -dd, cq, -cs, df, -ds, ef, -es, -eo, eb, -d_, db, -co, cu, -dh, du, -eh, eu, em, -dz, dm, -cz, cm, -cw, dj, -dw, ej, -ew, -ek, dx, -dk, cx, -cl, cy, -dl, dy, -el, -ev, ei, -dv, di, -cv, cn, -da, dn, -ea, en, et, -eg, dt, -dg, ct, -cp, dc, -dp, ec, -ep, -er, ee, -dr, de, -cr}

{bd, -ba, ax, -au, ar, -ap, as, -av, ay, -bb, be, bc, -az, aw, -at, aq, -aq, at, -aw, az, -bc, -be, bb, -ay, av, -as, ap, -ar, au, -ax, ba, -bd, -bd, ba, -ax, au, -ar, ap, -as, av, -ay, bb, -be, -bc, az, -aw, at, -aq, aq, -at, aw, -az, bc, be, -bb, ay, -av, as, -ap, ar, -au, ax, -ba, bd}

{er, -eg, dv, -dk, cz, -co, cs, -dd, d_, -dz, ek, -ev, -en, ec, -dr, dg, -cv, cl, -cw, dh, -ds, ed, -eo, -eu, ej, -dy, dn, -dc, cr, -cp, da, -dl, dw, -eh, es, eq, -ef, du, -dj, cy, -cn, ct, -de, dp, -ea, el, -ew, -em, eb, -dq, df, -cu, cm, -cx, di, -dt, ee, -ep, -et, ei, -dx, dm, -db, cq}

{ci, -cd, by, -bt, bo, -bj, bf, -bk, bp, -bu, bz, -ce, cj, ch, -cc, bx, -bs, bn, -bi, bg, -bl, bq, -bv, ca, -cf, ck, cg, -cb, bw, -br, bm, -bh, bh, -bm, br, -bw, cb, -cg, -ck, cf, -ca, bv, -bq, bl, -bg, bi, -bn, bs, -bx, cc, -ch, -cj, ce, -bz, bu, -bp, bk, -bf, bj, -bo, bt, -by, cd, -ci}

{es, -ej, ea, -dr, di, -cz, cq, -co, cx, -dg, dp, -dy, eh, -eq, -eu, el, -ec, dt, -dk, db, -cs, cm, -cv, de, -dn, dw, -ef, eo, ew, -en, ee, -dv, dm, -dd, cu, -cl, ct, -dc, dl, -du, ed, -em, ev, ep, -eg, dx, -d_, df, -cw, cn, -cr, da, -dj, ds, -eb, ek, -et, -er, ei, -dz, dq, -dh, cy, -cp}

{ao, -an, am, -al, ak, -aj, ai, -ah, ah, -ai, aj, -ak, al, -am, an, -ao, -ao, an, -am, al, -ak, aj, -ai, ah, -ah, ai, -aj, ak, -al, am, -an, ao, ao, -an, am, -al, ak, -aj, ai, -ah, ah, -ai, aj, -ak, al, -am, an, -ao, -ao, an, -am, al, -ak, aj, -ai, ah, -ah, ai, -aj, ak, -al, am, -an, ao}

{et, -em, ef, -dy, dr, -dk, dd, -cw, cp, -cn, cu, -db, di, -dp, dw, -ed, ek, -er, -ev, eo, -eh, ea, -dt, dm, -df, cy, -cr, cl, -cs, cz, -dg, dn, -du, eb, -ei, ep, -ew, -eq, ej, -ec, dv, -d_, dh, -da, ct, -cm, cq, -cx, de, -dl, ds, -dz, eg, -en, eu, es, -el, ee, -dx, dq, -dj, dc, -cv, co}

{cj, -cg, cd, -ca, bx, -bu, br, -bo, bl, -bi, bf, -bh, bk, -bn, bq, -bt, bw, -bz, cc, -cf, ci, ck, -ch, ce, -cb, by, -bv, bs, -bp, bm, -bj, bg, -bg, bj, -bm, bp, -bs, bv, -by, cb, -ce, ch, -ck, -ci, cf, -cc, bz, -bw, bt, -bq, bn, -bk, bh, -bf, bi, -bl, bo, -br, bu, -bx, ca, -cd, cg, -cj}

{eu, -ep, ek, -ef, ea, -dv, dq, -dl, dg, -db, cw, -cr, cm, -co, ct, -cy, dd, -di, dn, -ds, dx, -ec, eh, -em, er, -ew, -es, en, -ei, ed, -dy, dt, -d_, dj, -de, cz, -cu, cp, -cl, cq, -cv, da, -df, dk, -dp, du, -dz, ee, -ej, eo, -et, -ev, eq, -el, eg, -eb, dw, -dr, dm, -dh, dc, -cx, cs, -cn}

{be, -bd, bc, -bb, ba, -az, ay, -ax, aw, -av, au, -at, as, -ar, aq, -ap, ap, -aq, ar, -as, at, -au, av, -aw, ax, -ay, az, -ba, bb, -bc, bd, -be, -be, bd, -bc, bb, -ba, az, -ay, ax, -aw, av, -au, at, -as, ar, -aq, ap, -ap, aq, -ar, as, -at, au, -av, aw, -ax, ay, -az, ba, -bb, bc, -bd, be}

{ev, -es, ep, -em, ej, -eg, ed, -ea, dx, -du, dr, -d_, dl, -di, df, -dc, cz, -cw, ct, -cq, cn, -cl, co, -cr, cu, -cx, da, -dd, dg, -dj, dm, -dp, ds, -dv, dy, -eb, ee, -eh, ek, -en, eq, -et, ew, eu, -er, eo, -el, ei, -ef, ec, -dz, dw, -dt, dq, -dn, dk, -dh, de, -db, cy, -cv, cs, -cp, cm}

{ck, -cj, ci, -ch, cg, -cf, ce, -cd, cc, -cb, ca, -bz, by, -bx, bw, -bv, bu, -bt, bs, -br, bq, -bp, bo, -bn, bm, -bl, bk, -bj, bi, -bh, bg, -bf, bf, -bg, bh, -bi, bj, -bk, bl, -bm, bn, -bo, bp, -bq, br, -bs, bt, -bu, bv, -bw, bx, -by, bz, -ca, cb, -cc, cd, -ce, cf, -cg, ch, -ci, cj, -ck}

{ew, -ev, eu, -et, es, -er, eq, -ep, eo, -en, em, -el, ek, -ej, ei, -eh, eg, -ef, ee, -ed, ec, -eb, ea, -dz, dy, -dx, dw, -dv, du, -dt, ds, -dr, dq, -dp, d_, -dn, dm, -dl, dk, -dj, di, -dh, dg, -df, de, -dd, dc, -db, da, -cz, cy, -cx, cw, -cv, cu, -ct, cs, -cr, cq, -cp, co, -cn, cm, -cl}.

In addition to DCT-2 and 4×4 DST-7, which have been employed in HEVC, an Adaptive Multiple Transform (AMT, or as known as Enhanced Multiple Transform (EMT)) scheme has been proposed for residual coding for both inter and intra coded blocks. The AMT may use multiple selected transforms from the DCT/DST families other than the current transforms in HEVC. The newly introduced transform matrices may include DST-7, DCT-8, DST-1 and DCT-5. Table 1 below shows exemplary basis functions of a selected DST/DCT.

TABLE 1

Transform basis functions of DCT-II/V/VIII and DST-I/VII for N-point input

| Transform Type | Basis function $T_i(j)$, i, j = 0, 1, ..., N − 1 |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-5 | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}, \omega_1 = \begin{cases} \sqrt{\dfrac{2}{N}} & j = 0 \\ 1 & j \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-1 | $T_i(j) = \sqrt{\dfrac{2}{N+1}} \cdot \sin\left(\dfrac{\pi \cdot (i+1) \cdot (j+1)}{N+1}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices may be quantized more accurately than the transform matrices in HEVC, with 10-bit representation instead of 8-bit in HEVC. To keep the intermediate values of the transformed coefficients within the range of 16-bit, after horizontal and after vertical transform, all the coefficients may be right shifted by 2 more bits compared to the right shift used in the current HEVC transforms. The AMT may apply to coding units (CUs) with both width and height smaller than or equal to 64, and whether AMT applies or not may be controlled by a CU level flag. When the CU level flag is equal to 0, DCT-2 may be applied in the CU to encode the residue. For luma coding block within an AMT-enabled CU, two additional flags may be signalled to identify the horizontal and vertical transform to be used.

For intra residue coding, due to the different residual statistics of different intra prediction modes, a mode-dependent transform candidate selection process may be used. Three transform subsets may be defined as shown in Table 2 below, and the transform subset may be selected based on the intra prediction mode, as specified in Table 3 below.

TABLE 2

Three pre-defined transform candidate sets

| Transform Set | Transform Candidates |
|---|---|
| 0 | DST-7 DCT-8 |
| 1 | DST-7, DST-1 |
| 2 | DST-7, DCT-5 |

With the subset concept, a transform subset may be first identified based on Table 3 using the intra prediction mode of a CU with a CU-level AMT flag that is equal to 1. After that, for each of the horizontal transform and the vertical transform, one of the two transform candidates in the identified transform subset, according to Table 2, may be selected based on being explicitly signalled with flags.

TABLE 3

Selected (H)orizontal and (V)ertical transform sets for each intra prediction mode

| | Intra Mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| | Intra Mode | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| | Intra Mode | | | | | | | | | | | | | | | | | |
|---|---|---|---|---|---|---|---|---|---|---|---|---|---|---|---|---|---|---|
| | 35 | 36 | 37 | 38 | 39 | 40 | 41 | 42 | 43 | 44 | 45 | 46 | 47 | 48 | 49 | 50 | 51 | 52 |
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| | Intra Mode | | | | | | | | | | | | | |
|---|---|---|---|---|---|---|---|---|---|---|---|---|---|---|
| | 53 | 54 | 55 | 56 | 57 | 58 | 59 | 60 | 61 | 62 | 63 | 64 | 65 | 66 |
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

However, for inter prediction residual, only one transform set, which consists of DST-7 and DCT-8, may be used for all inter modes and for both horizontal and vertical transforms. Among the four additional transform types, i.e., DST-7, DCT-8, DST-1 and DCT-5, the most efficiently used transform types are DST-7 and DCT-8. It is noted that DCT-8 is essentially flipping DST-7 basis left and right with sign changes, so DCT-8 and DST-7 may basically share the same transform bases.

The transform core, which is a matrix composed by the basis vectors, of DST-7 can be also be represented as shown below:

4-point DST-7:

a, b, c, d
c, c, 0, −c
d, −a, −c, b
b, −d, c, −a 8-point DST-7:

a, b, c, d, e, f, g, h
c, f, h, e, b, −a, −d, −g
e, g, b, −c, −h, −d, a, f
g, c, −d, −f a, h, b, −e
h, −a, −g, b, f, −c, −e, d
f, −e, −a, g, −d, −b, h, −c
d, −h, e, −a, −c, g, −f, b
b, −d, f, −h, g, −e, c, −a 16-point DST-7:

a, b, c, d, e, f, g, h, i, j, k, l, m, n, o, p
c, f, i, l, o, o, l, i, f, c, 0, −c, −f, −i, −l, −o
e, j, o, m, h, c, −b, −g, −l, −p, −k, −f −a, d, i, n
g, n, l, e, −b, −i, −p, −j, −c, d, k, o, h, a, −f, −m
i, o, f, −c, −l, −l, −c, f, o, i, 0, −i, −o, −f, c, l
k, k, 0, −k, −k, 0, k, k, 0, −k, −k, 0, k, k, 0, −k
m, g, −f, −n, −a, l, h, −e, −o, −b, k, i, −d, −p, −c, j
o, c, −l, −f, i, i, −f, −l, c, o, 0, −o, −c, l, f, −i
p, −a, −o, b, n, −c, −m, d, l, −e, −k, f, j, −g, −i, h
n, −e, −i, j, d, −o, a, m, −f, −h, k, c, −p, b, l, −g
i, −i, −c, o, −f, −f, o, −c, −i, l, 0, −l, i, c, −o, f
j, −m, c, g, −p, f, d, −n, i, a, −k, l, −b, −h, o, −e
h, −p, i, −a, −g, o, −j, b, f, −n, k, −c, −e, m, −l, d
f, −l, o, −i, c, c, −i, o, −l, f, 0, −f, l, −o, i, −c
d, −h, l, −p, m, −i, e, −a, −c, g, −k, o, −n, j, −f, b
b, −d, f, −h, j, −l, n, −p, o, −m, k, −i, g, −e, c, −a 32-point DST-7:

a, b, c, d, e, f, g, h, i, j, k, l, m, n, o, p, q, r, s, t, u, v, w, x, y, z, A, B, C, D, E, F
c, f, i, l, o, r, u, x, A, D, F, C, z, w, t, q, n, k, h, e, b, −a, −d, −g, −j, −m, −p, −s, −v, −y, −B, −E

-continued

| |
|---|
| e, j, o, t, y, D, D, y, t, o, j, e, 0, −e, −j, −o, −t, −y, −D, −D, −y, −t, −o, −j, −e, 0, e, j, o, t, y, D |
| g, n, u, B, D, w, p, i, b, −e, −l, −s, −z, −F, −y, −r, −k, −d, c, j, q, x, E, A, t, m, f, −a, −h, −o, −v, −C |
| i, r, A, C, t, k, b, −g, −p, −y, −E, −v, −m, −d, e, n, w, F, x, o, f, −c, −l, −u, −D, −z, −q, −h, a, j, s, B |
| k, v, F, u, j, −a, −l, −w, −E, −t, −i, b, m, x, D, s, h, −c, −n, −y, −C, −r, −g, d, o, z, B, q, f, −e, −p, −A |
| m, z, z, m, 0, −m, −z, −z, −m, 0, m, z, z, m, 0, −m, −z, −z, −m, 0, m, z, z, m, 0, −m, −z, −z, −m, 0, m, z |
| o, D, t, e, −j, −y, −y, −j, e, t, D, o, 0, −o, −D, −t, −e, j, y, y, j, −e, −t, −D, −o, 0, o, D, t, e, −j, −y |
| q, E, n, −c, −t, −B, −k, f, w, y, h, −i, −z, −v, −e, l, C, s, b, −o, −F, −p, a, r, D, m, −d, −u, −A, −j, g, x |
| s, A, h, −k, −D, −p, c, v, x, e, −n, −F, −m, f, y, u, b, −q, −C, −j, i, B, r, −a, −t, −z, −g, l, E, o, −d, −w |
| u, w, b, −s, −y, −d, q, A, f, −o, −C, −h, m, E, j, −k, −F, −l, i, D, n, −g, −B, −p, e, z, r, −c, −x, −t, a, v |
| w, s, −d, −A, −o, h, E, k, −l, −D, −g, p, z, c, −t, −v, a, x, r, −e, −B, −n, i, F, j, −m, −C, −f, q, y, b, −u |
| y, o, −j, −D, −e, t, t, −e, −D, −j, o, y, 0, −y, −o, j, D, e, −t, −t, e, D, j, −o, −y, 0, y, o, −j, −D, −e, t |
| A, k, −p, −v, e, F, f, −u, −q, j, B, a, −z, −l, o, w, −d, −E, −g, t, r, −i, −C, −b, y, m, −n, −x, c, D, h, −s |
| C, g, −v, −n, o, u, −h, −B, a, D, f, −w, −m, p, t, −i, −A, b, E, e, −x, −l, q, s, −j, −z, c, F, d, −y, −k, r |
| E, c, −B, −f, y, i, −v, −l, s, o, −p, −r, m, u, −j, −x, g, A, −d, −D, a, F, b, −C, −e, z, h, −w, −k, t, n, −q |
| F, −a, −E, b, D, −c, −C, d, B, −e, −A, f, z, −g, −y, h, x, −i, −w, j, v, −k, −u, l, t, −m, −s, n, r, −o, −q, p |
| D, −e, −y, j, t, −o, −o, t, j, −y, −e, D, 0, −D, e, y, −j, −t, o, o, −t, −j, y, e, −D, 0, D, −e, −y, j, t, −o |
| B, −i, −s, r, j, −A, −a, C, −h, −t, q, k, −z, −b, D, −g, −u, p, l, −y, −c, E, −f, −v, o, m, −x, −d, F, −e, −w, n |
| z, −m, −m, z, 0, −z, m, m, −z, 0, z, −m, −m, z, 0, −z, m, m, −z, 0, z, −m, −m, z, 0, −z, m, m, −z, 0, z, −m |
| x, −q, −g, E, −j, −n, A, −c, −u, t, d, −B, m, k, −D, f, r, −w, −a, y, −p, −h, F, −i, −o, z, −b, −v, s, e, −C, l |
| v, −u, −a, w, −t, −b, x, −s, −c, y, −r, −d, z, −q, −e, A, −p, −f, B, −o, −g, C, −n, −h, D, −m, −i, E, −l, −j, F, −k |
| t, −y, e, o, −D, j, j, −D, o, e, −y, t, 0, −t, y, −e, −o, D, −j, −j, D, −o, −e, y, −t, 0, t, −y, e, o, −D, j |
| r, −C, k, g, −y, v, −d, −n, F, −o, −c, u, −z, h, j, −B, s, −a, −q, D, −l, −f, x, −w, e, m, −E, p, b, −t, A, −i |
| p, −F, q, −a, −o, E, −r, b, n, −D, s, −c, −m, C, −t, d, l, −B, u, −e, −k, A, −v, f, j, −z, w, −g, −i, y, −x, h |
| n, −B, w, −i, −e, s, −F, r, −d, −j, x, −A, m, a, −o, C, −v, h, f, −t, E, −q, c, k, −y, z, −l, −b, p, −D, u, −g |
| l, −x, C, −q, e, g, −s, E, −v, j, b, −n, z, −A, o, −c, −i, u, −F, t, −h, −d, p, −B, y, −m, a, k, −w, D, −r, f |
| j, −t, D, −y, o, −e, −e, o, −y, D, −t, j, 0, −j, t, −D, y, −o, e, e, −o, y, −D, t, −j, 0, j, −t, D, −y, o, −e |
| h, −p, x, −F, y, −q, i, −a, −g, o, −w, E, −z, r, −j, b, f, −n, v, −D, A, −s, k, −c, −e, m, −u, C, −B, t, −l, d |
| f, −l, r, −x, D, −C, w, −q, k, −e, −a, g, −m, s, −y, E, −B, v, −p, j, −d, −b, h, −n, t, −z, F, −A, u, −o, i, −c |
| d, −h, l, −p, t, −x, B, −F, C, −y, u, −q, m, −i, e, −a, −c, g, −k, o, −s, w, −A, E, −D, z, −v, r, −n, j, −f, b |
| b, −d, f, −h, j, −l, n, −p, r, −t, v, −x, z, −B, D, −F, E, −C, A, −y, w, −u, s, −q, o, −m, k, −i, g, −e, c, −a |

64-point DST-7:

{aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck, cl,}

{ab, ae, ah, ak, an, aq, at, aw, az, bc, bf, bi, bl, bo, br, bu, bx, ca, cd, cg, cj, cl, ci, cf, cc, bz, bw, bt, bq, bn, bk, bh, be, bb, ay, av, as, ap, am, aj, ag, ad, aa, -ac, -af, -ai, -al, -ao, -ar, -au, -ax, -ba, -bd, -bg, -bj, -bm, -bp, -bs, -bv, -by, -cb, -ce, -ch, -ck,}

{ac, ah, am, ar, aw, bb, bg, bl, bq, bv, ca, cf, ck, ci, cd, by, bt, bo, bj, be, az, au, ap, ak, af, aa, -ae, -aj, -ao, -at, -ay, -bd, -bi, -bn, -bs, -bx, -cc, -ch, -cl, -cg, -cb, -bw, -br, -bm, -bh, -bc, -ax, -as, -an, -ai, -ad, ab, ag, al, aq, av, ba, bf, bk, bp, bu, bz, ce, cj,}

{ad, ak, ar, ay, bf, bm, bt, ca, ch, cj, cc, bv, bo, bh, ba, at, am, af, -ab, -ai, -ap, -aw, -bd, -bk, -br, -by, -cf, -cl, -ce, -bx, -bq, -bj, -bc, -av, -ao, -ah, -aa, ag, an, au, bb, bi, bp, bw, cd, ck, cg, bz, bs, bl, be, ax, aq, aj, ac, -ae, -al, -as, -az, -bg, -bn, -bu, -cb, -ci,}

{ae, an, aw, bf, bo, bx, cg, ci, bz, bq, bh, ay, ap, ag, -ac, -al, -au, -bd, -bm, -bv, -ce, -ck, -cb, -bs, -bj, -ba, -ar, -ai, aa, aj, as, bb, bk, bt, cc, cl, cd, bu, bl, bc, at, ak, ab, -ah, -aq, -az, -bi, -br, -ca, -cj, -cf, -bw, -bn, -be, -av, -am, -ad, af, ao, ax, bg, bp, by, ch,}

{af, aq, bb, bm, bx, ci, ce, bt, bi, ax, am, ab, -aj, -au, -bf, -bq, -cb, -cl, -ca, -bp, -be, -at, -ai, ac, an, ay, bj, bu, cf, ch, bw, bl, ba, ap, ae, -ag, -ar, -bc, -bn, -by, -cj, -cd, -bs, -bh, -aw, -al, -aa, ak, av, bg, br, cc, ck, bz, bo, bd, as, ah, -ad, -ao, -az, -bk, -bv, -cg,}

{ag, at, bg, bt, cg, ce, br, be, ar, ae, -ai, -av, -bi, -bv, -ci, -cc, -bp, -bc, -ap, -ac, ak, ax, bk, bx, ck, ca, bn, ba, an, aa, -am, -az, -bm, -bz, -cl, -by, -bl, -ay, -al, ab, ao, bb, bo, cb, cj, bw, bj, aw, aj, -ad, -aq, -bd, -bq, -cd, -ch, -bu, -bh, -au, -ah, af, as, bf, bs, cf,}

{ah, aw, bl, ca, ci, bt, be, ap, aa, -ao, -bd, -bs, -ch, -cb, -bm, -ax, -ai, ag, av, bk, bz, cj, bu, bf, aq, ab, -an, -bc, -br, -cg, -cc, -bn, -ay, -aj, af, au, bj, by, ck, bv, bg, ar, ac, -am, -bb, -bq, -cf, -cd, -bo, -az, -ak, ae, at, bi, bx, cl, bw, bh, as, ad, -al, -ba, -bp, -ce,}

{ai, az, bq, ch, bz, bi, ar, aa, -aq, -bh, -by, -ci, -br, -ba, -aj, ah, ay, bp, cg, ca, bj, as, ab, -ap, -bg, -bx, -cj, -bs, -bb, -ak, ag, ax, bo, cf, cb, bk, at, ac, -ao, -bf, -bw, -ck, -bt, -bc, -al, af, aw, bn, ce, cc, bl, au, ad, -an, -be, -bv, -cl, -bu, -bd, -am, ae, av, bm, cd,}

{aj, bc, bv, cj, bq, ax, ae, -ao, -bh, -ca, -ce, -bl, -as, aa, at, bm, cf, bz, bg, an, -af, -ay, -br, -ck, -bu, -bb, -ai, ak, bd, bw, ci, bp, aw, ad, -ap, -bi, -cb, -cd, -bk, -ar, ab, au, bn, cg, by, bf, am, -ag, -az, -bs, -cl, -bt, -ba, -ah, al, be, bx, ch, bo, av, ac, -aq, -bj, -cc,}

{ak, bf, ca, cc, bh, am, -ai, -bd, -by, -ce, -bj, -ao, ag, bb, bw, cg, bl, aq, -ae, -az, -bu, -ci, -bn, -as, ac, ax, bs, ck, bp, au, -aa, -av, -bq, -cl, -br, -aw, -ab, at, bo, cj, bt, ay, ad, -ar, -bm, -ch, -bv, -ba, -af, ap, bk, cf, bx, bc, ah, -an, -bi, -cd, -bz, -be, -aj, al, bg, cb,}

{al, bi, cf, bv, ay, ab, -av, -bs, -ci, -bl, -ao, ai, bf, cc, by, bb, ae, -as, -bp, -cl, -bo, -ar, af, bc, bz, cb, be, ah, -ap, -bm, -cj, -br, -au, ac, az, bw, ce, bh, ak, -am, -bj, -cg, -bu, -ax, -aa, aw, bt, ch, bk, an, -aj, -bg, -cd, -bx, -ba, -ad, at, bq, ck, bn, aq, -ag, -bd, -ca,}

{am, bl, ck, bo, ap, -aj, -bi, -ch, -br, -as, ag, bf, ce, bu, av, -ad, -bc, -cb, -bx, -ay, aa, az, by, ca, bb, ac, -aw, -bv, -cd, -be, -af, at, bs, cg, bh, ai, -aq, -bp, -cj, -bk, -al, an, bm, cl, bn, ao, -ak, -bj, -ci, -bq, -ar, ah, bg, cf, bt, au, -ae, -bd, -cc, -bw, -ax, ab, ba, bz,}

{an, bo, ci, bh, ag, -au, -bv, -cb, -ba, aa, bb, cc, bu, at, -ah, -bi, -cj, -bn, -am, ao, bp, ch, bg, af, -av, -bw, -ca, -az, ab, bc, cd, bt, as, -ai, -bj, -ck, -bm, -al, ap, bq, cg, bf, ae, -aw, -bx, -bz, -ay, ac, bd, ce, bs, ar, -aj, -bk, -cl, -bl, -ak, aq, br, cf, be, ad, -ax, -by,}

{ao, br, cd, ba, -ac, -bf, -ci, -bm, -aj, at, bw, by, av, -ah, -bk, -ck, -bh, -ae, ay, cb, bt, aq, -am, -bp, -cf, -bc, aa, bd, cg, bo, al, -ar, -bu, -ca, -ax, af, bi, cl, bj, ag, -aw, -bz, -bv, -as, ak, bn, ch, be, ab, -bb, -ce, -bq, -an, ap, bs, cc, az, -ad, -bg, -cj, -bl, -ai, au, bx,}

{ap, bu, bv, at, -al, -bq, -cc, -ax, ah, bm, cg, bb, -ad, -bi, -ck, -bf, -aa, be, cj, bj, ae, -ba, -cf, -bn, -ai, aw, cb, br, am, -as, -bx, -bv, -aq, ao, bt, bz, au, -ak, -bp, -cd, -ay, ag, bl, ch, bc, -ac, -bh, -cl, -bg, -ab, bd, ci, bk, af, -az, -ce, -bo, -aj, av, ca, bs, an, -ar, -bw,}

{aq, bx, bt, am, -au, -cb, -bp, -ai, ay, cf, bl, ae, -bc, -cj, -bh, -aa, bg, ck, bd, -ad, -bk, -cg, -az, ah, bo, cc, av, -al, -bs, -by, -ar, ap, bw, bu, an, -at, -ca, -bq, -aj, ax, ce, bm, af, -bb, -ci, -bi, -ab, bf, cl, be, -ac, -bj, -ch, -ba, ag, bn, cd, aw, -ak, -br, -bz, -as, ao, bv,}

{ar, ca, bo, af, -bd, -cl, -bc, ag, bp, bz, aq, -as, -cb, -bn, -ae, be, ck, bb, -ah, -bq, -by, -ap, at, cc, bm, ad, -bf, -cj, -ba, ai, br, bx, ao, -au, -cd, -bl, -ac, bg, ci, az, -aj, -bs, -bw, -an, av, ce, bk, ab, -bh, -ch, -ay, ak, bt, bv, am, -aw, -cf, -bj, -aa, bi, cg, ax, -al, -bu,}

{as, cd, bj, -ab, -bm, -ca, -ap, av, cg, bg, -ae, -bp, -bx, -am, ay, cj, bd, -ah, -bs, -bu, -aj, bb, cl, ba, -ak, -bv, -br, -ag, be, ci, ax, -an, -by, -bo, -ad, bh, cf, au, -aq, -cb, -bl, -aa, bk, cc, ar, -at, -ce, -bi, ac, bn, bz, ao, -aw, -ch, -bf, af, bq, bw, al, -az, -ck, -bc, ai, bt,}

{at, cg, be, -ai, -bv, -bp, -ac, bk, ca, an, -az, -cl, -ay, ao, cb, bj, -ad, -bq, -bu, -ah, bf, cf, as, -au, -ch, -bd, aj, bw, bo, ab, -bl, -bz, -am, ba, ck, ax, -ap, -cc, -bi, ae, br, bt, ag, -bg, -ce, -ar, av, ci, bc, -ak, -bx, -bn, -aa, bm, by, al, -bb, -cj, -aw, aq, cd, bh, -af, -bs,}

{au, cj, az, -ap, -ce, -be, ak, bz, bj, -af, -bu, -bo, aa, bp, bt, ae, -bk, -by, -aj, bf, cd, ao, -ba, -ci, -at, av, ck, ay, -aq, -cf, -bd, al, ca, bi, -ag, -bv, -bn, ab, bq, bs, ad, -bl, -bx, -ai, bg, cc, an, -bb, -ch, -as, aw, cl, ax, -ar, -cg, -bc, am, cb, bh, -ah, -bw, -bm, ac, br,}

{av, cl, au, -aw, -ck, -at, ax, cj, as, -ay, -ci, -ar, az, ch, aq, -ba, -cg, -ap, bb, cf, ao, -bc, -ce, -an, bd, cd, am, -be, -cc, -al, bf, cb, ak, -bg, -ca, -aj, bh, bz, ai, -bi, -by, -ah, bj, bx, ag, -bk, -bw, -af, bl, bv, ae, -bm, -bu, -ad, bn, bt, ac, -bo, -bs, -ab, bp, br, aa, -bq,}

{aw, ci, ap, -bd, -cb, -ai, bk, bu, ab, -br, -bn, af, by, bg, -am, -cf, -az, at, cl, as, -ba, -ce, -al, bh, bx, ae, -bo, -bq, ac, bv, bj, -aj, -cc, -bc, aq, cj, av, -ax, -ch, -ao, be, ca, ah, -bl, -bt, -aa, bs, bm, -ag, -bz, -bf, an, cg, ay, -au, -ck, -ar, bb, cd, ak, -bi, -bw, -ad, bp,}

{ax, cf, ak, -bk, -bs, ac, bx, bf, -ap, -ck, -as, bc, ca, af, -bp, -bn, ah, cc, ba, -au, -ci, -an, bh, bv, aa, -bu, -bi, am, ch, av, -az, -cd, -ai, bm, bq, -ae, -bz, -bd, ar, cl, aq, -be, -by, -ad, br, bl, -aj, -ce, -ay, aw, cg, al, -bj, -bt, ab, bw, bg, -ao, -cj, -at, bb, cb, ag, -bo,}

{ay, cc, af, -br, -bj, an, ck, aq, -bg, -bu, ac, bz, bb, -av, -cf, -ai, bo, bm, -ak, -ch, -at, bd, bx, aa, -bw, -be, as, ci, al, -bl, -bp, ah, ce, aw, -ba, -ca, -ad, bt, bh, -ap, -cl, -ao, bi, bs, -ae, -cb, -az, ax, cd, ag, -bq, -bk, am, cj, ar, -bf, -bv, ab, by, bc, -au, -cg, -aj, bn,}

{az, bz, aa, -by, -ba, ay, ca, ab, -bx, -bb, ax, cb, ac, -bw, -bc, aw, cc, ad, -bv, -bd, av, cd, ae, -bu, -be, au, ce, af, -bt, -bf, at, cf, ag, -bs, -bg, as, cg, ah, -br, -bh, ar, ch, ai, -bq, -bi, aq, ci, aj, -bp, -bj, ap, cj, ak, -bo, -bk, ao, ck, al, -bn, -bl, an, cl, am, -bm,}

{ba, bw, -ae, -cf, -ar, bj, bn, -an, -cj, -ai, bs, be, -aw, -ca, aa, cb, av, -bf, -br, aj, ck, am, -bo, -bi, as, ce, ad, -bx, -az, bb, bv, -af, -cg, -aq, bk, bm, -ao, -ci, -ah, bt, bd, -ax, -bz, ab, cc, au, -bg, -bq, ak, cl, al, -bp, -bh, at, cd, ac, -by, -ay, bc, bu, -ag, -ch, -ap, bl,}

{bb, bt, -aj, -cl, -ai, bu, ba, -bc, -bs, ak, ck, ah, -bv, -az, bd, br, -al, -cj, -ag, bw, ay, -be, -bq, am, ci, af, -bx, -ax, bf, bp, -an, -ch, -ae, by, aw, -bg, -bo, ao, cg, ad, -bz, -av, bh, bn, -ap, -cf, -ac, ca, au, -bi, -bm, aq, ce, ab, -cb, -at, bj, bl, -ar, -cd, -aa, cc, as, -bk,}

{bc, bq, -ao, -ce, aa, cf, an, -br, -bb, bd, bp, -ap, -cd, ab, cg, am, -bs, -ba, be, bo, -aq, -cc, ac, ch, al, -bt, -az, bf, bn, -ar, -cb, ad, ci, ak, -bu, -ay, bg, bm, -as, -ca, ae, cj, aj, -bv, -ax, bh, bl, -at, -bz, af, ck, ai, -bw, -aw, bi, bk, -au, -by, ag, cl, ah, -bx, -av, bj,}

{bd, bn, -at, -bx, aj, ch, aa, -cg, -ak, bw, au, -bm, -be, bc, bo, -as, -by, ai, ci, ab, -cf, -al, bv, av, -bl, -bf, bb, bp, -ar, -bz, ah, cj, ac, -ce, -am, bu, aw, -bk, -bg, ba, bq, -aq, -ca, ag, ck, ad, -cd, -an, bt, ax, -bj, -bh, az, br, -ap, -cb, af, cl, ae, -cc, -ao, bs, ay, -bi,}

{be, bk, -ay, -bq, as, bw, -am, -cc, ag, ci, -aa, -cj, -af, cd, al, -bx, -ar, br, ax, -bl, -bd, bf, bj, -az, -bp, at, bv, -an, -cb, ah, ch, -ab, -ck, -ae, ce, ak, -by, -aq, bs, aw, -bm, -bc, bg, bi, -ba, -bo, au, bu, -ao, -ca, ai, cg, -ac, -cl, -ad, cf, aj, -bz, -ap, bt, av, -bn, -bb, bh,}

{bf, bh, -bd, -bj, bb, bl, -az, -bn, ax, bp, -av, -br, at, bt, -ar, -bv, ap, bx, -an, -bz, al, cb, -aj, -cd, ah, cf, -af, -ch, ad, cj, -ab, -cl, -aa, ck, ac, -ci, -ae, cg, ag, -ce, -ai, cc, ak, -ca, -am, by, ao, -bw, -aq, bu, as, -bs, -au, bq, aw, -bo, -ay, bm, ba, -bk, -bc, bi, be, -bg,}

{bg, be, -bi, -bc, bk, ba, -bm, -ay, bo, aw, -bq, -au, bs, as, -bu, -aq, bw, ao, -by, -am, ca, ak, -cc, -ai, ce, ag, -cg, -ae, ci, ac, -ck, -aa, cl, -ab, -cj, ad, ch, -af, -cf, ah, cd, -aj, -cb, al, bz, -an, -bx, ap, bv, -ar, -bt, at, br, -av, -bp, ax, bn, -az, -bl, bb, bj, -bd, -bh, bf,}

{bh, bb, -bn, -av, bt, ap, -bz, -aj, cf, ad, -cl, ac, cg, -ai, -ca, ao, bu, -au, -bo, ba, bi, -bg, -bc, bm, aw, -bs, -aq, by, ak, -ce, -ae, ck, -ab, -ch, ah, cb, -an, -bv, at, bp, -az, -bj, bf, bd, -bl, -ax, br, ar, -bx, -al, cd, af, -cj, aa, ci, -ag, -cc, am, bw, -as, -bq, ay, bk, -be,}

{bi, ay, -bs, -ao, cc, ae, -cl, af, cb, -ap, -br, az, bh, -bj, -ax, bt, an, -cd, -ad, ck, -ag, -ca, aq, bq, -ba, -bg, bk, aw, -bu, -am, ce, ac, -cj, ah, bz, -ar, -bp, bb, bf, -bl, -av, bv, al, -cf, -ab, ci, -ai, -by, as, bo, -bc, -be, bm, au, -bw, -ak, cg, aa, -ch, aj, bx, -at, -bn, bd,}

{bj, av, -bx, -ah, cl, -ag, -by, au, bk, -bi, -aw, bw, ai, -ck, af, bz, -at, -bl, bh, ax, -bv, -aj, cj, -ae, -ca, as, bm, -bg, -ay, bu, ak, -ci, ad, cb, -ar, -bn, bf, az, -bt, -al, ch, -ac, -cc, aq, bo, -be, -ba, bs, am, -cg, ab, cd, -ap, -bp, bd, bb, -br, -an, cf, -aa, -ce, ao, bq, -bc,}

{bk, as, -cc, -aa, cd, -ar, -bl, bj, at, -cb, -ab, ce, -aq, -bm, bi, au, -ca, -ac, cf, -ap, -bn, bh, av, -bz, -ad, cg, -ao, -bo, bg, aw, -by, -ae, ch, -an, -bp, bf, ax, -bx, -af, ci, -am, -bq, be, ay, -bw, -ag, cj, -al, -br, bd, az, -bv, -ah, ck, -ak, -bs, bc, ba, -bu, -ai, cl, -aj, -bt, bb,}

{bl, ap, -ch, ag, bu, -bc, -ay, by, ac, -cd, at, bh, -bp, -al, cl, -ak, -bq, bg, au, -cc, ab, bz, -ax, -bd, bt, ah, -ci, ao, bm, -bk, -aq, cg, -af, -bv, bb, az, -bx, -ad, ce, -as, -bi, bo, am, -ck, aj, br, -bf, -av, cb, -aa, -ca, aw, be, -bs, -ai, cj, -an, -bn, bj, ar, -cf, ae, bw, -ba,}

{bm, am, -cl, an, bl, -bn, -al, ck, -ao, -bk, bo, ak, -cj, ap, bj, -bp, -aj, ci, -aq, -bi, bq, ai, -ch, ar, bh, -br, -ah, cg, -as, -bg, bs, ag, -cf, at, bf, -bt, -af, ce, -au, -be, bu, ae, -cd, av, bd, -bv, -ad, cc, -aw, -bc, bw, ac, -cb, ax, bb, -bx, -ab, ca, -ay, -ba, by, aa, -bz, az,}

{bn, aj, -cg, au, bc, -by, ab, bv, -bf, -ar, cj, -am, -bk, bq, ag, -cd, ax, az, -cb, ae, bs, -bi, -ao, cl, -ap, -bh, bt, ad, -ca, ba, aw, -ce, ah, bp, -bl, -al, ci, -as, -be, bw, aa, -bx, bd, at, -ch, ak, bm, -bo, -ai, cf, -av, -bb, bz, -ac, -bu, bg, aq, -ck, an, bj, -br, -af, cc, -ay,}

{bo, ag, -cb, bb, at, -cj, ao, bg, -bw, ab, bt, -bj, -al, cg, -aw, -ay, ce, -aj, -bl, br, ad, -by, be, aq, -cl, ar, bd, -bz, ae, bq, -bm, -ai, cd, -az, -av, ch, -am, -bi, bu, aa, -bv, bh, an, -ci, au, ba, -cc, ah, bn, -bp, -af, ca, -bc, -as, ck, -ap, -bf, bx, -ac, -bs, bk, ak, -cf, ax,}

{bp, ad, -bw, bi, ak, -cd, bb, ar, -ck, au, ay, -cg, an, bf, -bz, ag, bm, -bs, -aa, bt, -bl, -ah, ca, -be, -ao, ch, -ax, -av, cj, -aq,

-bc, cc, -aj, -bj, bv, -ac, -bq, bo, ae, -bx, bh, al, -ce, ba, as, -cl, at, az, -cf, am, bg, -by, af, bn, -br, -ab, bu, -bk, -ai, cb, -bd, -ap, ci, -aw,}

{bq, aa, -br, bp, ab, -bs, bo, ac, -bt, bn, ad, -bu, bm, ae, -bv, bl, af, -bw, bk, ag, -bx, bj, ah, -by, bi, ai, -bz, bh, aj, -ca, bg, ak, -cb, bf, al, -cc, be, am, -cd, bd, an, -ce, bc, ao, -cf, bb, ap, -cg, ba, aq, -ch, az, ar, -ci, ay, as, -cj, ax, at, -ck, aw, au, -cl, av,}

{br, -ac, -bm, bw, -ah, -bh, cb, -am, -bc, cg, -ar, -ax, cl, -aw, -as, ch, -bb, -an, cc, -bg, -ai, bx, -bl, -ad, bs, -bq, ab, bn, -bv, ag, bi, -ca, al, bd, -cf, aq, ay, -ck, av, at, -ci, ba, ao, -cd, bf, aj, -by, bk, ae, -bt, bp, -aa, -bo, bu, -af, -bj, bz, -ak, -be, ce, -ap, -az, cj, -au,}

{bs, -af, -bh, cd, -aq, -aw, cj, -bb, -al, by, -bm, -aa, bn, -bx, ak, bc, -ci, av, ar, -ce, bg, ag, -bt, br, -ae, -bi, cc, -ap, -ax, ck, -ba, -am, bz, -bl, -ab, bo, -bw, aj, bd, -ch, au, as, -cf, bf, ah, -bu, bq, -ad, -bj, cb, -ao, -ay, cl, -az, -an, ca, -bk, -ac, bp, -bv, ai, be, -cg, at,}

{bt, -ai, -bc, ck, -az, -al, bw, -bq, af, bf, -ch, aw, ao, -bz, bn, -ac, -bi, ce, -at, -ar, cc, -bk, -aa, bl, -cb, aq, au, -cf, bh, ad, -bo, by, -an, -ax, ci, -be, -ag, br, -bv, ak, ba, -cl, bb, aj, -bu, bs, -ah, -bd, cj, -ay, -am, bx, -bp, ae, bg, -cg, av, ap, -ca, bm, -ab, -bj, cd, -as,}

{bu, -al, -ax, cg, -bi, -aa, bj, -cf, aw, am, -bv, bt, -ak, -ay, ch, -bh, -ab, bk, -ce, av, an, -bw, bs, -aj, -az, ci, -bg, -ac, bl, -cd, au, ao, -bx, br, -ai, -ba, cj, -bf, -ad, bm, -cc, at, ap, -by, bq, -ah, -bb, ck, -be, -ae, bn, -cb, as, aq, -bz, bp, -ag, -bc, cl, -bd, -af, bo, -ca, ar,}

{bv, -ao, -as, bz, -br, ak, aw, -cd, bn, -ag, -ba, ch, -bj, ac, be, -cl, bf, ab, -bi, ci, -bb, -af, bm, -ce, ax, aj, -bq, ca, -at, -an, bu, -bw, ap, ar, -by, bs, -al, -av, cc, -bo, ah, az, -cg, bk, -ad, -bd, ck, -bg, -aa, bh, -cj, bc, ae, -bl, cf, -ay, -ai, bp, -cb, au, am, -bt, bx, -aq,}

{bw, -ar, -an, bs, -ca, av, aj, -bo, ce, -az, -af, bk, -ci, bd, ab, -bg, cl, -bh, ac, bc, -ch, bl, -ag, -ay, cd, -bp, ak, au, -bz, bt, -ao, -aq, bv, -bx, as, am, -br, cb, -aw, -ai, bn, -cf, ba, ae, -bj, cj, -be, -aa, bf, -ck, bi, -ad, -bb, cg, -bm, ah, ax, -cc, bq, -al, -at, by, -bu, ap,}

{bx, -au, -ai, bl, -cj, bg, -ad, -az, cc, -bs, ap, an, -bq, ce, -bb, -ab, be, -ch, bn, -ak, -as, bv, -bz, aw, ag, -bj, cl, -bi, af, ax, -ca, bu, -ar, -al, bo, -cg, bd, -aa, -bc, cf, -bp, am, aq, -bt, cb, -ay, -ae, bh, -ck, bk, -ah, -av, by, -bw, at, aj, -bm, ci, -bf, ac, ba, -cd, br, -ao,}

{by, -ax, -ad, be, -cf, br, -aq, -ak, bl, -cl, bk, -aj, -ar, bs, -ce, bd, -ac, -ay, bz, -bx, aw, ae, -bf, cg, -bq, ap, al, -bm, ck, -bj, ai, as, -bt, cd, -bc, ab, az, -ca, bw, -av, -af, bg, -ch, bp, -ao, -am, bn, -cj, bi, -ah, -at, bu, -cc, bb, -aa, -ba, cb, -bv, au, ag, -bh, ci, -bo, an,}

{bz, -ba, ab, ax, -bw, cc, -bd, ae, au, -bt, cf, -bg, ah, ar, -bq, ci, -bj, ak, ao, -bn, cl, -bm, an, al, -bk, cj, -bp, aq, ai, -bh, cg, -bs, at, af, -be, cd, -bv, aw, ac, -bb, ca, -by, az, -aa, -ay, bx, -cb, bc, -ad, -av, bu, -ce, bf, -ag, -as, br, -ch, bi, -aj, -ap, bo, -ck, bl, -am,}

{ca, -bd, ag, aq, -bn, ck, -bq, at, ad, -ba, bx, -cd, bg, -aj, -an, bk, -ch, bt, -aw, -aa, ax, -bu, cg, -bj, am, ak, -bh, ce, -bw, az, -ac, -au, br, -cj, bm, -ap, -ah, be, -cb, bz, -bc, af, ar, -bo, cl, -bp, as, ae, -bb, by, -cc, bf, -ai, -ao, bl, -ci, bs, -av, -ab, ay, -bv, cf, -bi, al,}

{cb, -bg, al, aj, -be, bz, -cd, bi, -an, -ah, bc, -bx, cf, -bk, ap, af, -ba, bv, -ch, bm, -ar, -ad, ay, -bt, cj, -bo, at, ab, -aw, br, -cl, bq, -av, aa, au, -bp, ck, -bs, ax, -ac, -as, bn, -ci, bu, -az, ae, aq, -bl, cg, -bw, bb, -ag, -ao, bj, -ce, by, -bd, ai, am, -bh, cc, -ca, bf, -ak,}

{cc, -bj, aq, ac, -av, bo, -ch, bx, -be, al, ah, -ba, bt, -cl, bs, -az, ag, am, -bf, by, -cg, bn, -au, ab, ar, -bk, cd, -cb, bi, -ap,
-ad, aw, -bp, ci, -bw, bd, -ak, -ai, bb, -bu, ck, -br, ay, -af, -an, bg, -bz, cf, -bm, at, -aa, -as, bl, -ce, ca, -bh, ao, ae, -ax, bq, -cj, bv, -bc, aj,}

{cd, -bm, av, -ae, -am, bd, -bu, cl, -bv, be, -an, -ad, au, -bl, cc, -ce, bn, -aw, af, al, -bc, bt, -ck, bw, -bf, ao, ac, -at, bk, -cb, cf, -bo, ax, -ag, -ak, bb, -bs, cj, -bx, bg, -ap, as, -bj, ca, -cg, bp, -ay, ah, aj, -ba, br, -ci, by, -bh, aq, aa, -ar, bi, -bz, ch, -bq, az, -ai,}

{ce, -bp, ba, -al, -ad, as, -bh, bw, -cl, bx, -bi, at, -ae, -ak, az, -bo, cd, -cf, bq, -bb, am, ac, -ar, bg, -bv, ck, -by, bj, -au, af, aj, -ay, bn, -cc, cg, -br, bc, -an, -ab, aq, -bf, bu, -cj, bz, -bk, av, -ag, -ai, ax, -bm, cb, -ch, bs, -bd, ao, aa, -ap, be, -bt, ci, -ca, bl, -aw, ah,}

{cf, -bs, bf, -as, af, ah, -au, bh, -bu, ch, -cd, bq, -bd, aq, -ad, -aj, aw, -bj, bw, -cj, cb, -bo, bb, -ao, ab, al, -ay, bl, -by, cl, -bz, bm, -az, am, aa, -an, ba, -bn, ca, -ck, bx, -bk, ax, -ak, -ac, ap, -bc, bp, -cc, ci, -bv, bi, -av, ai, ae, -ar, be, -br, ce, -cg, bt, -bg, at, -ag,}

{cg, -bv, bk, -az, ao, -ad, -ah, as, -bd, bo, -bz, ck, -cc, br, -bg, av, -ak, -aa, al, -aw, bh, -bs, cd, -cj, by, -bn, bc, -ar, ag, ae, -ap, ba, -bl, bw, -ch, cf, -bu, bj, -ay, an, -ac, -ai, at, -be, bp, -ca, cl, -cb, bq, -bf, au, -aj, -ab, am, -ax, bi, -bt, ce, -ci, bx, -bm, bb, -aq, af,}

{ch, -by, bp, -bg, ax, -ao, af, ad, -am, av, -be, bn, -bw, cf, -cj, ca, -br, bi, -az, aq, -ah, -ab, ak, -at, bc, -bl, bu, -cd, cl, -cc, bt, -bk, bb, -as, aj, -aa, -ai, ar, -ba, bj, -bs, cb, -ck, ce, -bv, bm, -bd, au, -al, ac, ag, -ap, ay, -bh, bq, -bz, ci, -cg, bx, -bo, bf, -aw, an, -ae,}

{ci, -cb, bu, -bn, bg, -az, as, -al, ae, ac, -aj, aq, -ax, be, -bl, bs, -bz, cg, -ck, cd, -bw, bp, -bi, bb, -au, an, -ag, -aa, ah, -ao, av, -bc, bj, -bq, bx, -ce, cl, -cf, by, -br, bk, -bd, aw, -ap, ai, -ab, -af, am, -at, ba, -bh, bo, -bv, cc, -cj, ch, -ca, bt, -bm, bf, -ay, ar, -ak, ad,}

{cj, -ce, bz, -bu, bp, -bk, bf, -ba, av, -aq, al, -ag, ab, ad, -ai, an, -as, ax, -bc, bh, -bm, br, -bw, cb, -cg, cl, -ch, cc, -bx, bs, -bn, bi, -bd, ay, -at, ao, -aj, ae, aa, -af, ak, -ap, au, -az, be, -bj, bo, -bt, by, -cd, ci, -ck, cf, -ca, bv, -bq, bl, -bg, bb, -aw, ar, -am, ah, -ac,}

{ck, -ch, ce, -cb, by, -bv, bs, -bp, bm, -bj, bg, -bd, ba, -ax, au, -ar, ao, -al, ai, -af, ac, aa, -ad, ag, -aj, am, -ap, as, -av, ay, -bb, be, -bh, bk, -bn, bq, -bt, bw, -bz, cc, -cf, ci, -cl, cj, -cg, cd, -ca, bx, -bu, br, -bo, bl, -bi, bf, -bc, az, -aw, at, -aq, an, -ak, ah, -ae, ab,}

{cl, -ck, cj, -ci, ch, -cg, cf, -ce, cd, -cc, cb, -ca, bz, -by, bx, -bw, bv, -bu, bt, -bs, br, -bq, bp, -bo, bn, -bm, bl, -bk, bj, -bi, bh, -bg, bf, -be, bd, -bc, bb, -ba, az, -ay, ax, -aw, av, -au, at, -as, ar, -aq, ap, -ao, an, -am, al, -ak, aj, -ai, ah, -ag, af, -ae, ad, -ac, ab, -aa,}

The variables a, b c, aa, ab, ac, cl can be derived based on the formulations of DST-7 shown in Table 1, and their values can be different for different sizes of DST-7. For example, the value of "a" can be different for 4-point DST-7 and 8-point DST-7. To avoid floating point operations, similar to the DCT-2 cores used in HEVC, the transform core of DST-7 may be scaled by a pre-defined factor, e.g., 64·$\sqrt{N}$ (corresponds to 8-bit transform core) or 256·$\sqrt{N}$ (corresponds to 10-bit transform core), and rounded to the nearest integer, or further tuned by an offset, e.g., +1/−1.

In an exemplary design of AMT, when AMT is applied, all primary transform cores, including DCT-2, may be represented by 10-bit integers, i.e., a 10-bit transform core. However, it may be the case that at least one of the primary transform cores (but not all) is represented by 10-bit integers.

The primary transform in VVC may apply both 8-bit (e.g., used for all other transform sizes except for 64-point and larger) and 10-bit (e.g., used for 64-point transform and larger) transform cores. In this application, the 2-, 4-, 8-, 16- and 32-point DCT-2 transform core cannot be extracted from, for example, a 64-point DCT-2 transform core, which inevitably increases the cost of applying primary transform because a separate 64-point transform core would need extra storage and logic for implementation. Comparing to 10-bit primary transform cores, the 8-bit primary transform core reduces the complexity because of the reduced memory for storing transform cores and reduced input bit-width of multiplier/add/sub operations.

Thus, the disclosure provides a set of 8-bit primary transform cores for all transform size types applied in an exemplary AMT including DCT-2, DCT-5, DCT-8, DST-1 and DST-7. The following exemplary proposed methods may be used separately or combined in any order.

Figure 5:
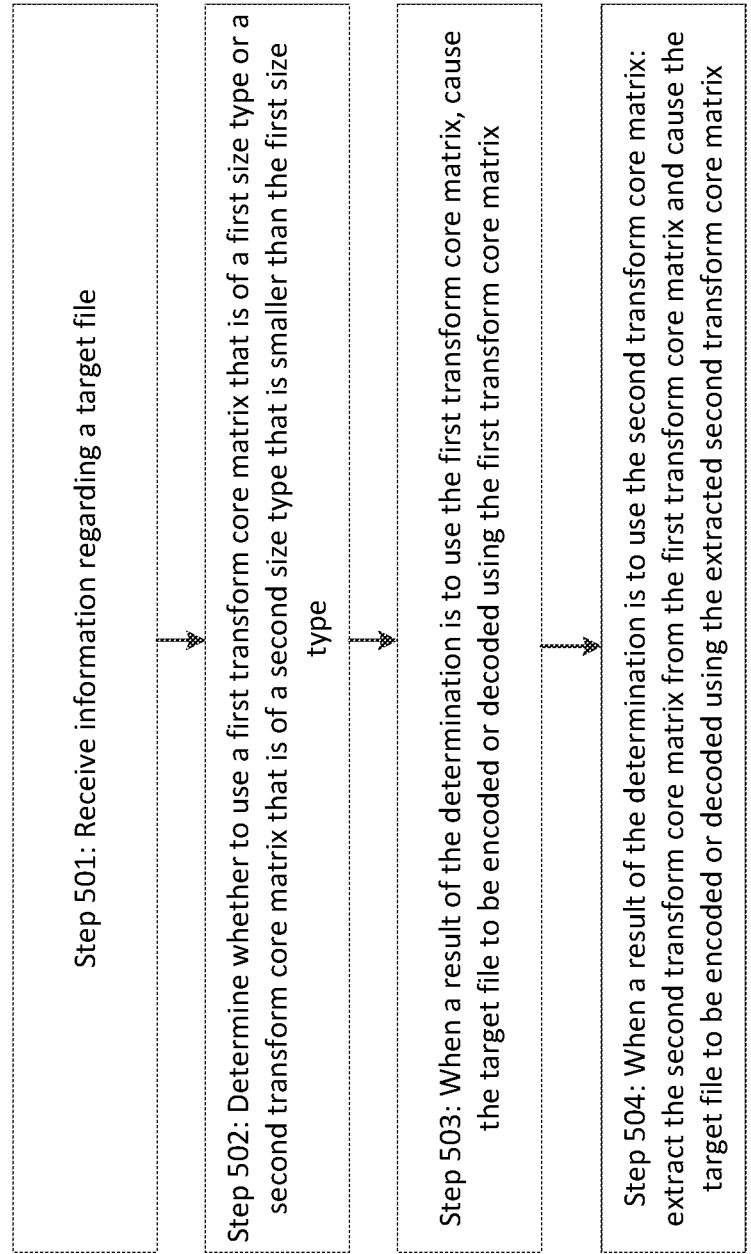
FIG. 5 is a schematic illustration of an exemplary method of encoding or decoding in accordance with an embodiment.

Referring to FIG. 5, in a first, simple example, a method of utilizing an 8-bit primary transform core matrix to decode compressed video or image data or encode uncompressed video or image data may include: Step 501: receiving information regarding a target file for encoding or decoding. The target file for encoding or decoding may be one of: a compressed video or image data file or an uncompressed video or image data file. The method of FIG. 5 may also include a Step 502 that includes determining, for the encoding or decoding of the target file, whether to use a first transform core matrix that is of a first size type or a second transform core matrix that is of a second size type that is smaller than the first size type. The first size type may be the 8-bit primary transform core matrix, which has the core matrix that is represented by 8-bits and that has a size that is 64-point or larger. The method according to the aspect of the disclosure may further include a Step 503 that includes, when a result of the determination is to use the first transform core matrix of the first size type, causing or transmitting information that causes the target file for encoding or decoding to be encoded or decoded using the 8-bit primary transform core matrix that has the size that is 64-point or larger. The method of FIG. 5 may also include a Step 504 that includes, when a result of the determination is to use the second transform core matrix of the second size type that is smaller than the first size type: extracting the second transform core matrix of the second size type from the 8-bit primary transform core matrix that is 64-point or larger and causing or transmitting information that causes the target file for encoding or decoding to be encoded or decoded using the extracted second transform core matrix of the second type.

The method illustrated in FIG. 5 may also include processing Steps 501-504 being performed by one or more processors. The method illustrated in FIG. 5 may also include storing, by the one or more processors in a memory, the 8-bit primary transform core matrix in advance before or during the performing of the Steps 501-504.

The method illustrated in FIG. 5 may also include that the first transform core matrix is a 64-point, 8-bit primary transform core matrix that is constructed using thirty-three integers which are used to construct a 32-point, 8-bit primary transform core matrix and an additional thirty-two integers that include: bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj and ck plus their respective sign changes, and the additional thirty-two integers {bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck} are equal to {91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2}.

The method illustrated in FIG. 5 may also include that the 128-point 8-bit primary transform core is constructed using the 65 integers used to construct a 64-point 8-bit primary transform core and additional 64 integers including: cl, cm, cn, co, cp, cq, cr, cs, ct, cu, cv, cw, cx, cy, cz, da, db, dc, dd, de, df, dg, dh, di, dj, dk, dl, dm, dn, d_, dp, dq, dr, ds, dt, du, dv, dw, dx, dy, dz, ea, eb, ec, ed, ee, ef, eg, eh, ei, ej, ek, el, em, en, eo, ep, eq, er, es, et, eu, ev and ew plus their sign changes, and these additional 64 integers are {cl, cm, cn, co, cp, cq, cr, cs, ct, cu, cv, cw, cx, cy, cz, da, db, dc, dd, de, df, dg, dh, di, dj, dk, dl, dm, dn, d_, dp, dq, dr, ds, dt, du, dv, dw, dx, dy, dz, ea, eb, ec, ed, ee, ef, eg, eh, ei, ej, ek, el, em, en, eo, ep, eq, er, es, et, eu, ev, ew} are equal to {90, 90, 90, 90, 90, 90, 89, 89, 89, 88, 88, 87, 86, 86, 85, 84, 83, 82, 81, 80, 79, 78, 77, 76, 75, 73, 72, 71, 69, 68, 66, 65, 63, 62, 60, 58, 58, 55, 53, 51, 49, 48, 45, 44, 42, 40, 38, 36, 34, 32, 29, 27, 25, 23, 21, 19, 17, 15, 12, 10, 8, 6, 3, 1}.

The method illustrated in FIG. 5 may also include that the size of the 8-bit primary transform core matrix is 64-point or 128-point. Further, the method illustrated in FIG. 5 may also include that a left half or a right half of even or odd rows of the 8-bit primary transform core matrix form a matrix which is similar to the second transform core matrix, the 8-bit primary transform core matrix is one of: DCT-2, DCT-5, DCT-8, DST-1 and DST-7, and/or the second transform core matrix is one of: DCT-2, DCT-5, DCT-8, DST-1 and DST-7.

The method illustrated in FIG. 5 may also include that the 8-bit primary transform core matrix and the second transform core matrix are the same one of: DCT-2, DCT-5, DCT-8, DST-1 and DST-7. The method illustrated in FIG. 5 may also include that the 8-bit primary transform core matrix is an 8-bit, 64-point DCT-2 transform matrix and/or the second transform core matrix is an 8-bit, 32-point DCT-2 transform matrix.

Figure 6:
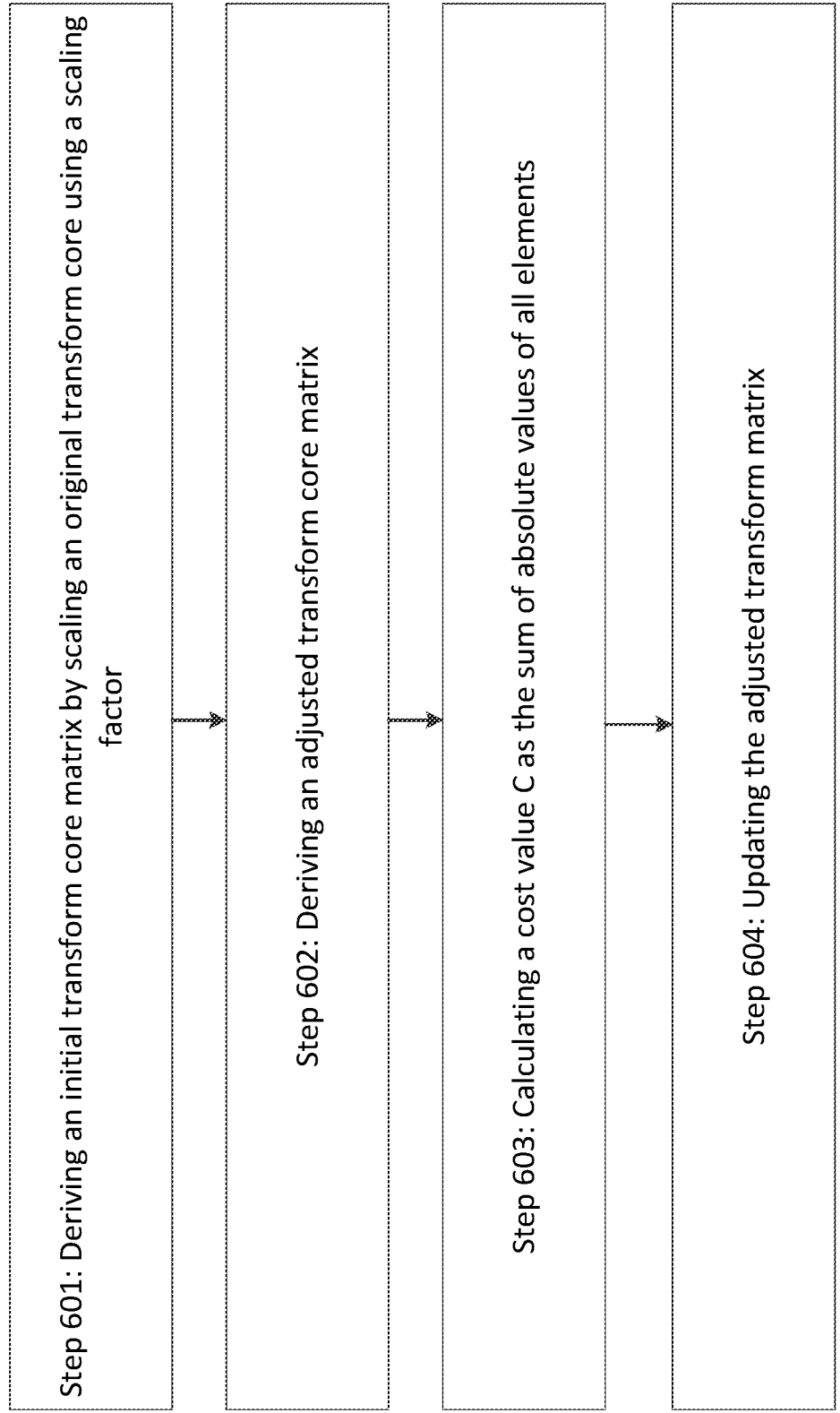
FIG. 6 is a schematic illustration of outputting a transform core matrix in accordance with an embodiment.

The method illustrated in FIG. 5 may also include that the 8-bit, N-point primary transform core matrix, which is composed by M unique numbers, is derived by the following steps illustrated in FIG. 6. FIG. 6 illustrates a Step 601 that includes deriving an initial transform core matrix by scaling an original transform core using a scaling factor. For example, the Step 601 may include deriving an initial transform core matrix T1 by scaling an original transform core which is composed by floating-point numbers T0 using a scaling factor $2B-2\times\log 2(N)$ such that $T1=T0\times 2^{B-2}\times\log_2(N)$, where B=8, and the row vectors of T0, which are basis vectors, are orthogonal to each other, and the norm of each row vector is 1.

The method of FIG. 6 may also include a Step 602 that includes deriving an adjusted transform core matrix. For example, Step 602 may include deriving an adjusted transform core matrix (T2) by adding offsets on a selected set of the M unique numbers which are used to construct the adjusted primary transform core matrix T2.

The method of FIG. 6 may also include a Step 603 that includes calculating a cost value C as the sum of absolute values of all elements. For example, the Step 603 may include calculating a cost value C as the sum of absolute values of all elements of $(T1*T1^T-2^{2B-4}\times\log_2(N)^2\times I)$, where I is an N×N identity matrix.

The method of FIG. 6 may also include a Step 604 that includes updating the adjusted transform matrix. For example, the Step 604 may include updating the adjusted transform matrix T2 by adding the calculated offset values to T2, which minimizes the cost value to T2, which may be output as the 8-bit, N-point primary transform core matrix.

In the method of FIG. 6, the values of the offsets for each of the M unique numbers may include one or more of the following values: −2, −1, 0, +1, +2. Moreover, the method of FIG. 6 may also include after minimizing the cost value C by trying all possible combinations of offset values on a selected set of M unique numbers, outputting T2 as the 8-bit, N-point primary transform core matrix.

Next, the different types of transform cores (transform core matrices) will be explained. As an example, a 64-point DCT-2 transform core may be represented using 8-bit integers, where the left half of the even rows (row 0, 2, 4, ..., 30) of the transform core matrix form a matrix which is identical to the 32-point DCT-2 transform core matrix. In one embodiment, the 64-point DCT-2 core matrix may be derived by setting the parameters as follows: {aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck}={64, 83, 36, 89, 75, 50, 18, 90, 87, 80, 70, 57, 43, 25, 9, 90, 90, 88, 85, 82, 78, 73, 67, 61, 54, 46, 38, 31, 22, 13, 4, 91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2}.

A 128-point DCT-2 transform core may be represented using 8-bit integers, and the left half of the even rows (row 0, 2, 4, ..., 126) of the transform core matrix may form a matrix which is identical to the 64-point DCT-2 transform core matrix. In one embodiment, the 128-point DCT-2 core matrix may be derived by setting the parameters as follows: {aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck, cl, cm, cn, co, cp, cq, cr, cs, ct, cu, cv, cw, cx, cy, cz, da, db, dc, dd, de, df, dg, dh, di, dj, dk, dl, dm, dn, d_, dp, dq, dr, ds, dt, du, dv, dw, dx, dy, dz, ea, eb, ec, ed, ee, ef, eg, eh, ei, ej, ek, el, em, en, eo, ep, eq, er, es, et, eu, ev, ew}={64, 83, 36, 89, 75, 50, 18, 90, 87, 80, 70, 57, 43, 25, 9, 90, 90, 88, 85, 82, 78, 73, 67, 61, 54, 46, 38, 31, 22, 13, 4, 91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2, 90, 90, 90, 90, 90, 90, 89, 89, 89, 88, 88, 87, 86, 86, 85, 84, 83, 82, 81, 80, 79, 78, 77, 76, 75, 73, 72, 71, 69, 68, 66, 65, 63, 62, 60, 58, 58, 55, 53, 51, 49, 48, 45, 44, 42, 40, 38, 36, 34, 32, 29, 27, 25, 23, 21, 19, 17, 15, 12, 10, 8, 6, 3, 1}.

A B-bit N-point primary transform core, which is composed by M unique numbers (despite the signs and zeros), may be derived by the following steps: (a) derive an initial transform core T1 by scaling the original transform core which is composed by floating-point numbers, i.e., T0, using a scaling factor $2^{B-2} \times \log_2(N)$, i.e., $T1 = T0 \times 2^{B-2} \times \log_2(N)$, where the row vectors of T0, i.e., basis vectors, are orthogonal to each other, and the norm of each row vector is 1, (b) derive an adjusted transform core T2 by trying adding offsets on a selected set of M unique numbers which are used to construct the primary transform core T2, and (c) calculate the cost value C as the sum of absolute values of all elements of $(T1*T1^T - 2^{2B-4} \times \log_2(N)^2 \times I)$, where I is an N×N identity matrix. The offset values which minimize the cost value may be then added to T2, and T2 may be updated. Example offset values for each of the M unique numbers may include, but are not limited to: −2, −1, 0, +1, +2. After minimizing the cost value by trying all possible combination of offset values on a selected set of M unique numbers, T2 may be output as the B-bit N-point primary transform core.

When deriving the N-point DCT-8 and DST-7 transform cores, it may be restricted that the set of M unique numbers which are used to construct the N-point DCT-8 core matrix is the same set of M unique numbers which construct the N-point DST-7 core matrix. In one embodiment, M equals to N. In one embodiment, the 8-bit DCT-8 and DST-7 transform cores are shown below. For example, in 4-point DST-7 core, there may be 4 unique numbers including 28, 55, 74, 84, and this is the same set of 4 unique numbers used to construct 4-point DCT-8 core.

4-Point DST-7:
{29, 55, 74, 84,}
{74, 74, 0, -74,}
{84, -29, -74, 55,}
{55, -84, 74, -29,}

8-Bit DST-7:
{17, 32, 46, 60, 71, 78, 85, 86,}
{46, 78, 86, 71, 32, -17, -60, -85,}
{71, 85, 32, -46, -86, -60, 17, 78,}
{85, 46, -60, -78, 17, 86, 32, -71,}
{86, -17, -85, 32, 78, -46, -71, 60,}
{78, -71, -17, 85, -60, -32, 86, -46,}
{60, -86, 71, -17, -46, 85, -78, 32,}
{32, -60, 78, -86, 85, -71, 46, -17,}

16-Bit DST-7:
{9, 17, 25, 33, 41, 49, 56, 62, 66, 72, 77, 81, 83, 87, 89, 90,}
{25, 49, 66, 81, 89, 89, 81, 66, 49, 25, 0, -25, -49, -66, -81, -89,}
{41, 72, 89, 83, 62, 25, -17, -56, -81, -90, -77, -49, -9, 33, 66, 87,}
{56, 87, 81, 41, -17, -66, -90, -72, -25, 33, 77, 89, 62, 9, -49, -83,}
{66, 89, 49, -25, -81, -81, -25, 49, 89, 66, 0, -66, -89, -49, 25, 81,}
{77, 77, 0, -77, -77, 0, 77, 77, 0, -77, -77, 0, 77, 77, 0, -77,}
{83, 56, -49, -87, -9, 81, 62, -41, -89, -17, 77, 66, -33, -90, -25, 72,}
{89, 25, -81, -49, 66, 66, -49, -81, 25, 89, 0, -89, -25, 81, 49, -66,}
{90, -9, -89, 17, 87, -25, -83, 33, 81, -41, -77, 49, 72, -56, -66, 62,}
{87, -41, -66, 72, 33, -89, 9, 83, -49, -62, 77, 25, -90, 17, 81, -56,}
{81, -66, -25, 89, -49, -49, 89, -25, -66, 81, 0, -81, 66, 25, -89, 49,}
{72, -83, 25, 56, -90, 49, 33, -87, 66, 9, -77, 81, -17, -62, 89, -41,}
{62, -90, 66, -9, -56, 89, -72, 17, 49, -87, 77, -25, -41, 83, -81, 33,}
{49, -81, 89, -66, 25, 25, -66, 89, -81, 49, 0, -49, 81, -89, 66, -25,}
{33, -62, 81, -90, 83, -66, 41, -9, -25, 56, -77, 89, -87, 72, -49, 17,}
{17, -33, 49, -62, 72, -81, 87, -90, 89, -83, 77, -66, 56, -41, 25, -9,}

32-Bit DST-7:
{4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90,}
{13, 26, 38, 50, 60, 68, 77, 82, 86, 89, 90, 88, 85, 80, 74, 66, 56, 45, 34, 21, 9, -4, -17, -30, -42, -53, -63, -72, -78, -84, -88, -90,}
{21, 42, 60, 74, 84, 89, 89, 84, 74, 60, 42, 21, 0, -21, -42, -60, -74, -84, -89, -89, -84, -74, -60, -42, -21, 0, 21, 42, 60, 74, 84, 89,}
{30, 56, 77, 88, 89, 80, 63, 38, 9, -21, -50, -72, -85, -90, -84, -68, -45, -17, 13, 42, 66, 82, 90, 86, 74, 53, 26, -4, -34, -60, -78, -88,}
{38, 68, 86, 88, 74, 45, 9, -30, -63, -84, -90, -78, -53, -17, 21, 56, 80, 90, 82, 60, 26, -13, -50, -77, -89, -85, -66, -34, 4, 42, 72, 88,}
{45, 78, 90, 77, 42, -4, -50, -80, -90, -74, -38, 9, 53, 82, 89, 72, 34, -13, -56, -84, -88, -68, -30, 17, 60, 85, 88, 66, 26, -21, -63, -86,}

{53, 85, 85, 53, 0, -53, -85, -85, -53, 0, 53, 85, 85, 53, 0, -53, -85, -85, -53, 0, 53, 85, 85, 53, 0, -53, -85, -85, -53, 0, 53, 85,}
{60, 89, 74, 21, -42, -84, -84, -42, 21, 74, 89, 60, 0, -60, -89, -74, -21, 42, 84, 84, 42, -21, -74, -89, -60, 0, 60, 89, 74, 21, -42, -84,}
{66, 90, 56, -13, -74, -88, -45, 26, 80, 84, 34, -38, -85, -78, -21, 50, 88, 72, 9, -60, -90, -63, 4, 68, 89, 53, -17, -77, -86, -42, 30, 82,}
{72, 86, 34, -45, -89, -63, 13, 78, 82, 21, -56, -90, -53, 26, 84, 77, 9, -66, -88, -42, 38, 88, 68, -4, -74, -85, -30, 50, 90, 60, -17, -80,}
{77, 80, 9, -72, -84, -17, 66, 86, 26, -60, -88, -34, 53, 90, 42, -45, -90, -50, 38, 89, 56, -30, -88, -63, 21, 85, 68, -13, -82, -74, 4, 78,}
{80, 72, -17, -86, -60, 34, 90, 45, -50, -89, -30, 63, 85, 13, -74, -78, 4, 82, 68, -21, -88, -56, 38, 90, 42, -53, -88, -26, 66, 84, 9, -77,}
{84, 60, -42, -89, -21, 74, 74, -21, -89, -42, 60, 84, 0, -84, -60, 42, 89, 21, -74, -74, 21, 89, 42, -60, -84, 0, 84, 60, -42, -89, -21, 74,}
{86, 45, -63, -78, 21, 90, 26, -77, -66, 42, 88, 4, -85, -50, 60, 80, -17, -90, -30, 74, 68, -38, -88, -9, 84, 53, -56, -82, 13, 89, 34, -72,}
{88, 30, -78, -56, 60, 77, -34, -88, 4, 89, 26, -80, -53, 63, 74, -38, -86, 9, 90, 21, -82, -50, 66, 72, -42, -85, 13, 90, 17, -84, -45, 68,}
{90, 13, -88, -26, 84, 38, -78, -50, 72, 60, -63, -68, 53, 77, -42, -82, 30, 86, -17, -89, 4, 90, 9, -88, -21, 85, 34, -80, -45, 74, 56, -66,}
{90, -4, -90, 9, 89, -13, -88, 17, 88, -21, -86, 26, 85, -30, -84, 34, 82, -38, -80, 42, 78, -45, -77, 50, 74, -53, -72, 56, 68, -60, -66, 63,}
{89, -21, -84, 42, 74, -60, -60, 74, 42, -84, -21, 89, 0, -89, 21, 84, -42, -74, 60, 60, -74, -42, 84, 21, -89, 0, 89, -21, -84, 42, 74, -60,}
{88, -38, -72, 68, 42, -86, -4, 88, -34, -74, 66, 45, -85, -9, 89, -30, -77, 63, 50, -84, -13, 90, -26, -78, 60, 53, -82, -17, 90, -21, -80, 56,}
{85, -53, -53, 85, 0, -85, 53, 53, -85, 0, 85, -53, -53, 85, 0, -85, 53, 53, -85, 0, 85, -53, -53, 85, 0, -85, 53, 53, -85, 0, 85, -53,}
{82, -66, -30, 90, -42, -56, 86, -13, -77, 74, 17, -88, 53, 45, -89, 26, 68, -80, -4, 84, -63, -34, 90, -38, -60, 85, -9, -78, 72, 21, -88, 50,}
{78, -77, -4, 80, -74, -9, 82, -72, -13, 84, -68, -17, 85, -66, -21, 86, -63, -26, 88, -60, -30, 88, -56, -34, 89, -53, -38, 90, -50, -42, 90, -45,}
{74, -84, 21, 60, -89, 42, 42, -89, 60, 21, -84, 74, 0, -74, 84, -21, -60, 89, -42, -42, 89, -60, -21, 84, -74, 0, 74, -84, 21, 60, -89, 42,}
{68, -88, 45, 30, -84, 78, -17, -56, 90, -60, -13, 77, -85, 34, 42, -88, 72, -4, -66, 89, -50, -26, 82, -80, 21, 53, -90, 63, 9, -74, 86, -38,}
{63, -90, 66, -4, -60, 90, -68, 9, 56, -89, 72, -13, -53, 88, -74, 17, 50, -88, 77, -21, -45, 86, -78, 26, 42, -85, 80, -30, -38, 84, -82, 34,}
{56, -88, 80, -38, -21, 72, -90, 68, -17, -42, 82, -86, 53, 4, -60, 88, -78, 34, 26, -74, 90, -66, 13, 45, -84, 85, -50, -9, 63, -89, 77, -30,}
{50, -82, 88, -66, 21, 30, -72, 90, -78, 42, 9, -56, 85, -86, 60, -13, -38, 77, -90, 74, -34, -17, 63, -88, 84, -53, 4, 45, -80, 89, -68, 26,}
{42, -74, 89, -84, 60, -21, -21, 60, -84, 89, -74, 42, 0, -42, 74, -89, 84, -60, 21, 21, -60, 84, -89, 74, -42, 0, 42, -74, 89, -84, 60, -21,}

{34, -63, 82, -90, 84, -66, 38, -4, -30, 60, -80, 90, -85, 68, -42, 9, 26, -56, 78, -89, 86, -72, 45, -13, -21, 53, -77, 88, -88, 74, -50, 17,}
{26, -50, 68, -82, 89, -88, 80, -66, 45, -21, -4, 30, -53, 72, -84, 90, -88, 78, -63, 42, -17, -9, 34, -56, 74, -85, 90, -86, 77, -60, 38, -13,}
{17, -34, 50, -63, 74, -82, 88, -90, 88, -84, 77, -66, 53, -38, 21, -4, -13, 30, -45, 60, -72, 80, -86, 90, -89, 85, -78, 68, -56, 42, -26, 9,}
{9, -17, 26, -34, 42, -50, 56, -63, 68, -74, 78, -82, 85, -88, 89, -90, 90, -88, 86, -84, 80, -77, 72, -66, 60, -53, 45, -38, 30, -21, 13, -4,}

64-Bit DST-7:

{2, 5, 7, 8, 11, 13, 15, 17, 20, 22, 23, 26, 29, 30, 32, 34, 37, 38, 41, 42, 44, 46, 48, 49, 52, 53, 55, 58, 59, 60, 62, 64, 65, 66, 68, 69, 72, 72, 74, 73, 76, 77, 78, 79, 81, 80, 82, 83, 85, 84, 85, 86, 87, 87, 88, 89, 89, 90, 89, 90, 90, 90, 90, 90,}
{7, 13, 20, 26, 32, 38, 44, 49, 55, 60, 65, 69, 74, 77, 81, 83, 85, 87, 89, 90, 90, 90, 90, 89, 87, 85, 83, 81, 77, 74, 69, 65, 60, 55, 49, 44, 38, 32, 26, 20, 13, 7, 0, -7, -13, -20, -26, -32, -38, -44, -49, -55, -60, -65, -69, -74, -77, -81, -83, -85, -87, -89, -90, -90,}
{11, 22, 32, 42, 52, 60, 68, 73, 81, 84, 88, 90, 90, 89, 87, 85, 79, 74, 66, 59, 49, 41, 30, 20, 8, -2, -13, -23, -34, -44, -53, -62, -69, -76, -80, -85, -89, -90, -90, -90, -87, -83, -78, -72, -65, -58, -48, -38, -29, -17, -7, 5, 15, 26, 37, 46, 55, 64, 72, 77, 82, 86, 89, 90,}
{15, 30, 44, 58, 68, 77, 85, 89, 90, 89, 86, 81, 72, 62, 49, 37, 22, 7, -8, -23, -38, -52, -64, -74, -80, -87, -90, -90, -88, -83, -76, -66, -55, -42, -29, -13, 2, 17, 32, 46, 59, 69, 78, 84, 89, 90, 90, 85, 79, 72, 60, 48, 34, 20, 5, -11, -26, -41, -53, -65, -73, -82, -87, -90,}
{20, 38, 55, 69, 81, 87, 90, 89, 83, 74, 60, 44, 26, 7, -13, -32, -49, -65, -77, -85, -90, -90, -85, -77, -65, -49, -32, -13, 7, 26, 44, 60, 74, 83, 89, 90, 87, 81, 69, 55, 38, 20, 0, -20, -38, -55, -69, -81, -87, -90, -89, -83, -74, -60, -44, -26, -7, 13, 32, 49, 65, 77, 85, 90,}
{23, 46, 65, 79, 88, 90, 86, 76, 60, 41, 17, -7, -30, -52, -69, -82, -90, -90, -85, -72, -55, -34, -11, 13, 37, 58, 74, 84, 90, 89, 80, 68, 49, 29, 5, -20, -42, -62, -77, -87, -90, -87, -78, -64, -44, -22, 2, 26, 48, 66, 81, 89, 90, 85, 73, 59, 38, 15, -8, -32, -53, -72, -83, -89,}
{29, 53, 74, 86, 90, 85, 72, 52, 26, -2, -30, -55, -73, -87, -90, -84, -72, -49, -23, 5, 32, 58, 76, 87, 90, 85, 69, 48, 22, -7, -34, -59, -77, -88, -90, -83, -68, -46, -20, 8, 37, 60, 78, 89, 90, 82, 66, 44, 17, -11, -38, -62, -79, -89, -89, -80, -65, -42, -15, 13, 41, 64, 81, 90,}
{32, 60, 81, 90, 87, 74, 49, 20, -13, -44, -69, -85, -90, -83, -65, -38, -7, 26, 55, 77, 89, 89, 77, 55, 26, -7, -38, -65, -83, -90, -85, -69, -44, -13, 20, 49, 74, 87, 90, 81, 60, 32, 0, -32, -60, -81, -90, -87, -74, -49, -20, 13, 44, 69, 85, 90, 83, 65, 38, 7, -26, -55, -77, -89,}
{37, 66, 85, 90, 79, 55, 22, -15, -49, -76, -90, -87, -72, -42, -7, 30, 62, 83, 90, 82, 60, 29, -8, -44, -72, -88, -89, -73, -48, -13, 23, 58, 81, 90, 84, 65, 34, -2, -38, -68, -86, -90, -78, -53, -20, 17, 52, 77, 89, 87, 69, 41, 5, -32, -64, -85, -90, -80, -59, -26, 11, 46, 74, 89,}
{41, 72, 89, 87, 66, 32, -8, -48, -77, -90, -85, -60, -23, 17, 55, 80, 90, 81, 53, 15, -26, -62, -84, -90, -76, -46, -7, 34, 68, 87, 89, 72, 38, -2, -42, -74, -90, -86, -65, -30, 11, 49, 78, 90, 83, 59, 22, -20, -58, -82, -90, -79, -52, -13, 29, 64, 85, 89, 73, 44, 5, -37, -69, -88,}
{44, 77, 90, 81, 49, 7, -38, -74, -90, -83, -55, -13, 32, 69, 89, 85, 60, 20, -26, -65, -87, -87, -65, -26, 20, 60, 85, 89, 69, 32, -13, -55, -83, -90, -74, -38, 7, 49, 81, 90, 77, 44, 0, -44, -77, -90, -81, -49, -7, 38, 74, 90, 83, 55, 13, -32, -69, -89, -85, -60, -20, 26, 65, 87,}

{48, 80, 90, 72, 30, -20, -64, -88, -85, -58, -11, 38, 76, 90, 77, 41, -8, -55, -84, -89, -65, -22, 29, 69, 89, 82, 49, 2, -46, -81, -90, -72, -32, 17, 62, 87, 86, 59, 13, -37, -73, -90, -78, -42, 7, 53, 85, 89, 66, 23, -26, -68, -90, -83, -52, -5, 44, 79, 90, 74, 34, -15, -60, -87,}
{52, 84, 87, 59, 8, -44, -80, -90, -65, -17, 37, 77, 90, 72, 26, -29, -72, -90, -76, -34, 20, 66, 89, 81, 42, -11, -60, -88, -85, -49, 2, 53, 85, 87, 58, 7, -46, -82, -89, -64, -15, 38, 78, 90, 69, 23, -30, -74, -90, -73, -32, 22, 68, 90, 79, 41, -13, -62, -89, -83, -48, 5, 55, 86,}
{55, 87, 83, 44, -13, -65, -90, -77, -32, 26, 74, 90, 69, 20, -38, -81, -89, -60, -7, 49, 85, 85, 49, -7, -60, -89, -81, -38, 20, 69, 90, 74, 26, -32, -77, -90, -65, -13, 44, 83, 87, 55, 0, -55, -87, -83, -44, 13, 65, 90, 77, 32, -26, -74, -90, -69, -20, 38, 81, 89, 60, 7, -49, -85,}
{59, 90, 77, 29, -34, -81, -88, -53, 7, 64, 90, 74, 22, -41, -83, -86, -48, 13, 68, 90, 69, 15, -46, -85, -85, -42, 20, 72, 90, 65, 8, -52, -87, -80, -37, 26, 76, 89, 60, 2, -58, -89, -78, -30, 32, 79, 89, 55, -5, -62, -90, -73, -23, 38, 82, 87, 49, -11, -66, -90, -72, -17, 44, 84,}
{62, 90, 69, 11, -53, -89, -76, -22, 44, 86, 80, 32, -34, -82, -85, -42, 23, 77, 89, 52, -13, -72, -90, -60, 2, 64, 90, 68, 8, -55, -90, -73, -20, 46, 87, 81, 30, -37, -83, -84, -41, 26, 78, 88, 49, -15, -72, -90, -59, 5, 65, 90, 66, 7, -58, -89, -74, -17, 48, 87, 79, 29, -38, -85,}
{65, 90, 60, -7, -69, -90, -55, 13, 74, 89, 49, -20, -77, -87, -44, 26, 81, 85, 38, -32, -83, -83, -32, 38, 85, 81, 26, -44, -87, -77, -20, 49, 89, 74, 13, -55, -90, -69, -7, 60, 90, 65, 0, -65, -90, -60, 7, 69, 90, 55, -13, -74, -89, -49, 20, 77, 87, 44, -26, -81, -85, -38, 32, 83,}
{68, 89, 49, -23, -80, -83, -29, 46, 89, 72, 5, -65, -90, -53, 20, 79, 84, 32, -42, -88, -74, -8, 62, 90, 58, -15, -77, -86, -37, 38, 87, 76, 13, -59, -90, -60, 11, 73, 87, 41, -34, -85, -78, -17, 55, 90, 64, -7, -72, -89, -44, 30, 85, 81, 22, -52, -90, -66, 2, 69, 90, 48, -26, -82,}
{72, 88, 38, -41, -89, -69, 2, 72, 87, 37, -42, -89, -68, 5, 74, 87, 34, -44, -90, -66, 7, 73, 86, 32, -46, -89, -65, 8, 76, 85, 30, -48, -90, -64, 11, 77, 84, 29, -49, -90, -62, 13, 78, 85, 26, -52, -90, -60, 15, 79, 83, 23, -53, -90, -59, 17, 81, 82, 22, -55, -90, -58, 20, 80,}
{74, 85, 26, -55, -90, -49, 32, 87, 69, -7, -77, -83, -20, 60, 90, 44, -38, -89, -65, 13, 81, 81, 13, -65, -89, -38, 44, 90, 60, -20, -83, -77, -7, 69, 87, 32, -49, -90, -55, 26, 85, 74, 0, -74, -85, -26, 55, 90, 49, -32, -87, -69, 7, 77, 83, 20, -60, -90, -44, 38, 89, 65, -13, -81,}
{76, 82, 13, -68, -87, -26, 59, 89, 38, -48, -90, -49, 37, 90, 60, -23, -86, -69, 11, 80, 77, 2, -73, -83, -15, 66, 87, 29, -58, -90, -41, 46, 90, 52, -34, -89, -62, 22, 85, 72, -8, -81, -78, -5, 74, 85, 17, -65, -88, -30, 55, 90, 42, -44, -90, -53, 32, 89, 64, -20, -84, -72, 7, 79,}
{78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78,}
{81, 74, -13, -85, -65, 26, 89, 55, -38, -90, -44, 49, 90, 32, -60, -87, -20, 69, 83, 7, -77, -77, 7, 83, 69, -20, -87, -60, 32, 90, 49, -44, -90, -38, 55, 89, 26, -65, -85, -13, 74, 81, 0, -81, -74, 13, 85, 65, -26, -89, -55, 38, 90, 44, -49, -90, -32, 60, 87, 20, -69, -83, -7, 77,}
{82, 68, -26, -89, -48, 49, 90, 23, -69, -80, 2, 83, 66, -29, -90, -46, 52, 89, 22, -72, -81, 5, 85, 65, -30, -90, -44, 53, 89, 20, -72, -79, 7, 84, 64, -32, -90, -42, 55, 88, 17, -74, -78, 8, 85, 62, -34, -90, -41, 58, 87, 15, -73, -77, 11, 86, 60, -37, -90, -38, 59, 87, 13, -76,}
{85, 62, -38, -90, -29, 69, 79, -11, -87, -53, 48, 89, 17, -76, -74, 22, 89, 44, -58, -86, -7, 80, 66, -32, -90, -34, 65, 82, -5, -85, -59, 42, 90, 23, -72, -77, 15, 89, 49, -52, -88, -13, 78, 72, -26, -90, -41, 60, 84, 2, -83, -64, 37, 90, 30, -68, -81, 8, 87, 55, -46, -90, -20, 73,}
{85, 55, -49, -87, -7, 83, 60, -44, -89, -13, 81, 65, -38, -90, -20, 77, 69, -32, -90, -26, 74, 74, -26, -90, -32, 69, 77, -20, -90, -38, 65, 81, -13, -89, -44, 60, 83, -7, -87, -49, 55, 85, 0, -85, -55, 49, 87, 7, -83, -60, 44, 89, 13, -81, -65, 38, 90, 20, -77, -69, 32, 90, 26, -74,}
{87, 48, -60, -80, 15, 90, 34, -72, -74, 30, 90, 20, -79, -64, 44, 88, 5, -85, -52, 58, 83, -11, -90, -38, 68, 76, -26, -90, -23, 77, 66, -41, -89, -8, 85, 55, -53, -84, 7, 89, 42, -65, -78, 22, 90, 29, -73, -69, 37, 89, 13, -82, -59, 49, 86, -2, -87, -46, 62, 81, -17, -90, -32, 72,}
{88, 41, -69, -72, 37, 89, 5, -87, -44, 66, 73, -32, -89, -8, 85, 48, -64, -77, 29, 90, 13, -85, -52, 60, 79, -23, -90, -17, 82, 55, -58, -80, 20, 90, 22, -81, -59, 53, 83, -15, -90, -26, 78, 62, -49, -84, 11, 90, 30, -76, -65, 46, 86, -7, -90, -34, 74, 68, -42, -87, 2, 89, 38, -72,}
{89, 32, -77, -60, 55, 81, -26, -90, -7, 87, 38, -74, -65, 49, 83, -20, -90, -13, 85, 44, -69, -69, 44, 85, -13, -90, -20, 83, 49, -65, -74, 38, 87, -7, -90, -26, 81, 55, -60, -77, 32, 89, 0, -89, -32, 77, 60, -55, -81, 26, 90, 7, -87, -38, 74, 65, -49, -83, 20, 90, 13, -85, -44, 69,}
{89, 23, -83, -46, 72, 65, -53, -79, 32, 88, -8, -90, -15, 86, 38, -76, -59, 60, 73, -41, -85, 17, 90, 7, -89, -30, 81, 52, -66, -69, 48, 82, -26, -90, 2, 90, 22, -85, -44, 72, 64, -55, -78, 34, 87, -11, -90, -13, 87, 37, -77, -58, 62, 74, -42, -84, 20, 90, 5, -89, -29, 80, 49, -68,}
{90, 15, -87, -30, 82, 44, -73, -58, 65, 68, -53, -77, 41, 85, -26, -89, 11, 90, 5, -89, -20, 86, 34, -81, -48, 72, 60, -62, -72, 49, 79, -37, -85, 22, 90, -7, -90, -8, 89, 23, -84, -38, 78, 52, -69, -64, 59, 74, -46, -80, 32, 87, -17, -90, 2, 90, 13, -88, -29, 83, 42, -76, -55, 66,}
{90, 7, -90, -13, 89, 20, -87, -26, 85, 32, -83, -38, 81, 44, -77, -49, 74, 55, -69, -60, 65, 65, -60, -69, 55, 74, -49, -77, 44, 81, -38, -83, 32, 85, -26, -87, 20, 89, -13, -90, 7, 90, 0, -90, -7, 90, 13, -89, -20, 87, 26, -85, -32, 83, 38, -81, -44, 77, 49, -74, -55, 69, 60, -65,}
{90, -2, -90, 5, 90, -7, -90, 8, 90, -11, -89, 13, 90, -15, -89, 17, 89, -20, -88, 22, 87, -23, -87, 26, 86, -29, -85, 30, 84, -32, -85, 34, 83, -37, -82, 38, 80, -41, -81, 42, 79, -44, -78, 46, 77, -48, -76, 49, 73, -52, -74, 53, 72, -55, -72, 58, 69, -59, -68, 60, 66, -62, -65, 64,}
{90, -11, -89, 22, 86, -32, -82, 42, 77, -52, -72, 60, 64, -68, -55, 73, 46, -81, -37, 84, 26, -88, -15, 90, 5, -90, 7, 89, -17, -87, 29, 85, -38, -79, 48, 74, -58, -66, 65, 59, -72, -49, 78, 41, -83, -30, 87, 20, -90, -8, 90, -2, -90, 13, 89, -23, -85, 34, 80, -44, -76, 53, 69, -62,}
{90, -20, -85, 38, 77, -55, -65, 69, 49, -81, -32, 87, 13, -90, 7, 89, -26, -83, 44, 74, -60, -60, 74, 44, -83, -26, 89, 7, -90, 13, 87, -32, -81, 49, 69, -65, -55, 77, 38, -85, -20, 90, 0, -90, 20, 85, -38, -77, 55, 65, -69, -49, 81, 32, -87, -13, 90, -7, -89, 26, 83, -44, -74, 60,}
{90, -29, -81, 53, 64, -74, -41, 86, 13, -90, 15, 85, -42, -72, 65, 52, -80, -26, 89, -2, -89, 30, 79, -55, -62, 73, 38, -87, -11, 90, -17, -84, 44, 72, -66, -49, 82, 23, -90, 5, 89, -32, -78, 58, 60, -76, -37, 87, 8, -90, 20, 85, -46, -69, 68, 48, -83, -22, 90, -7, -88, 34, 77, -59,}
{89, -37, -74, 66, 46, -85, -11, 90, -26, -79, 59, 55, -80, -22, 90, -15, -85, 49, 64, -76, -32, 90, -5, -87, 41, 72, -69, -42, 87, 7, -89, 30, 77, -62, -52, 83, 17, -90, 20, 82, -53, -60, 78, 29, -90, 8, 86, -44, -68, 72, 38, -88, -2, 89, -34, -73, 65, 48, -84, -13, 90, -23, -81, 58,}
{87, -44, -65, 77, 26, -90, 20, 81, -60, -49, 85, 7, -89, 38, 69, -74, -32, 90, -13, -83, 55, 55, -83, -13, 90, -32, -74, 69, 38,

-89, 7, 85, -49, -60, 81, 20, -90, 26, 77, -65, -44, 87, 0, -87, 44, 65, -77, -26, 90, -20, -81, 60, 49, -85, -7, 89, -38, -69, 74, 32, -90, 13, 83, -55,}
{86, -52, -55, 84, 5, -87, 48, 59, -83, -8, 89, -44, -62, 80, 13, -90, 41, 65, -79, -17, 90, -37, -68, 77, 22, -90, 32, 72, -73, -26, 90, -29, -74, 72, 30, -90, 23, 76, -69, -34, 90, -20, -78, 66, 38, -89, 15, 81, -64, -42, 89, -11, -82, 60, 46, -88, 7, 85, -58, -49, 87, -2, -85, 53,}
{84, -59, -44, 90, -17, -77, 72, 29, -90, 34, 66, -81, -11, 88, -49, -53, 87, -7, -82, 64, 38, -90, 23, 74, -73, -22, 90, -41, -62, 83, 5, -86, 55, 48, -89, 13, 79, -68, -32, 90, -30, -69, 78, 15, -89, 46, 58, -85, 2, 85, -60, -42, 89, -20, -76, 72, 26, -90, 37, 65, -80, -8, 87, -52,}
{83, -65, -32, 90, -38, -60, 85, -7, -81, 69, 26, -90, 44, 55, -87, 13, 77, -74, -20, 89, -49, -49, 89, -20, -74, 77, 13, -87, 55, 44, -90, 26, 69, -81, -7, 85, -60, -38, 90, -32, -65, 83, 0, -83, 65, 32, -90, 38, 60, -85, 7, 81, -69, -26, 90, -44, -55, 87, -13, -77, 74, 20, -89, 49,}
{80, -72, -20, 88, -58, -38, 90, -41, -55, 89, -22, -69, 82, -2, -81, 72, 17, -87, 59, 37, -90, 42, 53, -89, 23, 68, -83, 5, 79, -74, -15, 87, -60, -34, 90, -44, -52, 90, -26, -66, 85, -7, -78, 73, 13, -86, 62, 32, -90, 46, 49, -89, 29, 65, -84, 8, 77, -76, -11, 85, -64, -30, 90, -48,}
{79, -76, -7, 82, -72, -13, 84, -68, -20, 87, -64, -26, 89, -59, -32, 89, -53, -38, 90, -48, -44, 90, -42, -49, 90, -37, -55, 90, -30, -60, 88, -23, -65, 86, -17, -69, 85, -11, -74, 80, -5, -77, 78, 2, -81, 73, 8, -83, 72, 15, -85, 66, 22, -87, 62, 29, -89, 58, 34, -90, 52, 41, -90, 46,}
{77, -81, 7, 74, -83, 13, 69, -85, 20, 65, -87, 26, 60, -89, 32, 55, -90, 38, 49, -90, 44, 44, -90, 49, 38, -90, 55, 32, -89, 60, 26, -87, 65, 20, -85, 69, 13, -83, 74, 7, -81, 77, 0, -77, 81, -7, -74, 83, -13, -69, 85, -20, -65, 87, -26, -60, 89, -32, -55, 90, -38, -49, 90, -44,}
{73, -85, 20, 62, -90, 38, 46, -90, 55, 29, -87, 69, 8, -79, 81, -11, -68, 87, -30, -53, 90, -48, -37, 89, -64, -17, 83, -76, 2, 74, -84, 22, 60, -89, 41, 44, -90, 58, 26, -86, 72, 7, -78, 80, -13, -66, 88, -32, -52, 90, -49, -34, 89, -65, -15, 82, -77, 5, 72, -85, 23, 59, -90, 42,}
{72, -87, 32, 48, -90, 60, 17, -80, 81, -15, -62, 90, -46, -34, 87, -72, -2, 74, -86, 30, 49, -90, 59, 20, -82, 79, -13, -64, 89, -44, -37, 88, -69, -5, 73, -85, 29, 52, -90, 58, 22, -83, 78, -11, -65, 90, -42, -38, 89, -83, -68, -7, 76, -84, 26, 53, -90, 55, 23, -85, 77, -8, -66, 89, -41,}
{69, -89, 44, 32, -85, 77, -13, -60, 90, -55, -20, 81, -83, 26, 49, -90, 65, 7, -74, 87, -38, -38, 87, -74, 7, 65, -90, 49, 26, -83, 81, -20, -55, 90, -60, -13, 77, -85, 32, 44, -89, 69, 0, -69, 89, -44, -32, 85, -77, 13, 60, -90, 55, 20, -81, 83, -26, -49, 90, -65, -7, 74, -87, 38,}
{66, -90, 55, 15, -76, 87, -42, -30, 83, -82, 29, 44, -88, 73, -13, -58, 90, -65, -2, 68, -90, 53, 17, -77, 87, -41, -32, 85, -80, 26, 46, -89, 74, -11, -59, 90, -64, -5, 69, -89, 52, 20, -78, 86, -38, -34, 84, -81, 23, 48, -89, 72, -8, -60, 90, -62, -7, 72, -90, 49, 22, -79, 85, -37,}
{64, -90, 65, -2, -62, 90, -66, 5, 60, -90, 68, -7, -59, 90, -69, 8, 58, -90, 72, -11, -55, 89, -72, 13, 53, -90, 74, -15, -52, 89, -73, 17, 49, -89, 76, -20, -48, 88, -77, 22, 46, -87, 78, -23, -44, 87, -79, 26, 42, -86, 81, -29, -41, 85, -80, 30, 38, -84, 82, -32, -37, 85, -83, 34,}
{60, -90, 74, -20, -44, 85, -83, 38, 26, -77, 89, -55, -7, 65, -90, 69, 13, -49, 87, -81, 32, 32, -81, 87, -49, -13, 69, -90, 65, -7, -55, 89, -77, 26, 38, -83, 85, -44, -20, 74, -90, 60, 0, -60, 90, -74, 20, 44, -85, 83, -38, -26, 77, -89, 55, 7, -65, 90, -69, 13, 49, -87, 81, -32,}
{58, -89, 81, -37, -23, 74, -90, 66, -13, -46, 84, -85, 48, 11, -65, 90, -73, 26, 34, -79, 89, -59, 2, 55, -88, 80, -38, -22, 72,

-90, 68, -15, -44, 85, -86, 49, 8, -64, 90, -76, 29, 32, -78, 90, -60, 5, 53, -87, 82, -41, -20, 72, -90, 69, -17, -42, 83, -87, 52, 7, -62, 89, -77, 30,}
{53, -86, 85, -52, -2, 55, -87, 84, -49, -5, 58, -87, 85, -48, -7, 59, -88, 83, -46, -8, 60, -89, 82, -44, -11, 62, -89, 80, -42, -13, 64, -90, 81, -41, -15, 65, -89, 79, -38, -17, 66, -90, 78, -37, -20, 68, -90, 77, -34, -22, 69, -90, 76, -32, -23, 72, -90, 73, -30, -26, 72, -90, 74, -29,}
{49, -83, 89, -65, 20, 32, -74, 90, -77, 38, 13, -60, 87, -85, 55, -7, -44, 81, -90, 69, -26, -26, 69, -90, 81, -44, -7, 55, -85, 87, -60, 13, 38, -77, 90, -74, 32, 20, -65, 89, -83, 49, 0, -49, 83, -89, 65, -20, -32, 74, -90, 77, -38, -13, 60, -87, 85, -55, 7, 44, -81, 90, -69, 26,}
{46, -79, 90, -76, 41, 7, -52, 82, -90, 72, -34, -13, 58, -84, 89, -68, 29, 20, -62, 87, -87, 64, -22, -26, 66, -89, 85, -59, 15, 32, -72, 89, -83, 53, -8, -38, 73, -90, 81, -48, 2, 44, -78, 90, -77, 42, 5, -49, 80, -90, 74, -37, -11, 55, -85, 90, -69, 30, 17, -60, 86, -88, 65, -23,}
{42, -73, 90, -85, 59, -20, -23, 62, -85, 90, -72, 38, 5, -46, 77, -90, 82, -55, 15, 29, -65, 87, -89, 69, -34, -8, 49, -79, 90, -81, 52, -11, -32, 68, -88, 87, -66, 30, 13, -53, 80, -90, 78, -48, 7, 37, -72, 89, -86, 64, -26, -17, 58, -83, 90, -76, 44, -2, -41, 74, -89, 84, -60, 22,}
{38, -69, 87, -89, 74, -44, 7, 32, -65, 85, -90, 77, -49, 13, 26, -60, 83, -90, 81, -55, 20, 20, -55, 81, -90, 83, -60, 26, 13, -49, 77, -90, 85, -65, 32, 7, -44, 74, -89, 87, -69, 38, 0, -38, 69, -87, 89, -74, 44, -7, -32, 65, -85, 90, -77, 49, -13, -26, 60, -83, 90, -81, 55, -20,}
{34, -64, 83, -90, 85, -65, 37, -2, -32, 62, -82, 90, -84, 66, -38, 5, 30, -60, 80, -90, 85, -68, 41, -7, -29, 59, -81, 90, -86, 69, -42, 8, 26, -58, 79, -90, 87, -72, 44, -11, -23, 55, -78, 89, -87, 72, -46, 13, 22, -53, 77, -90, 88, -74, 48, -15, -20, 52, -76, 89, -89, 73, -49, 17,}
{30, -58, 77, -89, 89, -81, 62, -37, 7, 23, -52, 74, -87, 90, -83, 66, -42, 13, 17, -46, 69, -84, 90, -85, 72, -48, 20, 11, -41, 65, -82, 90, -87, 73, -53, 26, 5, -34, 60, -79, 90, -89, 78, -59, 32, -2, -29, 55, -76, 88, -90, 80, -64, 38, -8, -22, 49, -72, 86, -90, 85, -68, 44, -15,}
{26, -49, 69, -83, 90, -89, 81, -65, 44, -20, -7, 32, -55, 74, -85, 90, -87, 77, -60, 38, -13, -13, 38, -60, 77, -87, 90, -85, 74, -55, 32, -7, -20, 44, -65, 81, -89, 90, -83, 69, -49, 26, 0, -26, 49, -69, 83, -90, 89, -81, 65, -44, 20, 7, -32, 55, -74, 85, -90, 87, -77, 60, -38, 13,}
{22, -42, 60, -73, 84, -90, 89, -85, 74, -59, 41, -20, -2, 23, -44, 62, -76, 85, -90, 90, -83, 72, -58, 38, -17, -5, 26, -46, 64, -77, 86, -90, 89, -82, 72, -55, 37, -15, -7, 29, -48, 65, -78, 87, -90, 89, -80, 69, -53, 34, -13, -8, 30, -49, 66, -79, 87, -90, 88, -81, 68, -52, 32, -11,}
{17, -34, 49, -64, 73, -83, 89, -90, 89, -85, 76, -65, 52, -37, 20, -2, -15, 32, -48, 62, -74, 82, -88, 90, -90, 84, -77, 66, -53, 38, -22, 5, 13, -30, 46, -60, 72, -80, 87, -90, 89, -85, 78, -68, 55, -41, 23, -7, -11, 29, -44, 59, -72, 81, -87, 90, -90, 86, -79, 69, -58, 42, -26, 8,}
{13, -26, 38, -49, 60, -69, 77, -83, 87, -90, 90, -89, 85, -81, 74, -65, 55, -44, 32, -20, 7, 7, -20, 32, -44, 55, -65, 74, -81, 85, -89, 90, -90, 87, -83, 77, -69, 60, -49, 38, -26, 13, 0, -13, 26, -38, 49, -60, 69, -77, 83, -87, 90, -90, 89, -85, 81, -74, 65, -55, 44, -32, 20, -7,}
{8, -17, 26, -34, 42, -49, 58, -64, 69, -73, 79, -83, 86, -89, 90, -90, 90, -89, 87, -85, 81, -76, 72, -65, 59, -52, 44, -37, 29, -20, 11, -2, -7, 15, -23, 32, -41, 48, -55, 62, -68, 74, -78, 82, -85, 88, -89, 90, -90, 90, -87, 84, -80, 77, -72, 66, -60, 53, -46, 38, -30, 22, -13, 5,}
{5, -8, 13, -17, 22, -26, 30, -34, 38, -42, 46, -49, 53, -58, 60, -64, 66, -69, 72, -73, 77, -79, 80, -83, 84, -86, 87, -89, 90,

-90, 90, -90, 90, -90, 89, -89, 88, -87, 85, -85, 82, -81, 78, -76, 74, -72, 68, -65, 62, -59, 55, -52, 48, -44, 41, -37, 32, -29, 23, -20, 15, -11, 7, -2,}

4-Point DCT-8:
{84, 74, 55, 29,}
{74, 0, -74, -74,}
{55, -74, -29, 84,}
{29, -74, 84, -55,}

8-Point DCT-8:
{86, 85, 78, 71, 60, 46, 32, 17,}
{85, 60, 17, -32, -71, -86, -78, -46,}
{78, 17, -60, -86, -46, 32, 85, 71,}
{71, -32, -86, -17, 78, 60, -46, -85,}
{60, -71, -46, 78, 32, -85, -17, 86,}
{46, -86, 32, 60, -85, 17, 71, -78,}
{32, -78, 85, -46, -17, 71, -86, 60,}
{17, -46, 71, -85, 86, -78, 60, -32,}

16-Point DCT-8:
{90, 89, 87, 83, 81, 77, 72, 66, 62, 56, 49, 41, 33, 25, 17, 9,}
{89, 81, 66, 49, 25, 0, -25, -49, -66, -81, -89, -89, -81, -66, -49, -25,}
{87, 66, 33, -9, -49, -77, -90, -81, -56, -17, 25, 62, 83, 89, 72, 41,}
{83, 49, -9, -62, -89, -77, -33, 25, 72, 90, 66, 17, -41, -81, -87, -56,}
{81, 25, -49, -89, -66, 0, 66, 89, 49, -25, -81, -81, -25, 49, 89, 66,}
{77, 0, -77, -77, 0, 77, 77, 0, -77, -77, 0, 77, 77, 0, -77, -77,}
{72, -25, -90, -33, 66, 77, -17, -89, -41, 62, 81, -9, -87, -49, 56, 83,}
{66, -49, -81, 25, 89, 0, -89, -25, 81, 49, -66, -66, 49, 81, -25, -89,}
{62, -66, -56, 72, 49, -77, -41, 81, 33, -83, -25, 87, 17, -89, -9, 90,}
{56, -81, -17, 90, -25, -77, 62, 49, -83, -9, 89, -33, -72, 66, 41, -87,}
{49, -89, 25, 66, -81, 0, 81, -66, -25, 89, -49, -49, 89, -25, -66, 81,}
{41, -89, 62, 17, -81, 77, -9, -66, 87, -33, -49, 90, -56, -25, 83, -72,}
{33, -81, 83, -41, -25, 77, -87, 49, 17, -72, 89, -56, -9, 66, -90, 62,}
{25, -66, 89, -81, 49, 0, -49, 81, -89, 66, -25, -25, 66, -89, 81, -49,}
{17, -49, 72, -87, 89, -77, 56, -25, -9, 41, -66, 83, -90, 81, -62, 33,}
{9, -25, 41, -56, 66, -77, 83, -89, 90, -87, 81, -72, 62, -49, 33, -17,}

32-Point DCT-8:
{90, 90, 89, 88, 88, 86, 85, 84, 82, 80, 78, 77, 74, 72, 68, 66, 63, 60, 56, 53, 50, 45, 42, 38, 34, 30, 26, 21, 17, 13, 9, 4,}
{90, 88, 84, 78, 72, 63, 53, 42, 30, 17, 4, -9, -21, -34, -45, -56, -66, -74, -80, -85, -88, -90, -89, -86, -82, -77, -68, -60, -50, -38, -26, -13,}
{89, 84, 74, 60, 42, 21, 0, -21, -42, -60, -74, -84, -89, -89, -84, -74, -60, -42, -21, 0, 21, 42, 60, 74, 84, 89, 89, 84, 74, 60, 42, 21,}
{88, 78, 60, 34, 4, -26, -53, -74, -86, -90, -82, -66, -42, -13, 17, 45, 68, 84, 90, 85, 72, 50, 21, -9, -38, -63, -80, -89, -88, -77, -56, -30,}
{88, 72, 42, 4, -34, -66, -85, -89, -77, -50, -13, 26, 60, 82, 90, 80, 56, 21, -17, -53, -78, -90, -84, -63, -30, 9, 45, 74, 88, 86, 68, 38,}
{86, 63, 21, -26, -66, -88, -85, -60, -17, 30, 68, 88, 84, 56, 13, -34, -72, -89, -82, -53, -9, 38, 74, 90, 80, 50, 4, -42, -77, -90, -78, -45,}

{85, 53, 0, -53, -85, -85, -53, 0, 53, 85, 85, 53, 0, -53, -85, -85, -53, 0, 53, 85, 85, 53, 0, -53, -85, -85, -53, 0, 53, 85, 85, 53,}
{84, 42, -21, -74, -89, -60, 0, 60, 89, 74, 21, -42, -84, -84, -42, 21, 74, 89, 60, 0, -60, -89, -74, -21, 42, 84, 84, 42, -21, -74, -89, -60,}
{82, 30, -42, -86, -77, -17, 53, 89, 68, 4, -63, -90, -60, 9, 72, 88, 50, -21, -78, -85, -38, 34, 84, 80, 26, -45, -88, -74, -13, 56, 90, 66,}
{80, 17, -60, -90, -50, 30, 85, 74, 4, -68, -88, -38, 42, 88, 66, -9, -77, -84, -26, 53, 90, 56, -21, -82, -78, -13, 63, 89, 45, -34, -86, -72,}
{78, 4, -74, -82, -13, 68, 85, 21, -63, -88, -30, 56, 89, 38, -50, -90, -45, 42, 90, 53, -34, -88, -60, 26, 86, 66, -17, -84, -72, 9, 80, 77,}
{77, -9, -84, -66, 26, 88, 53, -42, -90, -38, 56, 88, 21, -68, -82, -4, 78, 74, -13, -85, -63, 30, 89, 50, -45, -90, -34, 60, 86, 17, -72, -80,}
{74, -21, -89, -42, 60, 84, 0, -84, -60, 42, 89, 21, -74, -74, 21, 89, 42, -60, -84, 0, 84, 60, -42, -89, -21, 74, 74, -21, -89, -42, 60, 84,}
{72, -34, -89, -13, 82, 56, -53, -84, 9, 88, 38, -68, -74, 30, 90, 17, -80, -60, 50, 85, -4, -88, -42, 66, 77, -26, -90, -21, 78, 63, -45, -86,}
{68, -45, -84, 17, 90, 13, -85, -42, 72, 66, -50, -82, 21, 90, 9, -86, -38, 74, 63, -53, -80, 26, 89, 4, -88, -34, 77, 60, -56, -78, 30, 88,}
{66, -56, -74, 45, 80, -34, -85, 21, 88, -9, -90, -4, 89, 17, -86, -30, 82, 42, -77, -53, 68, 63, -60, -72, 50, 78, -38, -84, 26, 88, -13, -90,}
{63, -66, -60, 68, 56, -72, -53, 74, 50, -77, -45, 78, 42, -80, -38, 82, 34, -84, -30, 85, 26, -86, -21, 88, 17, -88, -13, 89, 9, -90, -4, 90,}
{60, -74, -42, 84, 21, -89, 0, 89, -21, -84, 42, 74, -60, -60, 74, 42, -84, -21, 89, 0, -89, 21, 84, -42, -74, 60, 60, -74, -42, 84, 21, -89,}
{56, -80, -21, 90, -17, -82, 53, 60, -78, -26, 90, -13, -84, 50, 63, -77, -30, 89, -9, -85, 45, 66, -74, -34, 88, -4, -86, 42, 68, -72, -38, 88,}
{53, -85, 0, 85, -53, -53, 85, 0, -85, 53, 53, -85, 0, 85, -53, -53, 85, 0, -85, 53, 53, -85, 0, 85, -53, -53, 85, 0, -85, 53, 53, -85,}
{50, -88, 21, 72, -78, -9, 85, -60, -38, 90, -34, -63, 84, -4, -80, 68, 26, -89, 45, 53, -88, 17, 74, -77, -13, 86, -56, -42, 90, -30, -66, 82,}
{45, -90, 42, 50, -90, 38, 53, -89, 34, 56, -88, 30, 60, -88, 26, 63, -86, 21, 66, -85, 17, 68, -84, 13, 72, -82, 9, 74, -80, 4, 77, -78,}
{42, -89, 60, 21, -84, 74, 0, -74, 84, -21, -60, 89, -42, -42, 89, -60, -21, 84, -74, 0, 74, -84, 21, 60, -89, 42, 42, -89, 60, 21, -84, 74,}
{38, -86, 74, -9, -63, 90, -53, -21, 80, -82, 26, 50, -89, 66, 4, -72, 88, -42, -34, 85, -77, 13, 60, -90, 56, 17, -78, 84, -30, -45, 88, -68,}
{34, -82, 84, -38, -30, 80, -85, 42, 26, -78, 86, -45, -21, 77, -88, 50, 17, -74, 88, -53, -13, 72, -89, 56, 9, -68, 90, -60, -4, 66, -90, 63,}
{30, -77, 89, -63, 9, 50, -85, 84, -45, -13, 66, -90, 74, -26, -34, 78, -88, 60, -4, -53, 86, -82, 42, 17, -68, 90, -72, 21, 38, -80, 88, -56,}
{26, -68, 89, -80, 45, 4, -53, 84, -88, 63, -17, -34, 74, -90, 77, -38, -13, 60, -86, 85, -56, 9, 42, -78, 90, -72, 30, 21, -66, 88, -82, 50,}
{21, -60, 84, -89, 74, -42, 0, 42, -74, 89, -84, 60, -21, -21, 60, -84, 89, -74, 42, 0, -42, 74, -89, 84, -60, 21, 21, -60, 84, -89, 74, -42,}

{17, -50, 74, -88, 88, -77, 53, -21, -13, 45, -72, 86, -89, 78, -56, 26, 9, -42, 68, -85, 90, -80, 60, -30, -4, 38, -66, 84, -90, 82, -63, 34,}
{13, -38, 60, -77, 86, -90, 85, -74, 56, -34, 9, 17, -42, 63, -78, 88, -90, 84, -72, 53, -30, 4, 21, -45, 66, -80, 88, -89, 82, -68, 50, -26,}
{9, -26, 42, -56, 68, -78, 85, -89, 90, -86, 80, -72, 60, -45, 30, -13, -4, 21, -38, 53, -66, 77, -84, 88, -90, 88, -82, 74, -63, 50, -34, 17,}
{4, -13, 21, -30, 38, -45, 53, -60, 66, -72, 77, -80, 84, -86, 88, -90, 90, -89, 88, -85, 82, -78, 74, -68, 63, -56, 50, -42, 34, -26, 17, -9,}

64-Point DCT-8:

{90, 90, 90, 90, 90, 89, 90, 89, 89, 88, 87, 87, 86, 85, 84, 85, 83, 82, 80, 81, 79, 78, 77, 76, 73, 74, 72, 72, 69, 68, 66, 65, 64, 62, 60, 59, 58, 55, 53, 52, 49, 48, 46, 44, 42, 41, 38, 37, 34, 32, 30, 29, 26, 23, 22, 20, 17, 15, 13, 11, 8, 7, 5, 2,}
{90, 90, 89, 87, 85, 83, 81, 77, 74, 69, 65, 60, 55, 49, 44, 38, 32, 26, 20, 13, 7, 0, -7, -13, -20, -26, -32, -38, -44, -49, -55, -60, -65, -69, -74, -77, -81, -83, -85, -87, -89, -90, -90, -90, -90, -89, -87, -85, -83, -81, -77, -74, -69, -65, -60, -55, -49, -44, -38, -32, -26, -20, -13, -7,}
{90, 89, 86, 82, 77, 72, 64, 55, 46, 37, 26, 15, 5, -7, -17, -29, -38, -48, -58, -65, -72, -78, -83, -87, -90, -90, -90, -89, -85, -80, -76, -69, -62, -53, -44, -34, -23, -13, -2, 8, 20, 30, 41, 49, 59, 66, 74, 79, 85, 87, 89, 90, 90, 88, 84, 81, 73, 68, 60, 52, 42, 32, 22, 11,}
{90, 87, 82, 73, 65, 53, 41, 26, 11, -5, -20, -34, -48, -60, -72, -79, -85, -90, -90, -89, -84, -78, -69, -59, -46, -32, -17, -2, 13, 29, 42, 55, 66, 76, 83, 88, 90, 90, 87, 80, 74, 64, 52, 38, 23, 8, -7, -22, -37, -49, -62, -72, -81, -86, -89, -90, -89, -85, -77, -68, -58, -44, -30, -15,}
{90, 85, 77, 65, 49, 32, 13, -7, -26, -44, -60, -74, -83, -89, -90, -87, -81, -69, -55, -38, -20, 0, 20, 38, 55, 69, 81, 87, 90, 89, 83, 74, 60, 44, 26, 7, -13, -32, -49, -65, -77, -85, -90, -90, -85, -77, -65, -49, -32, -13, 7, 26, 44, 60, 74, 83, 89, 90, 87, 81, 69, 55, 38, 20,}
{89, 83, 72, 53, 32, 8, -15, -38, -59, -73, -85, -90, -89, -81, -66, -48, -26, -2, 22, 44, 64, 78, 87, 90, 87, 77, 62, 42, 20, -5, -29, -49, -68, -80, -89, -90, -84, -74, -58, -37, -13, 11, 34, 55, 72, 85, 90, 90, 82, 69, 52, 30, 7, -17, -41, -60, -76, -86, -90, -88, -79, -65, -46, -23,}
{90, 81, 64, 41, 13, -15, -42, -65, -80, -89, -89, -79, -62, -38, -11, 17, 44, 66, 82, 90, 89, 78, 60, 37, 8, -20, -46, -68, -83, -90, -88, -77, -59, -34, -7, 22, 48, 69, 85, 90, 87, 76, 58, 32, 5, -23, -49, -72, -84, -90, -87, -73, -55, -30, -2, 26, 52, 72, 85, 90, 86, 74, 53, 29,}
{89, 77, 55, 26, -7, -38, -65, -83, -90, -85, -69, -44, -13, 20, 49, 74, 87, 90, 81, 60, 32, 0, -32, -60, -81, -90, -87, -74, -49, -20, 13, 44, 69, 85, 90, 83, 65, 38, 7, -26, -55, -77, -89, -89, -77, -55, -26, 7, 38, 65, 83, 90, 85, 69, 44, 13, -20, -49, -74, -87, -90, -81, -60, -32,}
{89, 74, 46, 11, -26, -59, -80, -90, -85, -64, -32, 5, 41, 69, 87, 89, 77, 52, 17, -20, -53, -78, -90, -86, -68, -38, -2, 34, 65, 84, 90, 81, 58, 23, -13, -48, -73, -89, -88, -72, -44, -8, 29, 60, 82, 90, 83, 62, 30, -7, -42, -72, -87, -90, -76, -49, -15, 22, 55, 79, 90, 85, 66, 37,}
{88, 69, 37, -5, -44, -73, -89, -85, -64, -29, 13, 52, 79, 90, 82, 58, 20, -22, -59, -83, -90, -78, -49, -11, 30, 65, 86, 90, 74, 42, 2, -38, -72, -89, -87, -68, -34, 7, 46, 76, 90, 84, 62, 26, -15, -53, -81, -90, -80, -55, -17, 23, 60, 85, 90, 77, 48, 8, -32, -66, -87, -89, -72, -41,}
{87, 65, 26, -20, -60, -85, -89, -69, -32, 13, 55, 83, 90, 74, 38, -7, -49, -81, -90, -77, -44, 0, 44, 77, 90, 81, 49, 7, -38, -74, -90, -83, -55, -13, 32, 69, 89, 85, 60, 20, -26, -65, -87, -87, -65, -26, 20, 60, 85, 89, 69, 32, -13, -55, -83, -90, -74, -38, 7, 49, 81, 90, 77, 44,}

{87, 60, 15, -34, -74, -90, -79, -44, 5, 52, 83, 90, 68, 26, -23, -66, -89, -85, -53, -7, 42, 78, 90, 73, 37, -13, -59, -86, -87, -62, -17, 32, 72, 90, 81, 46, -2, -49, -82, -89, -69, -29, 22, 65, 89, 84, 55, 8, -41, -77, -90, -76, -38, 11, 58, 85, 88, 64, 20, -30, -72, -90, -80, -48,}
{86, 55, 5, -48, -83, -89, -62, -13, 41, 79, 90, 68, 22, -32, -73, -90, -74, -30, 23, 69, 90, 78, 38, -15, -64, -89, -82, -46, 7, 58, 87, 85, 53, 2, -49, -85, -88, -60, -11, 42, 81, 89, 66, 20, -34, -76, -90, -72, -29, 26, 72, 90, 77, 37, -17, -65, -90, -80, -44, 8, 59, 87, 84, 52,}
{85, 49, -7, -60, -89, -81, -38, 20, 69, 90, 74, 26, -32, -77, -90, -65, -13, 44, 83, 87, 55, 0, -55, -87, -83, -44, 13, 65, 90, 77, 32, -26, -74, -90, -69, -20, 38, 81, 89, 60, 7, -49, -85, -85, -49, 7, 60, 89, 81, 38, -20, -69, -90, -74, -26, 32, 77, 90, 65, 13, -44, -83, -87, -55,}
{84, 44, -17, -72, -90, -66, -11, 49, 87, 82, 38, -23, -73, -90, -62, -5, 55, 89, 79, 32, -30, -78, -89, -58, 2, 60, 89, 76, 26, -37, -80, -87, -52, 8, 65, 90, 72, 20, -42, -85, -85, -46, 15, 69, 90, 68, 13, -48, -86, -83, -41, 22, 74, 90, 64, 7, -53, -88, -81, -34, 29, 77, 90, 59,}
{85, 38, -29, -79, -87, -48, 17, 74, 89, 58, -7, -66, -90, -65, -5, 59, 90, 72, 15, -49, -88, -78, -26, 41, 84, 83, 37, -30, -81, -87, -46, 20, 73, 90, 55, -8, -68, -90, -64, -2, 60, 90, 72, 13, -52, -89, -77, -23, 42, 85, 82, 34, -32, -80, -86, -44, 22, 76, 89, 53, -11, -69, -90, -62,}
{83, 32, -38, -85, -81, -26, 44, 87, 77, 20, -49, -89, -74, -13, 55, 90, 69, 7, -60, -90, -65, 0, 65, 90, 60, -7, -69, -90, -55, 13, 74, 89, 49, -20, -77, -87, -44, 26, 81, 85, 38, -32, -83, -83, -32, 38, 85, 81, 26, -44, -87, -77, -20, 49, 89, 74, 13, -55, -90, -69, -7, 60, 90, 65,}
{82, 26, -48, -90, -69, -2, 66, 90, 52, -22, -81, -85, -30, 44, 89, 72, 7, -64, -90, -55, 17, 78, 85, 34, -41, -87, -73, -11, 60, 90, 59, -13, -76, -87, -38, 37, 86, 77, 15, -58, -90, -62, 8, 74, 88, 42, -32, -84, -79, -20, 53, 90, 65, -5, -72, -89, -46, 29, 83, 80, 23, -49, -89, -68,}
{80, 20, -58, -90, -55, 22, 82, 81, 17, -59, -90, -53, 23, 83, 79, 15, -60, -90, -52, 26, 85, 78, 13, -62, -90, -49, 29, 84, 77, 11, -64, -90, -48, 30, 85, 76, 8, -65, -89, -46, 32, 86, 73, 7, -66, -90, -44, 34, 87, 74, 5, -68, -89, -42, 37, 87, 72, 2, -69, -89, -41, 38, 88, 72,}
{81, 13, -65, -89, -38, 44, 90, 60, -20, -83, -77, -7, 69, 87, 32, -49, -90, -55, 26, 85, 74, 0, -74, -85, -26, 55, 90, 49, -32, -87, -69, 7, 77, 83, 20, -60, -90, -44, 38, 89, 65, -13, -81, -81, -13, 65, 89, 38, -44, -90, -60, 20, 83, 77, 7, -69, -87, -32, 49, 90, 55, -26, -85, -74,}
{79, 7, -72, -84, -20, 64, 89, 32, -53, -90, -44, 42, 90, 55, -30, -88, -65, 17, 85, 74, -5, -78, -81, -8, 72, 85, 22, -62, -89, -34, 52, 90, 46, -41, -90, -58, 29, 87, 66, -15, -83, -73, 2, 77, 80, 11, -69, -86, -23, 60, 90, 37, -49, -90, -48, 38, 89, 59, -26, -87, -68, 13, 82, 76,}
{78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78, 0, 78, 78, 0, -78, -78,}
{77, -7, -83, -69, 20, 87, 60, -32, -90, -49, 44, 90, 38, -55, -89, -26, 65, 85, 13, -74, -81, 0, 81, 74, -13, -85, -65, 26, 89, 55, -38, -90, -44, 49, 90, 32, -60, -87, -20, 69, 83, 7, -77, -77, 7, 83, 69, -20, -87, -60, 32, 90, 49, -44, -90, -38, 55, 89, 26, -65, -85, -13, 74, 81,}
{76, -13, -87, -59, 38, 90, 37, -60, -86, -11, 77, 73, -15, -87, -58, 41, 90, 34, -62, -85, -8, 78, 74, -17, -88, -55, 42, 90, 32, -64, -84, -7, 79, 72, -20, -89, -53, 44, 90, 30, -65, -85, -5, 81, 72, -22, -89, -52, 46, 90, 29, -66, -83, -2, 80, 69, -23, -90, -49, 48, 89, 26, -68, -82,}
{73, -20, -90, -46, 55, 87, 8, -81, -68, 30, 90, 37, -64, -83, 2, 84, 60, -41, -90, -26, 72, 78, -13, -88, -52, 49, 89, 15, -77,

-72, 23, 90, 42, -59, -85, -5, 82, 65, -34, -90, -32, 66, 80, -7, -86, -58, 44, 89, 22, -74, -76, 17, 89, 48, -53, -87, -11, 79, 69, -29, -90, -38, 62, 85,}
{74, -26, -90, -32, 69, 77, -20, -90, -38, 65, 81, -13, -89, -44, 60, 83, -7, -87, -49, 55, 85, 0, -85, -55, 49, 87, 7, -83, -60, 44, 89, 13, -81, -65, 38, 90, 20, -77, -69, 32, 90, 26, -74, -74, 26, 90, 32, -69, -77, 20, 90, 38, -65, -81, 13, 89, 44, -60, -83, 7, 87, 49, -55, -85,}
{72, -32, -90, -17, 81, 62, -46, -87, -2, 86, 49, -59, -82, 13, 89, 37, -69, -73, 29, 90, 22, -78, -65, 42, 89, 7, -84, -53, 55, 85, -8, -89, -41, 66, 77, -23, -90, -26, 76, 68, -38, -90, -11, 83, 58, -52, -85, 5, 88, 44, -64, -79, 20, 90, 30, -74, -72, 34, 90, 15, -80, -60, 48, 87,}
{72, -38, -89, -2, 87, 42, -68, -74, 34, 90, 7, -86, -46, 65, 76, -30, -90, -11, 84, 49, -62, -78, 26, 90, 15, -83, -53, 59, 81, -22, -90, -20, 80, 58, -55, -82, 17, 90, 23, -79, -60, 52, 85, -13, -90, -29, 77, 64, -48, -85, 8, 89, 32, -73, -66, 44, 87, -5, -89, -37, 72, 69, -41, -88,}
{69, -44, -85, 13, 90, 20, -83, -49, 65, 74, -38, -87, 7, 90, 26, -81, -55, 60, 77, -32, -89, 0, 89, 32, -77, -60, 55, 81, -26, -90, -7, 87, 38, -74, -65, 49, 83, -20, -90, -13, 85, 44, -69, -69, 44, 85, -13, -90, -20, 83, 49, -65, -74, 38, 87, -7, -90, -26, 81, 55, -60, -77, 32, 89,}
{68, -49, -80, 29, 89, -5, -90, -20, 84, 42, -74, -62, 58, 77, -37, -87, 13, 90, 11, -87, -34, 78, 55, -64, -72, 44, 85, -22, -90, -2, 90, 26, -82, -48, 69, 66, -52, -81, 30, 89, -7, -90, -17, 85, 41, -73, -60, 59, 76, -38, -86, 15, 90, 8, -88, -32, 79, 53, -65, -72, 46, 83, -23, -89,}
{66, -55, -76, 42, 83, -29, -88, 13, 90, 2, -90, -17, 87, 32, -80, -46, 74, 59, -64, -69, 52, 78, -38, -84, 23, 89, -8, -90, -7, 90, 22, -85, -37, 79, 49, -72, -62, 60, 72, -48, -81, 34, 86, -20, -89, 5, 90, 11, -89, -26, 85, 41, -77, -53, 68, 65, -58, -73, 44, 82, -30, -87, 15, 90,}
{65, -60, -69, 55, 74, -49, -77, 44, 81, -38, -83, 32, 85, -26, -87, 20, 89, -13, -90, 7, 90, 0, -90, -7, 90, 13, -89, -20, 87, 26, -85, -32, 83, 38, -81, -44, 77, 49, -74, -55, 69, 60, -65, -65, 60, 69, -55, -74, 49, 77, -44, -81, 38, 83, -32, -85, 26, 87, -20, -89, 13, 90, -7, -90,}
{64, -65, -62, 66, 60, -68, -59, 69, 58, -72, -55, 72, 53, -74, -52, 73, 49, -76, -48, 77, 46, -78, -44, 79, 42, -81, -41, 80, 38, -82, -37, 83, 34, -85, -32, 84, 30, -85, -29, 86, 26, -87, -23, 87, 22, -88, -20, 89, 17, -89, -15, 90, 13, -89, -11, 90, 8, -90, -7, 90, 5, -90, -2, 90,}
{62, -69, -53, 76, 44, -80, -34, 85, 23, -89, -13, 90, 2, -90, 8, 90, -20, -87, 30, 83, -41, -78, 49, 72, -59, -65, 66, 58, -74, -48, 79, 38, -85, -29, 87, 17, -89, -7, 90, -5, -90, 15, 88, -26, -84, 37, 81, -46, -73, 55, 68, -64, -60, 72, 52, -77, -42, 82, 32, -86, -22, 89, 11, -90,}
{60, -74, -44, 83, 26, -89, -7, 90, -13, -87, 32, 81, -49, -69, 65, 55, -77, -38, 85, 20, -90, 0, 90, -20, -85, 38, 77, -55, -65, 69, 49, -81, -32, 87, 13, -90, 7, 89, -26, -83, 44, 74, -60, -60, 74, 44, -83, -26, 89, 7, -90, 13, 87, -32, -81, 49, 69, -65, -55, 77, 38, -85, -20, 90,}
{59, -77, -34, 88, 7, -90, 22, 83, -48, -68, 69, 46, -85, -20, 90, -8, -87, 37, 76, -60, -58, 78, 32, -89, -5, 90, -23, -82, 49, 66, -72, -44, 84, 17, -90, 11, 87, -38, -73, 62, 55, -79, -30, 89, 2, -89, 26, 80, -52, -65, 72, 42, -85, -15, 90, -13, -86, 41, 74, -64, -53, 81, 29, -90,}
{58, -81, -23, 90, -13, -84, 48, 65, -73, -34, 89, -2, -88, 38, 72, -68, -44, 86, 8, -90, 29, 78, -60, -53, 82, 20, -90, 17, 83, -52, -62, 77, 30, -89, 7, 87, -42, -69, 72, 41, -87, -5, 90, -32, -76, 64, 49, -85, -15, 90, -22, -80, 55, 59, -79, -26, 90, -11, -85, 46, 66, -74, -37, 89,}
{55, -83, -13, 90, -32, -74, 69, 38, -89, 7, 85, -49, -60, 81, 20, -90, 26, 77, -65, -44, 87, 0, -87, 44, 65, -77, -26, 90, -20, -81, 60, 49, -85, -7, 89, -38, -69, 74, 32, -90, 13, 83, -55, -55, 83, 13, -90, 32, 74, -69, -38, 89, -7, -85, 49, 60, -81, -20, 90, -26, -77, 65, 44, -87,}
{53, -85, -2, 87, -49, -58, 85, 7, -88, 46, 60, -82, -11, 89, -42, -64, 81, 15, -89, 38, 66, -78, -20, 90, -34, -69, 76, 23, -90, 30, 72, -74, -29, 90, -26, -73, 72, 32, -90, 22, 77, -68, -37, 90, -17, -79, 65, 41, -90, 13, 80, -62, -44, 89, -8, -83, 59, 48, -87, 5, 84, -55, -52, 86,}
{52, -87, 8, 80, -65, -37, 90, -26, -72, 76, 20, -89, 42, 60, -85, -2, 85, -58, -46, 89, -15, -78, 69, 30, -90, 32, 68, -79, -13, 89, -48, -55, 86, -5, -83, 62, 41, -90, 22, 73, -74, -23, 90, -38, -64, 82, 7, -87, 53, 49, -88, 11, 81, -66, -34, 90, -29, -72, 77, 17, -90, 44, 59, -84,}
{49, -89, 20, 74, -77, -13, 87, -55, -44, 90, -26, -69, 81, 7, -85, 60, 38, -90, 32, 65, -83, 0, 83, -65, -32, 90, -38, -60, 85, -7, -81, 69, 26, -90, 44, 55, -87, 13, 77, -74, -20, 89, -49, -49, 89, -20, -74, 77, 13, -87, 55, 44, -90, 26, 69, -81, -7, 85, -60, -38, 90, -32, -65, 83,}
{48, -90, 30, 64, -85, 11, 76, -77, -8, 84, -65, -29, 89, -49, -46, 90, -32, -62, 86, -13, -73, 78, 7, -85, 66, 26, -90, 52, 44, -90, 34, 60, -87, 15, 74, -79, -5, 83, -68, -23, 89, -53, -42, 90, -37, -59, 87, -17, -72, 81, 2, -82, 69, 22, -89, 55, 41, -90, 38, 58, -88, 20, 72, -80,}
{46, -90, 41, 52, -90, 34, 58, -89, 29, 62, -87, 22, 66, -85, 15, 72, -83, 8, 73, -81, 2, 78, -77, -5, 80, -74, -11, 85, -69, -17, 86, -65, -23, 88, -60, -30, 90, -55, -37, 90, -49, -42, 90, -44, -48, 90, -38, -53, 89, -32, -59, 89, -26, -64, 87, -20, -68, 84, -13, -72, 82, -7, -76, 79,}
{44, -90, 49, 38, -90, 55, 32, -89, 60, 26, -87, 65, 20, -85, 69, 13, -83, 74, 7, -81, 77, 0, -77, 81, -7, -74, 83, -13, -69, 85, -20, -65, 87, -26, -60, 89, -32, -55, 90, -38, -49, 90, -44, -44, 90, -49, -38, 90, -55, -32, 89, -60, -26, 87, -65, -20, 85, -69, -13, 83, -74, -7, 81, -77,}
{42, -90, 59, 23, -85, 72, 5, -77, 82, -15, -65, 89, -34, -49, 90, -52, -32, 88, -66, -13, 80, -78, 7, 72, -86, 26, 58, -90, 44, 41, -89, 60, 22, -84, 74, 2, -76, 83, -17, -64, 89, -37, -48, 90, -53, -30, 87, -68, -11, 81, -79, 8, 69, -87, 29, 55, -90, 46, 38, -90, 62, 20, -85, 73,}
{41, -89, 66, 8, -77, 85, -23, -55, 90, -53, -26, 84, -76, 7, 68, -89, 38, 42, -90, 65, 11, -78, 83, -22, -58, 90, -52, -29, 85, -73, 5, 69, -88, 37, 44, -89, 64, 13, -79, 82, -20, -59, 90, -49, -30, 86, -74, 2, 72, -87, 34, 46, -90, 62, 15, -81, 80, -17, -60, 90, -48, -32, 87, -72,}
{38, -87, 74, -7, -65, 90, -49, -26, 83, -81, 20, 55, -90, 60, 13, -77, 85, -32, -44, 89, -69, 0, 69, -89, 44, 32, -85, 77, -13, -60, 90, -55, -20, 81, -83, 26, 49, -90, 65, 7, -74, 87, -38, -38, 87, -74, 7, 65, -90, 49, 26, -83, 81, -20, -55, 90, -60, -13, 77, -85, 32, 44, -89, 69,}
{37, -85, 79, -22, -49, 90, -72, 7, 62, -90, 60, 8, -72, 89, -48, -23, 81, -84, 34, 38, -86, 78, -20, -52, 89, -69, 5, 64, -90, 59, 11, -74, 89, -46, -26, 80, -85, 32, 41, -87, 77, -17, -53, 90, -68, 2, 65, -90, 58, 13, -73, 88, -44, -29, 82, -83, 30, 42, -87, 76, -15, -55, 90, -66,}
{34, -83, 85, -37, -32, 82, -84, 38, 30, -80, 85, -41, -29, 81, -86, 42, 26, -79, 87, -44, -23, 78, -87, 46, 22, -77, 88, -48, -20, 76, -89, 49, 17, -73, 89, -52, -15, 74, -90, 53, 13, -72, 89, -55, -11, 72, -90, 58, 8, -69, 90, -59, -7, 68, -90, 60, 5, -66, 90, -62, -2, 65, -90, 64,}
{32, -81, 87, -49, -13, 69, -90, 65, -7, -55, 89, -77, 26, 38, -83, 85, -44, -20, 74, -90, 60, 0, -60, 90, -74, 20, 44, -85, 83, -38, -26, 77, -89, 55, 7, -65, 90, -69, 13, 49, -87, 81, -32, -32, 81, -87, 49, 13, -69, 90, -65, 7, 55, -89, 77, -26, -38, 83, -85, 44, 20, -74, 90, -60,}
{30, -77, 89, -62, 7, 52, -87, 83, -42, -17, 69, -90, 72, -20, -41, 82, -87, 53, 5, -60, 90, -78, 32, 29, -76, 90, -64, 8, 49,

-86, 85, -44, -15, 68, -90, 72, -22, -38, 80, -88, 55, 2, -59, 89, -79, 34, 26, -73, 90, -65, 11, 48, -85, 84, -46, -13, 66, -90, 74, -23, -37, 81, -89, 58,}

{29, -74, 90, -72, 26, 30, -73, 90, -72, 23, 32, -76, 90, -69, 22, 34, -77, 90, -68, 20, 37, -78, 90, -66, 17, 38, -79, 89, -65, 15, 41, -81, 90, -64, 13, 42, -80, 89, -62, 11, 44, -82, 89, -60, 8, 46, -83, 88, -59, 7, 48, -85, 87, -58, 5, 49, -84, 87, -55, 2, 52, -85, 86, -53,}

{26, -69, 90, -81, 44, 7, -55, 85, -87, 60, -13, -38, 77, -90, 74, -32, -20, 65, -89, 83, -49, 0, 49, -83, 89, -65, 20, 32, -74, 90, -77, 38, 13, -60, 87, -85, 55, -7, -44, 81, -90, 69, -26, -26, 69, -90, 81, -44, -7, 55, -85, 87, -60, 13, 38, -77, 90, -74, 32, 20, -65, 89, -83, 49,}

{23, -65, 88, -86, 60, -17, -30, 69, -90, 85, -55, 11, 37, -74, 90, -80, 49, -5, -42, 77, -90, 78, -44, -2, 48, -81, 90, -73, 38, 8, -53, 83, -89, 72, -32, -15, 59, -85, 89, -66, 26, 22, -64, 87, -87, 62, -20, -29, 68, -89, 84, -58, 13, 34, -72, 90, -82, 52, -7, -41, 76, -90, 79, -46,}

{22, -60, 84, -89, 74, -41, -2, 44, -76, 90, -83, 58, -17, -26, 64, -86, 89, -72, 37, 7, -48, 78, -90, 80, -53, 13, 30, -66, 87, -88, 68, -32, -11, 52, -81, 90, -79, 49, -8, -34, 69, -89, 87, -65, 29, 15, -55, 82, -90, 77, -46, 5, 38, -72, 90, -85, 62, -23, -20, 59, -85, 90, -73, 42,}

{20, -55, 81, -90, 83, -60, 26, 13, -49, 77, -90, 85, -65, 32, 7, -44, 74, -89, 87, -69, 38, 0, -38, 69, -87, 89, -74, 44, -7, -32, 65, -85, 90, -77, 49, -13, -26, 60, -83, 90, -81, 55, -20, -20, 55, -81, 90, -83, 60, -26, -13, 49, -77, 90, -85, 65, -32, -7, 44, -74, 89, -87, 69, -38,}

{17, -49, 73, -89, 89, -76, 52, -20, -15, 48, -74, 88, -90, 77, -53, 22, 13, -46, 72, -87, 89, -78, 55, -23, -11, 44, -72, 87, -90, 79, -58, 26, 8, -42, 69, -86, 90, -81, 59, -29, -7, 41, -68, 85, -90, 80, -60, 30, 5, -38, 66, -84, 90, -82, 62, -32, -2, 37, -65, 85, -90, 83, -64, 34,}

{15, -44, 68, -85, 90, -86, 72, -49, 22, 8, -38, 64, -80, 90, -88, 76, -55, 29, 2, -32, 59, -78, 89, -90, 79, -60, 34, -5, -26, 53, -73, 87, -90, 82, -65, 41, -11, -20, 48, -72, 85, -90, 84, -69, 46, -17, -13, 42, -66, 83, -90, 87, -74, 52, -23, -7, 37, -62, 81, -89, 89, -77, 58, -30,}

{13, -38, 60, -77, 87, -90, 85, -74, 55, -32, 7, 20, -44, 65, -81, 89, -90, 83, -69, 49, -26, 0, 26, -49, 69, -83, 90, -89, 81, -65, 44, -20, -7, 32, -55, 74, -85, 90, -87, 77, -60, 38, -13, -13, 38, -60, 77, -87, 90, -85, 74, -55, 32, -7, -20, 44, -65, 81, -89, 90, -83, 69, -49, 26,}

{11, -32, 52, -68, 81, -88, 90, -87, 79, -66, 49, -30, 8, 13, -34, 53, -69, 80, -89, 90, -87, 78, -65, 48, -29, 7, 15, -37, 55, -72, 82, -89, 90, -86, 77, -64, 46, -26, 5, 17, -38, 58, -72, 83, -90, 90, -85, 76, -62, 44, -23, 2, 20, -41, 59, -74, 85, -89, 90, -84, 73, -60, 42, -22,}

{8, -26, 42, -58, 69, -79, 86, -90, 90, -87, 81, -72, 59, -44, 29, -11, -7, 23, -41, 55, -68, 78, -85, 89, -90, 87, -80, 72, -60, 46, -30, 13, 5, -22, 38, -53, 66, -77, 84, -90, 90, -88, 82, -74, 62, -48, 32, -15, -2, 20, -37, 52, -65, 76, -85, 89, -90, 89, -83, 73, -64, 49, -34, 17,}

{7, -20, 32, -44, 55, -65, 74, -81, 85, -89, 90, -90, 87, -83, 77, -69, 60, -49, 38, -26, 13, 0, -13, 26, -38, 49, -60, 69, -77, 83, -87, 90, -90, 89, -85, 81, -74, 65, -55, 44, -32, 20, -7, -7, 20, -32, 44, -55, 65, -74, 81, -85, 89, -90, 90, -87, 83, -77, 69, -60, 49, -38, 26, -13,}

{5, -13, 22, -30, 38, -46, 53, -60, 66, -72, 77, -80, 84, -87, 90, -90, 90, -89, 88, -85, 82, -78, 74, -68, 62, -55, 48, -41, 32, -23, 15, -7, -2, 11, -20, 29, -37, 44, -52, 59, -65, 72, -76, 81, -85, 87, -89, 90, -90, 90, -89, 86, -83, 79, -73, 69, -64, 58, -49, 42, -34, 26, -17, 8,}

{2, -7, 11, -15, 20, -23, 29, -32, 37, -41, 44, -48, 52, -55, 59, -62, 65, -68, 72, -74, 76, -78, 81, -82, 85, -85, 87, -88, 89, -89, 90, -90, 90, -90, 90, -90, 89, -87, 86, -84, 83, -80, 79, -77, 73, -72, 69, -66, 64, -60, 58, -53, 49, -46, 42, -38, 34, -30, 26, -22, 17, -13, 8, -5,}

After minimizing the cost value by trying all possible combination of offset values on a selected set of M unique numbers, T2 may be output as the B-bit N-point primary transform core.

When deriving the 2N-Point DST-1 transform cores, it is restricted that the set of M unique numbers which construct the 2N-Point DST-1 core matrix is the same set of M unique numbers which construct the N-Point DST-7 and/or N-Point DCT-8 core matrix. In one embodiment, M equals to N. In one embodiment, one of the 8-Bit DST-1 transform cores shown below may be used. For example, in 8-Point DST-1, there are 4 unique numbers including 28, 55, 74, 84, and this is the same set of 4 unique numbers used to construct 4-Point DST-7 and 4-point DCT-8 cores using the embodiment where M equals N discussed above.

The 8-Bit DST-1 transform cores may include:

4-Point DST-1:
{48, 77, 77, 48,}
{77, 48, -48, -77,}
{77, -48, -48, 77,}
{48, -77, 77, -48,}

8-Point DST-1:
{29, 55, 74, 84, 84, 74, 55, 29,}
{55, 84, 74, 29, -29, -74, -84, -55,}
{74, 74, 0, -74, -74, 0, 74, 74,}
{84, 29, -74, -55, 55, 74, -29, -84,}
{84, -29, -74, 55, 55, -74, -29, 84,}
{74, -74, 0, 74, -74, 0, 74, -74,}
{55, -84, 74, -29, -29, 74, -84, 55,}
{29, -55, 74, -84, 84, -74, 55, -29,}

16-Point DST-1:
{17, 32, 46, 60, 71, 78, 85, 86, 86, 85, 78, 71, 60, 46, 32, 17,}
{32, 60, 78, 86, 85, 71, 46, 17, -17, -46, -71, -85, -86, -78, -60, -32,}
{46, 78, 86, 71, 32, -17, -60, -85, -85, -60, -17, 32, 71, 86, 78, 46,}
{60, 86, 71, 17, -46, -85, -78, -32, 32, 78, 85, 46, -17, -71, -86, -60,}
{71, 85, 32, -46, -86, -60, 17, 78, 78, 17, -60, -86, -46, 32, 85, 71,}
{78, 71, -17, -85, -60, 32, 86, 46, -46, -86, -32, 60, 85, 17, -71, -78,}
{85, 46, -60, -78, 17, 86, 32, -71, -71, 32, 86, 17, -78, -60, 46, 85,}
{86, 17, -85, -32, 78, 46, -71, -60, 60, 71, -46, -78, 32, 85, -17, -86,}
{86, -17, -85, 32, 78, -46, -71, 60, 60, -71, -46, 78, 32, -85, -17, 86,}
{85, -46, -60, 78, 17, -86, 32, 71, -71, -32, 86, -17, -78, 60, 46, -85,}
{78, -71, -17, 85, -60, -32, 86, -46, -46, 86, -32, -60, 85, -17, -71, 78,}
{71, -85, 32, 46, -86, 60, 17, -78, 78, -17, -60, 86, -46, -32, 85, -71,}
{60, -86, 71, -17, -46, 85, -78, 32, 32, -78, 85, -46, -17, 71, -86, 60,}
{46, -78, 86, -71, 32, 17, -60, 85, -85, 60, -17, -32, 71, -86, 78, -46,}
{32, -60, 78, -86, 85, -71, 46, -17, -17, 46, -71, 85, -86, 78, -60, 32,}

{17, -32, 46, -60, 71, -78, 85, -86, 86, -85, 78, -71, 60, -46, 32, -17,}

32-Point DST-1:

{9, 17, 25, 33, 41, 49, 56, 62, 66, 72, 77, 81, 83, 87, 89, 90, 90, 89, 87, 83, 81, 77, 72, 66, 62, 56, 49, 41, 33, 25, 17, 9,}

{17, 33, 49, 62, 72, 81, 87, 90, 89, 83, 77, 66, 56, 41, 25, 9, -9, -25, -41, -56, -66, -77, -83, -89, -90, -87, -81, -72, -62, -49, -33, -17,}

{25, 49, 66, 81, 89, 89, 81, 66, 49, 25, 0, -25, -49, -66, -81, -89, -89, -81, -66, -49, -25, 0, 25, 49, 66, 81, 89, 89, 81, 66, 49, 25,}

{33, 62, 81, 90, 83, 66, 41, 9, -25, -56, -77, -89, -87, -72, -49, -17, 17, 49, 72, 87, 89, 77, 56, 25, -9, -41, -66, -83, -90, -81, -62, -33,}

{41, 72, 89, 83, 62, 25, -17, -56, -81, -90, -77, -49, -9, 33, 66, 87, 87, 66, 33, -9, -49, -77, -90, -81, -56, -17, 25, 62, 83, 89, 72, 41,}

{49, 81, 89, 66, 25, -25, -66, -89, -81, -49, 0, 49, 81, 89, 66, 25, -25, -66, -89, -81, -49, 0, 49, 81, 89, 66, 25, -25, -66, -89, -81, -49,}

{56, 87, 81, 41, -17, -66, -90, -72, -25, 33, 77, 89, 62, 9, -49, -83, -83, -49, 9, 62, 89, 77, 33, -25, -72, -90, -66, -17, 41, 81, 87, 56,}

{62, 90, 66, 9, -56, -89, -72, -17, 49, 87, 77, 25, -41, -83, -81, -33, 33, 81, 83, 41, -25, -77, -87, -49, 17, 72, 89, 56, -9, -66, -90, -62,}

{66, 89, 49, -25, -81, -81, -25, 49, 89, 66, 0, -66, -89, -49, 25, 81, 81, 25, -49, -89, -66, 0, 66, 89, 49, -25, -81, -81, -25, 49, 89, 66,}

{72, 83, 25, -56, -90, -49, 33, 87, 66, -9, -77, -81, -17, 62, 89, 41, -41, -89, -62, 17, 81, 77, 9, -66, -87, -33, 49, 90, 56, -25, -83, -72,}

{77, 77, 0, -77, -77, 0, 77, 77, 0, -77, -77, 0, 77, 77, 0, -77, -77, 0, 77, 77, 0, -77, -77, 0, 77, 77, 0, -77, -77, 0, 77, 77,}

{81, 66, -25, -89, -49, 49, 89, 25, -66, -81, 0, 81, 66, -25, -89, -49, 49, 89, 25, -66, -81, 0, 81, 66, -25, -89, -49, 49, 89, 25, -66, -81,}

{83, 56, -49, -87, -9, 81, 62, -41, -89, -17, 77, 66, -33, -90, -25, 72, 72, -25, -90, -33, 66, 77, -17, -89, -41, 62, 81, -9, -87, -49, 56, 83,}

{87, 41, -66, -72, 33, 89, 9, -83, -49, 62, 77, -25, -90, -17, 81, 56, -56, -81, 17, 90, 25, -77, -62, 49, 83, -9, -89, -33, 72, 66, -41, -87,}

{89, 25, -81, -49, 66, 66, -49, -81, 25, 89, 0, -89, -25, 81, 49, -66, -66, 49, 81, -25, -89, 0, 89, 25, -81, -49, 66, 66, -49, -81, 25, 89,}

{90, 9, -89, -17, 87, 25, -83, -33, 81, 41, -77, -49, 72, 56, -66, -62, 62, 66, -56, -72, 49, 77, -41, -81, 33, 83, -25, -87, 17, 89, -9, -90,}

{90, -9, -89, 17, 87, -25, -83, 33, 81, -41, -77, 49, 72, -56, -66, 62, 62, -66, -56, 72, 49, -77, -41, 81, 33, -83, -25, 87, 17, -89, -9, 90,}

{89, -25, -81, 49, 66, -66, -49, 81, 25, -89, 0, 89, -25, -81, 49, 66, -66, -49, 81, 25, -89, 0, 89, -25, -81, 49, 66, -66, -49, 81, 25, -89,}

{87, -41, -66, 72, 33, -89, 9, 83, -49, -62, 77, 25, -90, 17, 81, -56, -56, 81, 17, -90, 25, 77, -62, -49, 83, 9, -89, 33, 72, -66, -41, 87,}

{83, -56, -49, 87, -9, -81, 62, 41, -89, 17, 77, -66, -33, 90, -25, -72, 72, 25, -90, 33, 66, -77, -17, 89, -41, -62, 81, 9, -87, 49, 56, -83,}

{81, -66, -25, 89, -49, -49, 89, -25, -66, 81, 0, -81, 66, 25, -89, 49, 49, -89, 25, 66, -81, 0, 81, -66, -25, 89, -49, -49, 89, -25, -66, 81,}

{77, -77, 0, 77, -77, 0, 77, -77, 0, 77, -77, 0, 77, -77, 0, 77, -77, 0, 77, -77, 0, 77, -77, 0, 77, -77, 0, 77, -77, 0, 77, -77,}

{72, -83, 25, 56, -90, 49, 33, -87, 66, 9, -77, 81, -17, -62, 89, -41, -41, 89, -62, -17, 81, -77, 9, 66, -87, 33, 49, -90, 56, 25, -83, 72,}

{66, -89, 49, 25, -81, 81, -25, -49, 89, -66, 0, 66, -89, 49, 25, -81, 81, -25, -49, 89, -66, 0, 66, -89, 49, 25, -81, 81, -25, -49, 89, -66,}

{62, -90, 66, -9, -56, 89, -72, 17, 49, -87, 77, -25, -41, 83, -81, 33, 33, -81, 83, -41, -25, 77, -87, 49, 17, -72, 89, -56, -9, 66, -90, 62,}

{56, -87, 81, -41, -17, 66, -90, 72, -25, -33, 77, -89, 62, -9, -49, 83, -83, 49, 9, -62, 89, -77, 33, 25, -72, 90, -66, 17, 41, -81, 87, -56,}

{49, -81, 89, -66, 25, 25, -66, 89, -81, 49, 0, -49, 81, -89, 66, -25, -25, 66, -89, 81, -49, 0, 49, -81, 89, -66, 25, 25, -66, 89, -81, 49,}

{41, -72, 89, -83, 62, -25, -17, 56, -81, 90, -77, 49, -9, -33, 66, -87, 87, -66, 33, 9, -49, 77, -90, 81, -56, 17, 25, -62, 83, -89, 72, -41,}

{33, -62, 81, -90, 83, -66, 41, -9, -25, 56, -77, 89, -87, 72, -49, 17, 17, -49, 72, -87, 89, -77, 56, -25, -9, 41, -66, 83, -90, 81, -62, 33,}

{25, -49, 66, -81, 89, -89, 81, -66, 49, -25, 0, 25, -49, 66, -81, 89, -89, 81, -66, 49, -25, 0, 25, -49, 66, -81, 89, -89, 81, -66, 49, -25,}

{17, -33, 49, -62, 72, -81, 87, -90, 89, -83, 77, -66, 56, -41, 25, -9, -9, 25, -41, 56, -66, 77, -83, 89, -90, 87, -81, 72, -62, 49, -33, 17,}

{9, -17, 25, -33, 41, -49, 56, -62, 66, -72, 77, -81, 83, -87, 89, -90, 90, -89, 87, -83, 81, -77, 72, -66, 62, -56, 49, -41, 33, -25, 17, -9,}

64-Point DST-1:

{4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90, 90, 90, 89, 88, 88, 86, 85, 84, 82, 80, 78, 77, 74, 72, 68, 66, 63, 60, 56, 53, 50, 45, 42, 38, 34, 30, 26, 21, 17, 13, 9, 4,}

{9, 17, 26, 34, 42, 50, 56, 63, 68, 74, 78, 82, 85, 88, 89, 90, 90, 88, 86, 84, 80, 77, 72, 66, 60, 53, 45, 38, 30, 21, 13, 4, -4, -13, -21, -30, -38, -45, -53, -60, -66, -72, -77, -80, -84, -86, -88, -90, -90, -89, - 88, -85, -82, -78, -74, -68, -63, -56, -50, -42, -34, -26, -17, -9,}

{13, 26, 38, 50, 60, 68, 77, 82, 86, 89, 90, 88, 85, 80, 74, 66, 56, 45, 34, 21, 9, -4, -17, -30, -42, -53, -63, -72, -78, -84, -88, -90, -90, -88, -84, -78, -72, -63, -53, -42, -30, -17, -4, 9, 21, 34, 45, 56, 66, 74, 80, 85, 88, 90, 89, 86, 82, 77, 68, 60, 50, 38, 26, 13,}

{17, 34, 50, 63, 74, 82, 88, 90, 88, 84, 77, 66, 53, 38, 21, 4, -13, -30, -45, -60, -72, -80, -86, -90, -89, -85, -78, -68, -56, -42, -26, -9, 9, 26, 42, 56, 68, 78, 85, 89, 90, 86, 80, 72, 60, 45, 30, 13, -4, -21, -38, -53, -66, -77, -84, -88, -90, -88, -82, -74, -63, -50, -34, -17,}

{21, 42, 60, 74, 84, 89, 89, 84, 74, 60, 42, 21, 0, -21, -42, -60, -74, -84, -89, -89, -84, -74, -60, -42, -21, 0, 21, 42, 60, 74, 84, 89, 89, 84, 74, 60, 42, 21, 0, -21, -42, -60, -74, -84, -89, -89, -84, -74, -60, -42, -21, 0, 21, 42, 60, 74, 84, 89, 89, 84, 74, 60, 42, 21,}

{26, 50, 68, 82, 89, 88, 80, 66, 45, 21, -4, -30, -53, -72, -84, -90, -88, -78, -63, -42, -17, 9, 34, 56, 74, 85, 90, 86, 77, 60, 38, 13, -13, -38, -60, -77, -86, -90, -85, -74, -56, -34, -9, 17, 42, 63, 78, 88, 90, 84, 72, 53, 30, 4, -21, -45, -66, -80, -88, -89, -82, -68, -50, -26,}

{30, 56, 77, 88, 89, 80, 63, 38, 9, -21, -50, -72, -85, -90, -84, -68, -45, -17, 13, 42, 66, 82, 90, 86, 74, 53, 26, -4, -34, -60, -78, -88, -88, -78, -60, -34, -4, 26, 53, 74, 86, 90, 82, 66, 42, 13, -17, -45, -68, -84, -90, -85, -72, -50, -21, 9, 38, 63, 80, 89, 88, 77, 56, 30,}

{34, 63, 82, 90, 84, 66, 38, 4, -30, -60, -80, -90, -85, -68, -42, -9, 26, 56, 78, 89, 86, 72, 45, 13, -21, -53, -77, -88, -88, -74,

-50, -17, 17, 50, 74, 88, 88, 77, 53, 21, -13, -45, -72, -86, -89, -78, -56, -26, 9, 42, 68, 85, 90, 80, 60, 30, -4, -38, -66, -84, -90, -82, -63, -34,}
{38, 68, 86, 88, 74, 45, 9, -30, -63, -84, -90, -78, -53, -17, 21, 56, 80, 90, 82, 60, 26, -13, -50, -77, -89, -85, -66, -34, 4, 42, 72, 88, 88, 72, 42, 4, -34, -66, -85, -89, -77, -50, -13, 26, 60, 82, 90, 80, 56, 21, -17, -53, -78, -90, -84, -63, -30, 9, 45, 74, 88, 86, 68, 38,}
{42, 74, 89, 84, 60, 21, -21, -60, -84, -89, -74, -42, 0, 42, 74, 89, 84, 60, 21, -21, -60, -84, -89, -74, -42, 0, 42, 74, 89, 84, 60, 21, -21, -60, -84, -89, -74, -42, 0, 42, 74, 89, 84, 60, 21, -21, -60, -84, -89, -74, -42, 0, 42, 74, 89, 84, 60, 21, -21, -60, -84, -89, -74, -42,}
{45, 78, 90, 77, 42, -4, -50, -80, -90, -74, -38, 9, 53, 82, 89, 72, 34, -13, -56, -84, -88, -68, -30, 17, 60, 85, 88, 66, 26, -21, -63, -86, -86, -63, -21, 26, 66, 88, 85, 60, 17, -30, -68, -88, -84, -56, -13, 34, 72, 89, 82, 53, 9, -38, -74, -90, -80, -50, -4, 42, 77, 90, 78, 45,}
{50, 82, 88, 66, 21, -30, -72, -90, -78, -42, 9, 56, 85, 86, 60, 13, -38, -77, -90, -74, -34, 17, 63, 88, 84, 53, 4, -45, -80, -89, -68, -26, 26, 68, 89, 80, 45, -4, -53, -84, -88, -63, -17, 34, 74, 90, 77, 38, -13, -60, -86, -85, -56, -9, 42, 78, 90, 72, 30, -21, -66, -88, -82, -50,}
{53, 85, 85, 53, 0, -53, -85, -85, -53, 0, 53, 85, 85, 53, 0, -53, -85, -85, -53, 0, 53, 85, 85, 53, 0, -53, -85, -85, -53, 0, 53, 85, 85, 53, 0, -53, -85, -85, -53, 0, 53, 85, 85, 53, 0, -53, -85, -85, -53, 0, 53, 85, 85, 53, 0, -53, -85, -85, -53, 0, 53, 85, 85, 53,}
{56, 88, 80, 38, -21, -72, -90, -68, -17, 42, 82, 86, 53, -4, -60, -88, -78, -34, 26, 74, 90, 66, 13, -45, -84, -85, -50, 9, 63, 89, 77, 30, -30, -77, -89, -63, -9, 50, 85, 84, 45, -13, -66, -90, -74, -26, 34, 78, 88, 60, 4, -53, -86, -82, -42, 17, 68, 90, 72, 21, -38, -80, -88, -56,}
{60, 89, 74, 21, -42, -84, -84, -42, 21, 74, 89, 60, 0, -60, -89, -74, -21, 42, 84, 84, 42, -21, -74, -89, -60, 0, 60, 89, 74, 21, -42, -84, -84, -42, 21, 74, 89, 60, 0, -60, -89, -74, -21, 42, 84, 84, 42, -21, -74, -89, -60, 0, 60, 89, 74, 21, -42, -84, -84, -42, 21, 74, 89, 60,}
{63, 90, 66, 4, -60, -90, -68, -9, 56, 89, 72, 13, -53, -88, -74, -17, 50, 88, 77, 21, -45, -86, -78, -26, 42, 85, 80, 30, -38, -84, -82, -34, 34, 82, 84, 38, -30, -80, -85, -42, 26, 78, 86, 45, -21, -77, -88, -50, 17, 74, 88, 53, -13, -72, -89, -56, 9, 68, 90, 60, -4, -66, -90, -63,}
{66, 90, 56, -13, -74, -88, -45, 26, 80, 84, 34, -38, -85, -78, -21, 50, 88, 72, 9, -60, -90, -63, 4, 68, 89, 53, -17, -77, -86, -42, 30, 82, 82, 30, -42, -86, -77, -17, 53, 89, 68, 4, -63, -90, -60, 9, 72, 88, 50, -21, -78, -85, -38, 34, 84, 80, 26, -45, -88, -74, -13, 56, 90, 66,}
{68, 88, 45, -30, -84, -78, -17, 56, 90, 60, -13, -77, -85, -34, 42, 88, 72, 4, -66, -89, -50, 26, 82, 80, 21, -53, -90, -63, 9, 74, 86, 38, -38, -86, -74, -9, 63, 90, 53, -21, -80, -82, -26, 50, 89, 66, -4, -72, -88, -42, 34, 85, 77, 13, -60, -90, -56, 17, 78, 84, 30, -45, -88, -68,}
{72, 86, 34, -45, -89, -63, 13, 78, 82, 21, -56, -90, -53, 26, 84, 77, 9, -66, -88, -42, 38, 88, 68, -4, -74, -85, -30, 50, 90, 60, -17, -80, -80, -17, 60, 90, 50, -30, -85, -74, -4, 68, 88, 38, -42, -88, -66, 9, 77, 84, 26, -53, -90, -56, 21, 82, 78, 13, -63, -89, -45, 34, 86, 72,}
{74, 84, 21, -60, -89, -42, 42, 89, 60, -21, -84, -74, 0, 74, 84, 21, -60, -89, -42, 42, 89, 60, -21, -84, -74, 0, 74, 84, 21, -60, -89, -42, 42, 89, 60, -21, -84, -74, 0, 74, 84, 21, -60, -89, -42, 42, 89, 60, -21, -84, -74, 0, 74, 84, 21, -60, -89, -42, 42, 89, 60, -21, -84, -74,}
{77, 80, 9, -72, -84, -17, 66, 86, 26, -60, -88, -34, 53, 90, 42, -45, -90, -50, 38, 89, 56, -30, -88, -63, 21, 85, 68, -13, -82, -74, 4, 78, 78, 4, -74, -82, -13, 68, 85, 21, -63, -88, -30, 56, 89, 38, -50, -90, -45, 42, 90, 53, -34, -88, -60, 26, 86, 66, -17, -84, -72, 9, 80, 77,}
{78, 77, -4, -80, -74, 9, 82, 72, -13, -84, -68, 17, 85, 66, -21, -86, -63, 26, 88, 60, -30, -88, -56, 34, 89, 53, -38, -90, -50, 42, 90, 45, -45, -90, -42, 50, 90, 38, -53, -89, -34, 56, 88, 30, -60, -88, -26, 63, 86, 21, -66, -85, -17, 68, 84, 13, -72, -82, -9, 74, 80, 4, -77, -78,}
{80, 72, -17, -86, -60, 34, 90, 45, -50, -89, -30, 63, 85, 13, -74, -78, 4, 82, 68, -21, -88, -56, 38, 90, 42, -53, -88, -26, 66, 84, 9, -77, -77, 9, 84, 66, -26, -88, -53, 42, 90, 38, -56, -88, -21, 68, 82, 4, -78, -74, 13, 85, 63, -30, -89, -50, 45, 90, 34, -60, -86, -17, 72, 80,}
{82, 66, -30, -90, -42, 56, 86, 13, -77, -74, 17, 88, 53, -45, -89, -26, 68, 80, -4, -84, -63, 34, 90, 38, -60, -85, -9, 78, 72, -21, -88, -50, 50, 88, 21, -72, -78, 9, 85, 60, -38, -90, -34, 63, 84, 4, -80, -68, 26, 89, 45, -53, -88, -17, 74, 77, -13, -86, -56, 42, 90, 30, -66, -82,}
{84, 60, -42, -89, -21, 74, 74, -21, -89, -42, 60, 84, 0, -84, -60, 42, 89, 21, -74, -74, 21, 89, 42, -60, -84, 0, 84, 60, -42, -89, -21, 74, 74, -21, -89, -42, 60, 84, 0, -84, -60, 42, 89, 21, -74, -74, 21, 89, 42, -60, -84, 0, 84, 60, -42, -89, -21, 74, 74, -21, -89, -42, 60, 84,}
{85, 53, -53, -85, 0, 85, 53, -53, -85, 0, 85, 53, -53, -85, 0, 85, 53, -53, -85, 0, 85, 53, -53, -85, 0, 85, 53, -53, -85, 0, 85, 53, -53, -85, 0, 85, 53, -53, -85, 0, 85, 53, -53, -85, 0, 85, 53, -53, -85, 0, 85, 53, -53, -85, 0, 85, 53, -53, -85, 0, 85, 53, -53, -85,}
{86, 45, -63, -78, 21, 90, 26, -77, -66, 42, 88, 4, -85, -50, 60, 80, -17, -90, -30, 74, 68, -38, -88, -9, 84, 53, -56, -82, 13, 89, 34, -72, -72, 34, 89, 13, -82, -56, 53, 84, -9, -88, -38, 68, 74, -30, -90, -17, 80, 60, -50, -85, 4, 88, 42, -66, -77, 26, 90, 21, -78, -63, 45, 86,}
{88, 38, -72, -68, 42, 86, -4, -88, -34, 74, 66, -45, -85, 9, 89, 30, -77, -63, 50, 84, -13, -90, -26, 78, 60, -53, -82, 17, 90, 21, -80, -56, 56, 80, -21, -90, -17, 82, 53, -60, -78, 26, 90, 13, -84, -50, 63, 77, -30, -89, -9, 85, 45, -66, -74, 34, 88, 4, -86, -42, 68, 72, -38, -88,}
{88, 30, -78, -56, 60, 77, -34, -88, 4, 89, 26, -80, -53, 63, 74, -38, -86, 9, 90, 21, -82, -50, 66, 72, -42, -85, 13, 90, 17, -84, -45, 68, 68, -45, -84, 17, 90, 13, -85, -42, 72, 66, -50, -82, 21, 90, 9, -86, -38, 74, 63, -53, -80, 26, 89, 4, -88, -34, 77, 60, -56, -78, 30, 88,}
{89, 21, -84, -42, 74, 60, -60, -74, 42, 84, -21, -89, 0, 89, 21, -84, -42, 74, 60, -60, -74, 42, 84, -21, -89, 0, 89, 21, -84, -42, 74, 60, -60, -74, 42, 84, -21, -89, 0, 89, 21, -84, -42, 74, 60, -60, -74, 42, 84, -21, -89, 0, 89, 21, -84, -42, 74, 60, -60, -74, 42, 84, -21, -89,}
{90, 13, -88, -26, 84, 38, -78, -50, 72, 60, -63, -68, 53, 77, -42, -82, 30, 86, -17, -89, 4, 90, 9, -88, -21, 85, 34, -80, -45, 74, 56, -66, -66, 56, 74, -45, -80, 34, 85, -21, -88, 9, 90, 4, -89, -17, 86, 30, -82, -42, 77, 53, -68, -63, 60, 72, -50, -78, 38, 84, -26, -88, 13, 90,}
{90, 4, -90, -9, 89, 13, -88, -17, 88, 21, -86, -26, 85, 30, -84, -34, 82, 38, -80, -42, 78, 45, -77, -50, 74, 53, -72, -56, 68, 60, -66, -63, 63, 66, -60, -68, 56, 72, -53, -74, 50, 77, -45, -78, 42, 80, -38, -82, 34, 84, -30, -85, 26, 86, -21, -88, 17, 88, -13, -89, 9, 90, -4, -90,}
{90, -4, -90, 9, 89, -13, -88, 17, 88, -21, -86, 26, 85, -30, -84, 34, 82, -38, -80, 42, 78, -45, -77, 50, 74, -53, -72, 56, 68, -60, -66, 63, 63, -66, -60, 68, 56, -72, -53, 74, 50, -77, -45, 78, 42, -80, -38, 82, 34, -84, -30, 85, 26, -86, -21, 88, 17, -88, -13, 89, 9, -90, -4, 90,}
{90, -13, -88, 26, 84, -38, -78, 50, 72, -60, -63, 68, 53, -77, -42, 82, 30, -86, -17, 89, 4, -90, 9, 88, -21, -85, 34, 80, -45,

-74, 56, 66, -66, -56, 74, 45, -80, -34, 85, 21, -88, -9, 90, -4, -89, 17, 86, -30, -82, 42, 77, -53, -68, 63, 60, -72, -50, 78, 38, -84, -26, 88, 13, -90,}
{89, -21, -84, 42, 74, -60, -60, 74, 42, -84, -21, 89, 0, -89, 21, 84, -42, -74, 60, 60, -74, -42, 84, 21, -89, 0, 89, -21, -84, 42, 74, -60, -60, 74, 42, -84, -21, 89, 0, -89, 21, 84, -42, -74, 60, 60, -74, -42, 84, 21, -89, 0, 89, -21, -84, 42, 74, -60, -60, 74, 42, -84, -21, 89,}
{88, -30, -78, 56, 60, -77, -34, 88, 4, -89, 26, 80, -53, -63, 74, 38, -86, -9, 90, -21, -82, 50, 66, -72, -42, 85, 13, -90, 17, 84, -45, -68, 68, 45, -84, -17, 90, -13, -85, 42, 72, -66, -50, 82, 21, -90, 9, 86, -38, -74, 63, 53, -80, -26, 89, -4, -88, 34, 77, -60, -56, 78, 30, -88,}
{88, -38, -72, 68, 42, -86, -4, 88, -34, -74, 66, 45, -85, -9, 89, -30, -77, 63, 50, -84, -13, 90, -26, -78, 60, 53, -82, -17, 90, -21, -80, 56, 56, -80, -21, 90, -17, -82, 53, 60, -78, -26, 90, -13, -84, 50, 63, -77, -30, 89, -9, -85, 45, 66, -74, -34, 88, -4, -86, 42, 68, -72, -38, 88,}
{86, -45, -63, 78, 21, -90, 26, 77, -66, -42, 88, -4, -85, 50, 60, -80, -17, 90, -30, -74, 68, 38, -88, 9, 84, -53, -56, 82, 13, -89, 34, 72, -72, -34, 89, -13, -82, 56, 53, -84, -9, 88, -38, -68, 74, 30, -90, 17, 80, -60, -50, 85, 4, -88, 42, 66, -77, -26, 90, -21, -78, 63, 45, -86,}
{85, -53, -53, 85, 0, -85, 53, 53, -85, 0, 85, -53, -53, 85, 0, -85, 53, 53, -85, 0, 85, -53, -53, 85, 0, -85, 53, 53, -85, 0, 85, -53, -53, 85, 0, -85, 53, 53, -85, 0, 85, -53, -53, 85, 0, -85, 53, 53, -85, 0, 85, -53, -53, 85, 0, -85, 53, 53, -85, 0, 85, -53, -53, 85,}
{84, -60, -42, 89, -21, -74, 74, 21, -89, 42, 60, -84, 0, 84, -60, -42, 89, -21, -74, 74, 21, -89, 42, 60, -84, 0, 84, -60, -42, 89, -21, -74, 74, 21, -89, 42, 60, -84, 0, 84, -60, -42, 89, -21, -74, 74, 21, -89, 42, 60, -84, 0, 84, -60, -42, 89, -21, -74, 74, 21, -89, 42, 60, -84,}
{82, -66, -30, 90, -42, -56, 86, -13, -77, 74, 17, -88, 53, 45, -89, 26, 68, -80, -4, 84, -63, -34, 90, -38, -60, 85, -9, -78, 72, 21, -88, 50, 50, -88, 21, 72, -78, -9, 85, -60, -38, 90, -34, -63, 84, -4, -80, 68, 26, -89, 45, 53, -88, 17, 74, -77, -13, 86, -56, -42, 90, -30, -66, 82,}
{80, -72, -17, 86, -60, -34, 90, -45, -50, 89, -30, -63, 85, -13, -74, 78, 4, -82, 68, 21, -88, 56, 38, -90, 42, 53, -88, 26, 66, -84, 9, 77, -77, -9, 84, -66, -26, 88, -53, -42, 90, -38, -56, 88, -21, -68, 82, -4, -78, 74, 13, -85, 63, 30, -89, 50, 45, -90, 34, 60, -86, 17, 72, -80,}
{78, -77, -4, 80, -74, -9, 82, -72, -13, 84, -68, -17, 85, -66, -21, 86, -63, -26, 88, -60, -30, 88, -56, -34, 89, -53, -38, 90, -50, -42, 90, -45, -45, 90, -42, -50, 90, -38, -53, 89, -34, -56, 88, -30, -60, 88, -26, -63, 86, -21, -66, 85, -17, -68, 84, -13, -72, 82, -9, -74, 80, -4, -77, 78,}
{77, -80, 9, 72, -84, 17, 66, -86, 26, 60, -88, 34, 53, -90, 42, 45, -90, 50, 38, -89, 56, 30, -88, 63, 21, -85, 68, 13, -82, 74, 4, -78, 78, -4, -74, 82, -13, -68, 85, -21, -63, 88, -30, -56, 89, -38, -50, 90, -45, -42, 90, -53, -34, 88, -60, -26, 86, -66, -17, 84, -72, -9, 80, -77,}
{74, -84, 21, 60, -89, 42, 42, -89, 60, 21, -84, 74, 0, -74, 84, -21, -60, 89, -42, -42, 89, -60, -21, 84, -74, 0, 74, -84, 21, 60, -89, 42, 42, -89, 60, 21, -84, 74, 0, -74, 84, -21, -60, 89, -42, -42, 89, -60, -21, 84, -74, 0, 74, -84, 21, 60, -89, 42, 42, -89, 60, 21, -84, 74,}
{72, -86, 34, 45, -89, 63, 13, -78, 82, -21, -56, 90, -53, -26, 84, -77, 9, 66, -88, 42, 38, -88, 68, 4, -74, 85, -30, -50, 90, -60, -17, 80, -80, 17, 60, -90, 50, 30, -85, 74, -4, -68, 88, -38, -42, 88, -66, -9, 77, -84, 26, 53, -90, 56, 21, -82, 78, -13, -63, 89, -45, -34, 86, -72,}
{68, -88, 45, 30, -84, 78, -17, -56, 90, -60, -13, 77, -85, 34, 42, -88, 72, -4, -66, 89, -50, -26, 82, -80, 21, 53, -90, 63, 9,

-74, 86, -38, -38, 86, -74, 9, 63, -90, 53, 21, -80, 82, -26, -50, 89, -66, -4, 72, -88, 42, 34, -85, 77, -13, -60, 90, -56, -17, 78, -84, 30, 45, -88, 68,}
{66, -90, 56, 13, -74, 88, -45, -26, 80, -84, 34, 38, -85, 78, -21, -50, 88, -72, 9, 60, -90, 63, 4, -68, 89, -53, -17, 77, -86, 42, 30, -82, 82, -30, -42, 86, -77, 17, 53, -89, 68, -4, -63, 90, -60, -9, 72, -88, 50, 21, -78, 85, -38, -34, 84, -80, 26, 45, -88, 74, -13, -56, 90, -66,}
{63, -90, 66, -4, -60, 90, -68, 9, 56, -89, 72, -13, -53, 88, -74, 17, 50, -88, 77, -21, -45, 86, -78, 26, 42, -85, 80, -30, -38, 84, -82, 34, 34, -82, 84, -38, -30, 80, -85, 42, 26, -78, 86, -45, -21, 77, -88, 50, 17, -74, 88, -53, -13, 72, -89, 56, 9, -68, 90, -60, -4, 66, -90, 63,}
{60, -89, 74, -21, -42, 84, -84, 42, 21, -74, 89, -60, 0, 60, -89, 74, -21, -42, 84, -84, 42, 21, -74, 89, -60, 0, 60, -89, 74, -21, -42, 84, -84, 42, 21, -74, 89, -60, 0, 60, -89, 74, -21, -42, 84, -84, 42, 21, -74, 89, -60, 0, 60, -89, 74, -21, -42, 84, -84, 42, 21, -74, 89, -60,}
{56, -88, 80, -38, -21, 72, -90, 68, -17, -42, 82, -86, 53, 4, -60, 88, -78, 34, 26, -74, 90, -66, 13, 45, -84, 85, -50, -9, 63, -89, 77, -30, -30, 77, -89, 63, -9, -50, 85, -84, 45, 13, -66, 90, -74, 26, 34, -78, 88, -60, 4, 53, -86, 82, -42, -17, 68, -90, 72, -21, -38, 80, -88, 56,}
{53, -85, 85, -53, 0, 53, -85, 85, -53, 0, 53, -85, 85, -53, 0, 53, -85, 85, -53, 0, 53, -85, 85, -53, 0, 53, -85, 85, -53, 0, 53, -85, 85, -53, 0, 53, -85, 85, -53, 0, 53, -85, 85, -53, 0, 53, -85, 85, -53, 0, 53, -85, 85, -53, 0, 53, -85, 85, -53, 0, 53, -85, 85, -53,}
{50, -82, 88, -66, 21, 30, -72, 90, -78, 42, 9, -56, 85, -86, 60, -13, -38, 77, -90, 74, -34, -17, 63, -88, 84, -53, 4, 45, -80, 89, -68, 26, 26, -68, 89, -80, 45, 4, -53, 84, -88, 63, -17, -34, 74, -90, 77, -38, -13, 60, -86, 85, -56, 9, 42, -78, 90, -72, 30, 21, -66, 88, -82, 50,}
{45, -78, 90, -77, 42, 4, -50, 80, -90, 74, -38, -9, 53, -82, 89, -72, 34, 13, -56, 84, -88, 68, -30, -17, 60, -85, 88, -66, 26, 21, -63, 86, -86, 63, -21, -26, 66, -88, 85, -60, 17, 30, -68, 88, -84, 56, -13, -34, 72, -89, 82, -53, 9, 38, -74, 90, -80, 50, -4, -42, 77, -90, 78, -45,}
{42, -74, 89, -84, 60, -21, -21, 60, -84, 89, -74, 42, 0, -42, 74, -89, 84, -60, 21, 21, -60, 84, -89, 74, -42, 0, 42, -74, 89, -84, 60, -21, -21, 60, -84, 89, -74, 42, 0, -42, 74, -89, 84, -60, 21, 21, -60, 84, -89, 74, -42, 0, 42, -74, 89, -84, 60, -21, -21, 60, -84, 89, -74, 42,}
{38, -68, 86, -88, 74, -45, 9, 30, -63, 84, -90, 78, -53, 17, 21, -56, 80, -90, 82, -60, 26, 13, -50, 77, -89, 85, -66, 34, 4, -42, 72, -88, 88, -72, 42, -4, -34, 66, -85, 89, -77, 50, -13, -26, 60, -82, 90, -80, 56, -21, -17, 53, -78, 90, -84, 63, -30, -9, 45, -74, 88, -86, 68, -38,}
{34, -63, 82, -90, 84, -66, 38, -4, -30, 60, -80, 90, -85, 68, -42, 9, 26, -56, 78, -89, 86, -72, 45, -13, -21, 53, -77, 88, -88, 74, -50, 17, 17, -50, 74, -88, 88, -77, 53, -21, -13, 45, -72, 86, -89, 78, -56, 26, 9, -42, 68, -85, 90, -80, 60, -30, -4, 38, -66, 84, -90, 82, -63, 34,}
{30, -56, 77, -88, 89, -80, 63, -38, 9, 21, -50, 72, -85, 90, -84, 68, -45, 17, 13, -42, 66, -82, 90, -86, 74, -53, 26, 4, -34, 60, -78, 88, -88, 78, -60, 34, -4, -26, 53, -74, 86, -90, 82, -66, 42, -13, -17, 45, -68, 84, -90, 85, -72, 50, -21, -9, 38, -63, 80, -89, 88, -77, 56, -30,}
{26, -50, 68, -82, 89, -88, 80, -66, 45, -21, -4, 30, -53, 72, -84, 90, -88, 78, -63, 42, -17, -9, 34, -56, 74, -85, 90, -86, 77, -60, 38, -13, -13, 38, -60, 77, -86, 90, -85, 74, -56, 34, -9, -17, 42, -63, 78, -88, 90, -84, 72, -53, 30, -4, -21, 45, -66, 80, -88, 89, -82, 68, -50, 26,}
{21, -42, 60, -74, 84, -89, 89, -84, 74, -60, 42, -21, 0, 21, -42, 60, -74,

84, -89, 89, -84, 74, -60, 42, -21, 0, 21, -42, 60, -74, 84, -89, 89, -84, 74, -60, 42, -21, 0, 21, -42, 60, -74, 84, -89, 89, -84, 74, -60, 42, -21,}
{17, -34, 50, -63, 74, -82, 88, -90, 88, -84, 77, -66, 53, -38, 21, -4, -13, 30, -45, 60, -72, 80, -86, 90, -89, 85, -78, 68, -56, 42, -26, 9, 9, -26, 42, -56, 68, -78, 85, -89, 90, -86, 80, -72, 60, -45, 30, -13, -4, 21, -38, 53, -66, 77, -84, 88, -90, 88, -82, 74, -63, 50, -34, 17,}
{13, -26, 38, -50, 60, -68, 77, -82, 86, -89, 90, -88, 85, -80, 74, -66, 56, -45, 34, -21, 9, 4, -17, 30, -42, 53, -63, 72, -78, 84, -88, 90, -90, 88, -84, 78, -72, 63, -53, 42, -30, 17, -4, -9, 21, -34, 45, -56, 66, -74, 80, -85, 88, -90, 89, -86, 82, -77, 68, -60, 50, -38, 26, -13,}
{9, -17, 26, -34, 42, -50, 56, -63, 68, -74, 78, -82, 85, -88, 89, -90, 90, -88, 86, -84, 80, -77, 72, -66, 60, -53, 45, -38, 30, -21, 13, -4, -4, 13, -21, 30, -38, 45, -53, 60, -66, 72, -77, 80, -84, 86, -88, 90, -90, 89, -88, 85, -82, 78, -74, 68, -63, 56, -50, 42, -34, 26, -17, 9,}
{4, -9, 13, -17, 21, -26, 30, -34, 38, -42, 45, -50, 53, -56, 60, -63, 66, -68, 72, -74, 77, -78, 80, -82, 84, -85, 86, -88, 88, -89, 90, -90, 90, -90, 89, -88, 88, -86, 85, -84, 82, -80, 78, -77, 74, -72, 68, -66, 63, -60, 56, -53, 50, -45, 42, -38, 34, -30, 26, -21, 17, -13, 9, -4,}.

In an embodiment, one or more 8-bit DCT-5 transform cores may be used for the primary transform. As an example, the 8-bit DCT-5 transform cores may be:

4-Point DCT-5:
{47, 69, 69, 69,}
{69, 61, -21, -87,}
{69, -21, -87, 61,}
{69, -87, 61, -21,}

8-Point DCT-5:
{47, 66, 66, 66, 66, 66, 66, 66,}
{66, 86, 62, 29, -10, -47, -76, -91,}
{66, 62, -10, -76, -91, -47, 29, 86,}
{66, 29, -76, -76, 29, 93, 29, -76,}
{66, -10, -91, 29, 86, -47, -76, 62,}
{66, -47, -47, 93, -47, -47, 93, -47,}
{66, -76, 29, 29, -76, 93, -76, 29,}
{66, -91, 86, -76, 62, -47, 29, -10,}

16-Point DCT-5:
{45, 65, 65, 65, 65, 65, 65, 65, 65, 65, 65, 65, 65, 65, 65, 65,}
{65, 89, 85, 75, 64, 48, 33, 15, -5, -23, -39, -56, -71, -81, -88, -91,}
{65, 85, 64, 33, -5, -39, -71, -88, -91, -81, -56, -23, 15, 48, 75, 89,}
{65, 75, 33, -23, -71, -91, -81, -39, 15, 64, 89, 85, 48, -5, -56, -88,}
{65, 64, -5, -71, -91, -56, 15, 75, 89, 48, -23, -81, -88, -39, 33, 85,}
{65, 48, -39, -91, -56, 33, 89, 64, -23, -88, -71, 15, 85, 75, -5, -81,}
{65, 33, -71, -81, 15, 89, 48, -56, -88, -5, 85, 64, -39, -91, -23, 75,}
{65, 15, -88, -39, 75, 64, -56, -81, 33, 89, -5, -91, -23, 85, 48, -71,}
{65, -5, -91, 15, 89, -23, -88, 33, 85, -39, -81, 48, 75, -56, -71, 64,}
{65, -23, -81, 64, 48, -88, -5, 89, -39, -71, 75, 33, -91, 15, 85, -56,}
{65, -39, -56, 89, -23, -71, 85, -5, -81, 75, 15, -88, 64, 33, -91, 48,}
{65, -56, -23, 85, -81, 15, 64, -91, 48, 33, -88, 75, -5, -71, 89, -39,}
{65, -71, 15, 48, -88, 85, -39, -23, 75, -91, 64, -5, -56, 89, -81, 33,}
{65, -81, 48, -5, -39, 75, -91, 85, -56, 15, 33, -71, 89, -88, 64, -23,}
{65, -88, 75, -56, 33, -5, -23, 48, -71, 85, -91, 89, -81, 64, -39, 15,}
{65, -91, 89, -88, 85, -81, 75, -71, 64, -56, 48, -39, 33, -23, 15, -5,}

32-Point DCT-5:
{46, 65, 65, 65, 65, 65, 65, 65, 65, 65, 65, 65, 65, 65, 65, 65, 65, 65, 65, 65, 65, 65, 65, 65, 65, 65, 65, 65, 65, 65, 65, 65,}
{65, 91, 89, 87, 84, 80, 75, 70, 64, 57, 49, 42, 33, 25, 16, 7, -2, -12, -20, -29, -38, -46, -53, -60, -67, -72, -78, -82, -86, -89, -90, -91,}
{65, 89, 84, 75, 64, 49, 33, 16, -2, -20, -38, -53, -67, -78, -86, -90, -91, -89, -82, -72, -60, -46, -29, -12, 7, 25, 42, 57, 70, 80, 87, 91,}
{65, 87, 75, 57, 33, 7, -20, -46, -67, -82, -90, -90, -82, -67, -46, -20, 7, 33, 57, 75, 87, 92, 87, 75, 57, 33, 7, -20, -46, -67, -82, -90,}
{65, 84, 64, 33, -2, -38, -67, -86, -91, -82, -60, -29, 7, 42, 70, 87, 91, 80, 57, 25, -12, -46, -72, -89, -90, -78, -53, -20, 16, 49, 75, 89,}
{65, 80, 49, 7, -38, -72, -90, -86, -60, -20, 25, 64, 87, 89, 70, 33, -12, -53, -82, -91, -78, -46, -2, 42, 75, 91, 84, 57, 16, -29, -67, -89,}
{65, 75, 33, -20, -67, -90, -82, -46, 7, 57, 87, 87, 57, 7, -46, -82, -90, -67, -20, 33, 75, 92, 75, 33, -20, -67, -90, -82, -46, 7, 57, 87,}
{65, 70, 16, -46, -86, -86, -46, 16, 70, 92, 70, 16, -46, -86, -86, -46, 16, 70, 92, 70, 16, -46, -86, -86, -46, 16, 70, 92, 70, 16, -46, -86,}
{65, 64, -2, -67, -91, -60, 7, 70, 91, 57, -12, -72, -90, -53, 16, 75, 89, 49, -20, -78, -89, -46, 25, 80, 87, 42, -29, -82, -86, -38, 33, 84,}
{65, 57, -20, -82, -82, -20, 57, 92, 57, -20, -82, -82, -20, 57, 92, 57, -20, -82, -82, -20, 57, 92, 57, -20, -82, -82, -20, 57, 92, 57, -20, -82,}
{65, 49, -38, -90, -60, 25, 87, 70, -12, -82, -78, -2, 75, 84, 16, -67, -89, -29, 57, 91, 42, -46, -91, -53, 33, 89, 64, -20, -86, -72, 7, 80,}
{65, 42, -53, -90, -29, 64, 87, 16, -72, -82, -2, 80, 75, -12, -86, -67, 25, 89, 57, -38, -91, -46, 49, 91, 33, -60, -89, -20, 70, 84, 7, -78,}
{65, 33, -67, -82, 7, 87, 57, -46, -90, -20, 75, 75, -20, -90, -46, 57, 87, 7, -82, -67, 33, 92, 33, -67, -82, 7, 87, 57, -46, -90, -20, 75,}
{65, 25, -78, -67, 42, 89, 7, -86, -53, 57, 84, -12, -90, -38, 70, 75, -29, -91, -20, 80, 64, -46, -89, -2, 87, 49, -60, -82, 16, 91, 33, -72,}
{65, 16, -86, -46, 70, 70, -46, -86, 16, 92, 16, -86, -46, 70, 70, -46, -86, 16, 92, 16, -86, -46, 70, 70, -46, -86, 16, 92, 16, -86, -46, 70,}
{65, 7, -90, -20, 87, 33, -82, -46, 75, 57, -67, -67, 57, 75, -46, -82, 33, 87, -20, -90, 7, 92, 7, -90, -20, 87, 33, -82, -46, 75, 57, -67,}
{65, -2, -91, 7, 91, -12, -90, 16, 89, -20, -89, 25, 87, -29, -86, 33, 84, -38, -82, 42, 80, -46, -78, 49, 75, -53, -72, 57, 70, -60, -67, 64,}
{65, -12, -89, 33, 80, -53, -67, 70, 49, -82, -29, 89, 7, -91, 16, 87, -38, -78, 57, 64, -72, -46, 84, 25, -90, -2, 91, -20, -86, 42, 75, -60,}
{65, -20, -82, 57, 57, -82, -20, 92, -20, -82, 57, 57, -82, -20, 92, -20, -82, 57, 57, -82, -20, 92, -20, -82, 57, 57, -82, -20, 92, -20, -82, 57,}
{65, -29, -72, 75, 25, -91, 33, 70, -78, -20, 91, -38, -67, 80, 16, -90, 42, 64, -82, -12, 89, -46, -60, 84, 7, -89, 49, 57, -86, -2, 87, -53,}

{65, -38, -60, 87, -12, -78, 75, 16, -89, 57, 42, -91, 33, 64, -86, 7, 80, -72, -20, 89, -53, -46, 91, -29, -67, 84, -2, -82, 70, 25, -90, 49,}
{65, -46, -46, 92, -46, -46, 92, -46, -46, 92, -46, -46, 92, -46, -46, 92, -46, -46, 92, -46, -46, 92, -46, -46, 92, -46, -46, 92, -46, -46, 92, -46,}
{65, -53, -29, 87, -72, -2, 75, -86, 25, 57, -91, 49, 33, -89, 70, 7, -78, 84, -20, -60, 91, -46, -38, 89, -67, -12, 80, -82, 16, 64, -90, 42,}
{65, -60, -12, 75, -89, 42, 33, -86, 80, -20, -53, 91, -67, -2, 70, -90, 49, 25, -82, 84, -29, -46, 89, -72, 7, 64, -91, 57, 16, -78, 87, -38,}
{65, -67, 7, 57, -90, 75, -20, -46, 87, -82, 33, 33, -82, 87, -46, -20, 75, -90, 57, 7, -67, 92, -67, 7, 57, -90, 75, -20, -46, 87, -82, 33,}
{65, -72, 25, 33, -78, 91, -67, 16, 42, -82, 89, -60, 7, 49, -86, 87, -53, -2, 57, -89, 84, -46, -12, 64, -90, 80, -38, -20, 70, -91, 75, -29,}
{65, -78, 42, 7, -53, 84, -90, 70, -29, -20, 64, -89, 87, -60, 16, 33, -72, 91, -82, 49, -2, -46, 80, -91, 75, -38, -12, 57, -86, 89, -67, 25,}
{65, -82, 57, -20, -20, 57, -82, 92, -82, 57, -20, -20, 57, -82, 92, -82, 57, -20, -20, 57, -82, 92, -82, 57, -20, -20, 57, -82, 92, -82, 57, -20,}
{65, -86, 70, -46, 16, 16, -46, 70, -86, 92, -86, 70, -46, 16, 16, -46, 70, -86, 92, -86, 70, -46, 16, 16, -46, 70, -86, 92, -86, 70, -46, 16,}
{65, -89, 80, -67, 49, -29, 7, 16, -38, 57, -72, 84, -90, 91, -86, 75, -60, 42, -20, -2, 25, -46, 64, -78, 87, -91, 89, -82, 70, -53, 33, -12,}
{65, -90, 87, -82, 75, -67, 57, -46, 33, -20, 7, 7, -20, 33, -46, 57, -67, 75, -82, 87, -90, 92, -90, 87, -82, 75, -67, 57, -46, 33, -20, 7,}
{65, -91, 91, -90, 89, -89, 87, -86, 84, -82, 80, -78, 75, -72, 70, -67, 64, -60, 57, -53, 49, -46, 42, -38, 33, -29, 25, -20, 16, -12, 7, -2,}

64-Point DCT-5:
{44, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64,}
{64, 91, 90, 90, 90, 88, 87, 85, 84, 82, 80, 78, 75, 72, 70, 66, 64, 61, 58, 54, 50, 46, 42, 39, 34, 29, 25, 22, 17, 13, 7, 4, -1, -6, -10, -15, -19, -24, -28, -32, -36, -40, -44, -48, -51, -55, -59, -63, -65, -68, -70, -73, -77, -79, -81, -83, -85, -86, -88, -89, -90, -90, -91, -91,}
{64, 90, 90, 87, 84, 80, 75, 70, 64, 58, 50, 42, 34, 25, 17, 7, -1, -10, -19, -28, -36, -44, -51, -59, -65, -70, -77, -81, -85, -88, -90, -91, -91, -90, -89, -86, -83, -79, -73, -68, -63, -55, -48, -40, -32, -24, -15, -6, 4, 13, 22, 29, 39, 46, 54, 61, 66, 72, 78, 82, 85, 88, 90, 91,}
{64, 90, 87, 82, 75, 66, 58, 46, 34, 22, 7, -6, -19, -32, -44, -55, -65, -73, -81, -86, -90, -91, -90, -88, -83, -77, -68, -59, -48, -36, -24, -10, 4, 17, 29, 42, 54, 64, 72, 80, 85, 90, 91, 90, 88, 84, 78, 70, 61, 50, 39, 25, 13, 4, 45, -28, -40, -51, -63, -70, -79, -85, -89, -91,}
{64, 90, 84, 75, 64, 50, 34, 17, -1, -19, -36, -51, -65, -77, -85, -90, -91, -89, -83, -73, -63, -48, -32, -15, 4, 22, 39, 54, 66, 78, 85, 90, 91, 88, 82, 72, 61, 46, 29, 13, -6, -24, -40, -55, -68, -79, -86, -90, -91, -88, -81, -70, -59, -44, -28, -10, 7, 25, 42, 58, 70, 80, 87, 90,}
{64, 88, 80, 66, 50, 29, 7, -15, -36, -55, -70, -83, -90, -91, -86, -77, -63, -44, -24, -1, 22, 42, 61, 75, 85, 90, 90, 84, 72, 58, 39, 17, -6, -28, -48, -65, -79, -88, -91, -89, -81, -68, -51, -32, -10, 13, 34, 54, 70, 82, 90, 91, 87, 78, 64, 46, 25, 4, -19, -40, -59, -73, -85, -90,}

{64, 87, 75, 58, 34, 7, -19, -44, -65, -81, -90, -90, -83, -68, -48, -24, 4, 29, 54, 72, 85, 91, 88, 78, 61, 39, 13, -15, -40, -63, -79, -89, -91, -85, -70, -51, -28, -1, 25, 50, 70, 84, 90, 90, 80, 64, 42, 17, -10, -36, -59, -77, -88, -91, -86, -73, -55, -32, -6, 22, 46, 66, 82, 90,}
{64, 85, 70, 46, 17, -15, -44, -68, -85, -91, -86, -70, -48, -19, 13, 42, 66, 84, 91, 87, 72, 50, 22, -10, -40, -65, -83, -91, -88, -73, -51, -24, 7, 39, 64, 82, 90, 88, 75, 54, 25, -6, -36, -63, -81, -90, -89, -77, -55, -28, 4, 34, 61, 80, 90, 90, 78, 58, 29, -1, -32, -59, -79, -90,}
{64, 84, 64, 34, -1, -36, -65, -85, -91, -83, -63, -32, 4, 39, 66, 85, 91, 82, 61, 29, -6, -40, -68, -86, -91, -81, -59, -28, 7, 42, 70, 87, 90, 80, 58, 25, -10, -44, -70, -88, -90, -79, -55, -24, 13, 46, 72, 88, 90, 78, 54, 22, -15, -48, -73, -89, -90, -77, -51, -19, 17, 50, 75, 90,}
{64, 82, 58, 22, -19, -55, -81, -91, -83, -59, -24, 17, 54, 80, 91, 84, 61, 25, -15, -51, -79, -91, -85, -63, -28, 13, 50, 78, 90, 85, 64, 29, -10, -48, -77, -90, -86, -65, -32, 7, 46, 75, 90, 87, 66, 34, -6, -44, -73, -90, -88, -68, -36, 4, 42, 72, 90, 88, 70, 39, -1, -40, -70, -89,}
{64, 80, 50, 7, -36, -70, -90, -86, -63, -24, 22, 61, 85, 90, 72, 39, -6, -48, -79, -91, -81, -51, -10, 34, 70, 90, 87, 64, 25, -19, -59, -85, -90, -73, -40, 4, 46, 78, 91, 82, 54, 13, -32, -68, -89, -88, -65, -28, 17, 58, 84, 90, 75, 42, -1, -44, -77, -91, -83, -55, -15, 29, 66, 88,}
{64, 78, 42, -6, -51, -83, -90, -70, -32, 17, 61, 87, 88, 64, 22, -28, -68, -90, -85, -55, -10, 39, 75, 91, 80, 46, -1, -48, -81, -91, -73, -36, 13, 58, 85, 90, 66, 25, -24, -65, -89, -86, -59, -15, 34, 72, 90, 82, 50, 4, -44, -79, -91, -77, -40, 7, 54, 84, 90, 70, 29, -19, -63, -88,}
{64, 75, 34, -19, -65, -90, -83, -48, 4, 54, 85, 88, 61, 13, -40, -79, -91, -70, -28, 25, 70, 90, 80, 42, -10, -59, -88, -86, -55, -6, 46, 82, 90, 66, 22, -32, -73, -91, -77, -36, 17, 64, 90, 84, 50, -1, -51, -85, -89, -63, -15, 39, 78, 91, 72, 29, -24, -68, -90, -81, -44, 7, 58, 87,}
{64, 72, 25, -32, -77, -91, -68, -19, 39, 80, 90, 64, 13, -44, -83, -89, -59, -6, 50, 85, 87, 54, -1, -55, -88, -85, -48, 7, 61, 90, 82, 42, -15, -65, -90, -79, -36, 22, 70, 91, 75, 29, -28, -73, -91, -70, -24, 34, 78, 90, 66, 17, -40, -81, -90, -63, -10, 46, 84, 88, 58, 4, -51, -86,}
{64, 70, 17, -44, -85, -86, -48, 13, 66, 91, 72, 22, -40, -83, -88, -51, 7, 64, 90, 75, 25, -36, -81, -89, -55, 4, 61, 90, 78, 29, -32, -79, -90, -59, -1, 58, 90, 80, 34, -28, -77, -90, -63, -6, 54, 88, 82, 39, -24, -73, -91, -65, -10, 50, 87, 84, 42, -19, -70, -91, -68, -15, 46, 85,}
{64, 66, 7, -55, -90, -77, -24, 42, 85, 84, 39, -28, -79, -89, -51, 13, 70, 91, 64, 4, -59, -90, -73, -19, 46, 87, 82, 34, -32, -81, -88, -48, 17, 72, 90, 61, -1, -63, -91, -70, -15, 50, 88, 80, 29, -36, -83, -86, -44, 22, 75, 90, 58, -6, -65, -91, -68, -10, 54, 90, 78, 25, -40, -85,}
{64, 64, -1, -65, -91, -63, 4, 66, 91, 61, -6, -68, -91, -59, 7, 70, 90, 58, -10, -70, -90, -55, 13, 72, 90, 54, -15, -73, -90, -51, 17, 75, 90, 50, -19, -77, -89, -48, 22, 78, 88, 46, -24, -79, -88, -44, 25, 80, 87, 42, -28, -81, -86, -40, 29, 82, 85, 39, -32, -83, -85, -36, 34, 84,}
{64, 61, -10, -73, -89, -44, 29, 84, 82, 25, -48, -90, -70, -6, 64, 91, 58, -15, -77, -88, -40, 34, 85, 80, 22, -51, -90, -68, -1, 66, 90, 54, -19, -79, -86, -36, 39, 87, 78, 17, -55, -91, -65, 4, 70, 90, 50, -24, -81, -85, -32, 42, 88, 75, 13, -59, -91, -63, 7, 72, 90, 46, -28, -83,}
{64, 58, -19, -81, -83, -24, 54, 91, 61, -15, -79, -85, -28, 50, 90, 64, -10, -77, -86, -32, 46, 90, 66, -6, -73, -88, -36, 42, 90, 70, -1, -70, -89, -40, 39, 88, 72, 4, -68, -90, -44, 34, 87, 75, 7, -65, -90, -48, 29, 85, 78, 13, -63, -91, -51, 25, 84, 80, 17, -59, -91, -55, 22, 82,}
{64, 54, -28, -86, -73, -1, 72, 87, 29, -51, -91, -55, 25, 85, 75, 4, -70, -88, -32, 50, 91, 58, -24, -85, -77, -6, 70, 88, 34,

-48, -91, -59, 22, 84, 78, 7, -68, -89, -36, 46, 90, 61, -19, -83, -79, -10, 66, 90, 39, -44, -90, -63, 17, 82, 80, 13, -65, -90, -40, 42, 90, 64, -15, -81,}
{64, 50, -36, -90, -63, 22, 85, 72, -6, -79, -81, -10, 70, 87, 25, -59, -90, -40, 46, 91, 54, -32, -89, -65, 17, 84, 75, -1, -77, -83, -15, 66, 88, 29, -55, -91, -44, 42, 90, 58, -28, -88, -68, 13, 82, 78, 4, -73, -85, -19, 64, 90, 34, -51, -91, -48, 39, 90, 61, -24, -86, -70, 7, 80,}
{64, 46, -44, -91, -48, 42, 91, 50, -40, -91, -51, 39, 90, 54, -36, -90, -55, 34, 90, 58, -32, -90, -59, 29, 90, 61, -28, -89, -63, 25, 88, 64, -24, -88, -65, 22, 87, 66, -19, -86, -68, 17, 85, 70, -15, -85, -70, 13, 84, 72, -10, -83, -73, 7, 82, 75, -6, -81, -77, 4, 80, 78, -1, -79,}
{64, 42, -51, -90, -32, 61, 88, 22, -68, -85, -10, 75, 80, -1, -81, -73, 13, 85, 66, -24, -89, -59, 34, 90, 50, -44, -91, -40, 54, 90, 29, -63, -88, -19, 70, 84, 7, -77, -79, 4, 82, 72, -15, -86, -65, 25, 90, 58, -36, -91, -48, 46, 91, 39, -55, -90, -28, 64, 87, 17, -70, -83, -6, 78,}
{64, 39, -59, -88, -15, 75, 78, -10, -86, -63, 34, 91, 42, -55, -89, -19, 72, 80, -6, -85, -65, 29, 90, 46, -51, -90, -24, 70, 82, -1, -83, -68, 25, 90, 50, -48, -90, -28, 66, 84, 4, -81, -70, 22, 90, 54, -44, -91, -32, 64, 85, 7, -79, -73, 17, 88, 58, -40, -91, -36, 61, 87, 13, -77,}
{64, 34, -65, -83, 4, 85, 61, -40, -91, -28, 70, 80, -10, -88, -55, 46, 90, 22, -73, -77, 17, 90, 50, -51, -89, -15, 78, 72, -24, -90, -44, 58, 87, 7, -81, -68, 29, 91, 39, -63, -85, -1, 84, 64, -36, -91, -32, 66, 82, -6, -86, -59, 42, 90, 25, -70, -79, 13, 88, 54, -48, -90, -19, 75,}
{64, 29, -70, -77, 22, 90, 39, -65, -81, 13, 90, 46, -59, -85, 4, 87, 54, -51, -88, -6, 84, 61, -44, -90, -15, 80, 66, -36, -91, -24, 75, 72, -28, -91, -32, 70, 78, -19, -90, -40, 64, 82, -10, -89, -48, 58, 85, -1, -86, -55, 50, 88, 7, -83, -63, 42, 90, 17, -79, -68, 34, 91, 25, -73,}
{64, 25, -77, -68, 39, 90, 13, -83, -59, 50, 87, -1, -88, -48, 61, 82, -15, -90, -36, 70, 75, -28, -91, -24, 78, 66, -40, -90, -10, 84, 58, -51, -86, 4, 88, 46, -63, -81, 17, 90, 34, -70, -73, 29, 91, 22, -79, -65, 42, 90, 7, -85, -55, 54, 85, -6, -89, -44, 64, 80, -19, -91, -32, 72,}
{64, 22, -81, -59, 54, 84, -15, -91, -28, 78, 64, -48, -86, 7, 90, 34, -73, -68, 42, 88, -1, -89, -40, 70, 72, -36, -90, -6, 87, 46, -65, -77, 29, 90, 13, -85, -51, 61, 80, -24, -91, -19, 82, 58, -55, -83, 17, 91, 25, -79, -63, 50, 85, -10, -90, -32, 75, 66, -44, -88, 4, 90, 39, -70,}
{64, 17, -85, -48, 66, 72, -40, -88, 7, 90, 25, -81, -55, 61, 78, -32, -90, -1, 90, 34, -77, -63, 54, 82, -24, -91, -10, 87, 42, -70, -68, 46, 85, -15, -91, -19, 84, 50, -65, -73, 39, 88, -6, -90, -28, 80, 58, -59, -79, 29, 90, 4, -89, -36, 75, 64, -51, -83, 22, 91, 13, -86, -44, 70,}
{64, 13, -88, -36, 78, 58, -63, -73, 42, 85, -19, -91, -6, 90, 29, -81, -51, 66, 70, -48, -83, 25, 90, -1, -90, -24, 84, 46, -70, -65, 54, 80, -32, -89, 7, 91, 17, -86, -40, 75, 61, -59, -77, 39, 87, -15, -91, -10, 88, 34, -79, -55, 64, 72, -44, -85, 22, 90, 4, -90, -28, 82, 50, -68,}
{64, 7, -90, -24, 85, 39, -79, -51, 70, 64, -59, -73, 46, 82, -32, -88, 17, 90, -1, -91, -15, 88, 29, -83, -44, 75, 58, -65, -68, 54, 78, -40, -85, 25, 90, -10, -91, -6, 90, 22, -86, -36, 80, 50, -70, -63, 61, 72, -48, -81, 34, 87, -19, -90, 4, 91, 13, -89, -28, 84, 42, -77, -55, 66,}
{64, 4, -91, -10, 90, 17, -89, -24, 87, 29, -85, -36, 82, 42, -79, -48, 75, 54, -70, -59, 66, 64, -63, -68, 58, 72, -51, -77, 46, 80, -40, -83, 34, 85, -28, -88, 22, 90, -15, -90, 7, 91, -1, -91, -6, 90, 13, -90, -19, 88, 25, -86, -32, 84, 39, -81, -44, 78, 50, -73, -55, 70, 61, -65,}
{64, -1, -91, 4, 91, -6, -91, 7, 90, -10, -90, 13, 90, -15, -90, 17, 90, -19, -89, 22, 88, -24, -88, 25, 87, -28, -86, 29, 85, -32,

-85, 34, 84, -36, -83, 39, 82, -40, -81, 42, 80, -44, -79, 46, 78, -48, -77, 50, 75, -51, -73, 54, 72, -55, -70, 58, 70, -59, -68, 61, 66, -63, -65, 64,}
{64, -6, -90, 17, 88, -28, -85, 39, 80, -48, -73, 58, 66, -65, -59, 72, 50, -79, -40, 84, 29, -88, -19, 90, 7, -91, 4, 90, -15, -89, 25, 85, -36, -81, 46, 75, -55, -68, 64, 61, -70, -51, 78, 42, -83, -32, 87, 22, -90, -10, 91, -1, -91, 13, 90, -24, -86, 34, 82, -44, -77, 54, 70, -63,}
{64, -10, -89, 29, 82, -48, -70, 64, 58, -77, -40, 85, 22, -90, -1, 90, -19, -86, 39, 78, -55, -65, 70, 50, -81, -32, 88, 13, -91, 7, 90, -28, -83, 46, 72, -63, -59, 75, 42, -85, -24, 90, 4, -91, 17, 87, -36, -79, 54, 66, -68, -51, 80, 34, -88, -15, 91, -6, -90, 25, 84, -44, -73, 61,}
{64, -15, -86, 42, 72, -65, -51, 82, 25, -90, 4, 90, -32, -79, 58, 61, -77, -36, 88, 7, -91, 22, 84, -48, -68, 70, 46, -85, -19, 91, -10, -88, 39, 75, -63, -55, 80, 29, -90, -1, 90, -28, -81, 54, 64, -73, -40, 87, 13, -91, 17, 85, -44, -70, 66, 50, -83, -24, 90, -6, -89, 34, 78, -59,}
{64, -19, -83, 54, 61, -79, -28, 90, -10, -86, 46, 66, -73, -36, 90, -1, -89, 39, 72, -68, -44, 87, 7, -90, 29, 78, -63, -51, 84, 17, -91, 22, 82, -55, -59, 80, 25, -91, 13, 85, -48, -65, 75, 34, -90, 4, 88, -40, -70, 70, 42, -88, -6, 90, -32, -77, 64, 50, -85, -15, 91, -24, -81, 58,}
{64, -24, -79, 64, 46, -88, -1, 88, -44, -65, 78, 25, -91, 22, 80, -63, -48, 87, 4, -89, 42, 66, -77, -28, 91, -19, -81, 61, 50, -86, -6, 90, -40, -68, 75, 29, -91, 17, 82, -59, -51, 85, 7, -90, 39, 70, -73, -32, 90, -15, -83, 58, 54, -85, -10, 90, -36, -70, 72, 34, -90, 13, 84, -55,}
{64, -28, -73, 72, 29, -91, 25, 75, -70, -32, 91, -24, -77, 70, 34, -91, 22, 78, -68, -36, 90, -19, -79, 66, 39, -90, 17, 80, -65, -40, 90, -15, -81, 64, 42, -90, 13, 82, -63, -44, 90, -10, -83, 61, 46, -89, 7, 84, -59, -48, 88, -6, -85, 58, 50, -88, 4, 85, -55, -51, 87, -1, -86, 54,}
{64, -32, -68, 80, 13, -89, 50, 54, -88, 7, 82, -65, -36, 91, -28, -70, 78, 17, -90, 46, 58, -86, 4, 84, -63, -40, 90, -24, -73, 75, 22, -90, 42, 61, -85, -1, 85, -59, -44, 90, -19, -77, 72, 25, -91, 39, 64, -83, -6, 87, -55, -48, 90, -15, -79, 70, 29, -91, 34, 66, -81, -10, 88, -51,}
{64, -36, -63, 85, -6, -81, 70, 25, -90, 46, 54, -89, 17, 75, -77, -15, 88, -55, -44, 90, -28, -68, 82, 4, -85, 64, 34, -91, 39, 61, -86, 7, 80, -70, -24, 90, -48, -51, 90, -19, -73, 78, 13, -88, 58, 42, -91, 29, 66, -83, -1, 84, -65, -32, 91, -40, -59, 87, -10, -79, 72, 22, -90, 50,}
{64, -40, -55, 90, -24, -68, 84, -6, -79, 75, 13, -86, 64, 29, -90, 50, 46, -91, 34, 61, -88, 17, 72, -81, -1, 82, -70, -19, 88, -59, -36, 91, -44, -51, 90, -28, -65, 85, -10, -77, 78, 7, -85, 66, 25, -90, 54, 42, -91, 39, 58, -89, 22, 70, -83, 4, 80, -73, -15, 87, -63, -32, 90, -48,}
{64, -44, -48, 91, -40, -51, 90, -36, -55, 90, -32, -59, 90, -28, -63, 88, -24, -65, 87, -19, -68, 85, -15, -70, 84, -10, -73, 82, -6, -77, 80, -1, -79, 78, 4, -81, 75, 7, -83, 72, 13, -85, 70, 17, -86, 66, 22, -88, 64, 25, -89, 61, 29, -90, 58, 34, -90, 54, 39, -91, 50, 42, -91, 46,}
{64, -48, -40, 90, -55, -32, 90, -63, -24, 87, -68, -15, 84, -73, -6, 80, -79, 4, 75, -83, 13, 70, -86, 22, 64, -89, 29, 58, -90, 39, 50, -91, 46, 42, -91, 54, 34, -90, 61, 25, -88, 66, 17, -85, 72, 7, -81, 78, -1, -77, 82, -10, -70, 85, -19, -65, 88, -28, -59, 90, -36, -51, 91, -44,}
{64, -51, -32, 88, -68, -10, 80, -81, 13, 66, -89, 34, 50, -91, 54, 29, -88, 70, 7, -79, 82, -15, -65, 90, -36, -48, 91, -55, -28, 87, -70, -6, 78, -83, 17, 64, -90, 39, 46, -91, 58, 25, -86, 72, 4, -77, 84, -19, -63, 90, -40, -44, 90, -59, -24, 85, -73, -1, 75, -85, 22, 61, -90, 42,}
{64, -55, -24, 84, -79, 13, 64, -90, 46, 34, -88, 72, -1, -70, 88, -36, -44, 90, -65, -10, 78, -85, 25, 54, -91, 58, 22, -83,

80, -15, -63, 90, -48, -32, 87, -73, 4, 70, -89, 39, 42, -90, 66, 7, -77, 85, -28, -51, 91, -59, -19, 82, -81, 17, 61, -91, 50, 29, -86, 75, -6, -68, 90, -40,}
{64, -59, -15, 78, -86, 34, 42, -89, 72, -6, -65, 90, -51, -24, 82, -83, 25, 50, -90, 66, 4, -70, 90, -44, -32, 85, -79, 17, 58, -91, 61, 13, -77, 87, -36, -40, 88, -73, 7, 64, -91, 54, 22, -81, 84, -28, -48, 90, -68, -1, 70, -90, 46, 29, -85, 80, -19, -55, 91, -63, -10, 75, -88, 39,}
{64, -63, -6, 70, -90, 54, 17, -77, 88, -44, -28, 82, -85, 34, 39, -86, 80, -24, -48, 90, -73, 13, 58, -91, 66, -1, -65, 91, -59, -10, 72, -90, 50, 22, -79, 87, -40, -32, 84, -83, 29, 42, -88, 78, -19, -51, 90, -70, 7, 61, -91, 64, 4, -68, 90, -55, -15, 75, -89, 46, 25, -81, 85, -36,}
{64, -65, 4, 61, -91, 70, -10, -55, 90, -73, 17, 50, -89, 78, -24, -44, 87, -81, 29, 39, -85, 84, -36, -32, 82, -86, 42, 25, -79, 88, -48, -19, 75, -90, 54, 13, -70, 90, -59, -6, 66, -91, 64, -1, -63, 91, -68, 7, 58, -90, 72, -15, -51, 90, -77, 22, 46, -88, 80, -28, -40, 85, -83, 34,}
{64, -68, 13, 50, -88, 82, -36, -28, 78, -90, 58, 4, -63, 90, -73, 22, 42, -85, 85, -44, -19, 72, -91, 64, -6, -55, 90, -79, 29, 34, -81, 88, -51, -10, 66, -91, 70, -15, -48, 87, -83, 39, 25, -77, 90, -59, -1, 61, -90, 75, -24, -40, 84, -86, 46, 17, -70, 91, -65, 7, 54, -89, 80, -32,}
{64, -70, 22, 39, -81, 90, -59, 4, 54, -88, 84, -44, -15, 66, -91, 75, -28, -32, 78, -90, 64, -10, -48, 85, -86, 50, 7, -63, 90, -79, 34, 25, -73, 91, -68, 17, 42, -83, 88, -55, -1, 58, -89, 82, -40, -19, 70, -91, 72, -24, -36, 80, -90, 61, -6, -51, 87, -85, 46, 13, -65, 90, -77, 29,}
{64, -73, 29, 25, -70, 91, -77, 34, 22, -68, 90, -79, 39, 17, -65, 90, -81, 42, 13, -63, 90, -83, 46, 7, -59, 88, -85, 50, 4, -55, 87, -86, 54, -1, -51, 85, -88, 58, -6, -48, 84, -89, 61, -10, -44, 82, -90, 64, -15, -40, 80, -90, 66, -19, -36, 78, -91, 70, -24, -32, 75, -91, 72, -28,}
{64, -77, 39, 13, -59, 87, -88, 61, -15, -36, 75, -91, 78, -40, -10, 58, -86, 88, -63, 17, 34, -73, 91, -79, 42, 7, -55, 85, -89, 64, -19, -32, 72, -91, 80, -44, -6, 54, -85, 90, -65, 22, 29, -70, 90, -81, 46, 4, -51, 84, -90, 66, -24, -28, 70, -90, 82, -48, -1, 50, -83, 90, -68, 25,}
{64, -79, 46, -1, -44, 78, -91, 80, -48, 4, 42, -77, 91, -81, 50, -6, -40, 75, -91, 82, -51, 7, 39, -73, 90, -83, 54, -10, -36, 72, -90, 84, -55, 13, 34, -70, 90, -85, 58, -15, -32, 70, -90, 85, -59, 17, 29, -68, 90, -86, 61, -19, -28, 66, -89, 87, -63, 22, 25, -65, 88, -88, 64, -24,}
{64, -81, 54, -15, -28, 64, -86, 90, -73, 42, -1, -40, 72, -90, 87, -65, 29, 13, -51, 80, -91, 82, -55, 17, 25, -63, 85, -90, 75, -44, 4, 39, -70, 90, -88, 66, -32, -10, 50, -79, 91, -83, 58, -19, -24, 61, -85, 90, -77, 46, -6, -36, 70, -89, 88, -68, 34, 7, -48, 78, -91, 84, -59, 22,}
{64, -83, 61, -28, -10, 46, -73, 90, -89, 72, -44, 7, 29, -63, 84, -91, 82, -59, 25, 13, -48, 75, -90, 88, -70, 42, -6, -32, 64, -85, 91, -81, 58, -24, -15, 50, -77, 90, -88, 70, -40, 4, 34, -65, 85, -91, 80, -55, 22, 17, -51, 78, -90, 87, -68, 39, -1, -36, 66, -86, 90, -79, 54, -19,}
{64, -85, 66, -40, 7, 25, -55, 78, -90, 90, -77, 54, -24, -10, 42, -68, 85, -91, 84, -65, 39, -6, -28, 58, -79, 90, -89, 75, -51, 22, 13, -44, 70, -86, 91, -83, 64, -36, 4, 29, -59, 80, -90, 88, -73, 50, -19, -15, 46, -70, 87, -91, 82, -63, 34, -1, -32, 61, -81, 90, -88, 72, -48, 17,}
{64, -86, 72, -51, 25, 4, -32, 58, -77, 88, -91, 84, -68, 46, -19, -10, 39, -63, 80, -90, 90, -81, 64, -40, 13, 17, -44, 66, -83, 90, -89, 78, -59, 34, -6, -24, 50, -70, 85, -91, 87, -73, 54, -28, -1, 29, -55, 75, -88, 91, -85, 70, -48, 22, 7, -36, 61, -79, 90, -90, 82, -65, 42, -15,}
{64, -88, 78, -63, 42, -19, -6, 29, -51, 70, -83, 90, -90, 84, -70, 54, -32, 7, 17, -40, 61, -77, 87, -91, 88, -79, 64, -44, 22,

4, -28, 50, -68, 82, -90, 90, -85, 72, -55, 34, -10, -15, 39, -59, 75, -86, 91, -89, 80, -65, 46, -24, -1, 25, -48, 66, -81, 90, -91, 85, -73, 58, -36, 13,}
{64, -89, 82, -70, 58, -40, 22, -1, -19, 39, -55, 70, -81, 88, -91, 90, -83, 72, -59, 42, -24, 4, 17, -36, 54, -68, 80, -88, 91, -90, 84, -73, 61, -44, 25, -6, -15, 34, -51, 66, -79, 87, -91, 90, -85, 75, -63, 46, -28, 7, 13, -32, 50, -65, 78, -86, 90, -90, 85, -77, 64, -48, 29, -10,}
{64, -90, 85, -79, 70, -59, 46, -32, 17, -1, -15, 29, -44, 58, -68, 78, -85, 90, -91, 90, -86, 80, -70, 61, -48, 34, -19, 4, 13, -28, 42, -55, 66, -77, 84, -89, 91, -90, 87, -81, 72, -63, 50, -36, 22, -6, -10, 25, -40, 54, -65, 75, -83, 88, -91, 90, -88, 82, -73, 64, -51, 39, -24, 7,}
{64, -90, 88, -85, 80, -73, 66, -59, 50, -40, 29, -19, 7, 4, -15, 25, -36, 46, -55, 64, -70, 78, -83, 87, -90, 91, -91, 90, -86, 82, -77, 70, -63, 54, -44, 34, -24, 13, -1, -10, 22, -32, 42, -51, 61, -68, 75, -81, 85, -89, 90, -91, 90, -88, 84, -79, 72, -65, 58, -48, 39, -28, 17, -6,}
{64, -91, 90, -89, 87, -85, 82, -79, 75, -70, 66, -63, 58, -51, 46, -40, 34, -28, 22, -15, 7, -1, -6, 13, -19, 25, -32, 39, -44, 50, -55, 61, -65, 70, -73, 78, -81, 84, -86, 88, -90, 90, -91, 91, -90, 90, -88, 85, -83, 80, -77, 72, -68, 64, -59, 54, -48, 42, -36, 29, -24, 17, -10, 4,}
{64, -91, 91, -91, 90, -90, 90, -90, 90, -89, 88, -88, 87, -86, 85, -85, 84, -83, 82, -81, 80, -79, 78, -77, 75, -73, 72, -70, 70, -68, 66, -65, 64, -63, 61, -59, 58, -55, 54, -51, 50, -48, 46, -44, 42, -40, 39, -36, 34, -32, 29, -28, 25, -24, 22, -19, 17, -15, 13, -10, 7, -6, 4, -1,}.

The techniques for encoding/decoding can be implemented by one or more processors that may execute computer software having computer-readable instructions that may be physically stored in one or more computer-readable media (e.g., a hard disk drive). For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
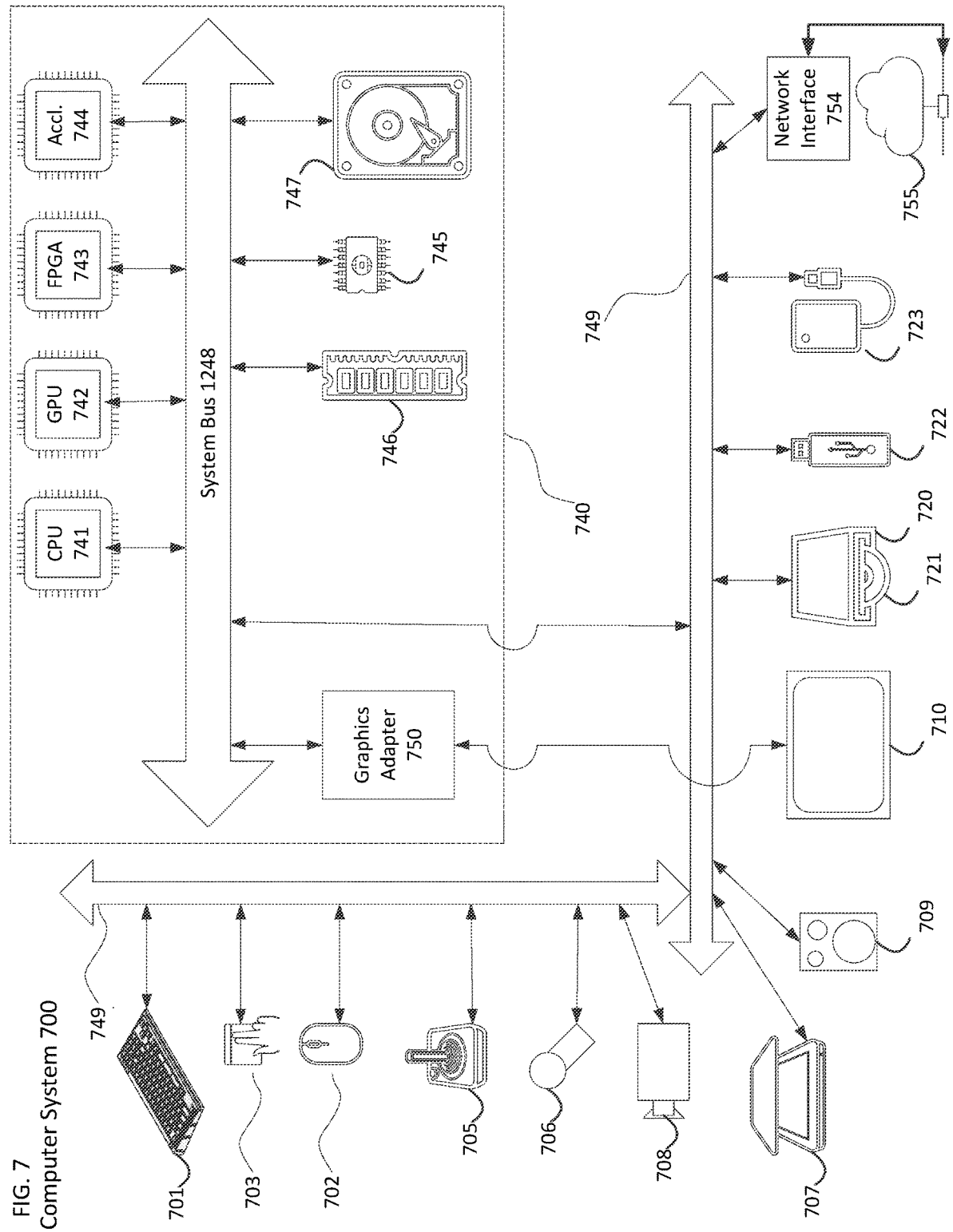
FIG. 7 is a schematic illustration of a computer system in accordance with an embodiment.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove 704, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove 704, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" or "computer readable medium" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of decoding or encoding, the method comprising:
receiving information regarding a target file for encoding or decoding, the target file for encoding or decoding being one of: a compressed video or image data file or an uncompressed video or image data file;
determining, for the encoding or decoding of the target file, whether to use a first transform core matrix that is of a first size type or a second transform core matrix that is of a second size type that is smaller than the first size type, wherein the first size type is the 8-bit primary transform core matrix, which has the core matrix that is represented by 8-bits and that has a size that is 64-point or larger;
when a result of the determination is to use the first transform core matrix of the first size type, causing or transmitting information that causes the target file for encoding or decoding to be encoded or decoded using the 8-bit primary transform core matrix that has the first size type that is 64-point or larger; and
when a result of the determination is to use the second transform core matrix of the second size type that is smaller than the first size type: extracting the second transform core matrix of the second size type from the 8-bit primary transform core matrix that is 64-point or larger and causing or transmitting information that causes the target file for encoding or decoding to be encoded or decoded using the extracted second transform core matrix of the second type, wherein when the first transform core matrix is a 64-point, 8-bit primary transform core matrix, which is constructed using thirty-three integers which are used to construct a 32-point, 8-bit primary transform core matrix and an additional thirty-two integers that include: bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj and ck plus their respective sign changes, and the additional thirty-two integers {bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck} are equal to {91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2}.

2. The method of claim 1, wherein the first primary transform core matrix is a Versatile Video Coding (VVC) standard transform.

3. The method of claim 1, wherein the second primary transform core matrix is one of DCT-8, DST-1 or DCT-5.

4. The method according to claim 1, wherein when deriving the N-point 8-bit DCT-8 primary transform core matrix or the N-point 8-bit DST-7 transform core matrix, the set of M unique numbers which are used to construct the N-point DCT-8 core matrix is the same set of M unique numbers which construct the N-point DST-7 core matrix.

5. The method according to claim 4, wherein M equals to N.

6. The method according to claim 1, wherein a left half or a right half of even or odd rows of the 8-bit primary transform core matrix form a matrix which is similar to the second transform core matrix.

7. The method according to claim 6, wherein
the 8-bit primary transform core matrix is one of: DCT-2, DCT-5, DCT-8, DST-1 and DST-7, and
the second transform core matrix is one of: DCT-2, DCT-5, DCT-8, DST-1 and DST-7.

8. The method according to claim 7, wherein the 8-bit primary transform core matrix and the second transform core matrix are the same one of: DCT-2, DCT-5, DCT-8, DST-1 and DST-7.

9. The method according to claim 8, wherein the 8-bit primary transform core matrix is an 8-bit, 64-point DCT-2 transform matrix and the second transform core matrix is an 8-bit, 32-point DCT-2 transform matrix.

10. The method according to claim 1, wherein the 8-bit, N-point primary transform core matrix, which is composed by M unique numbers, is derived by the following steps:
deriving an initial transform core matrix T1 by scaling an original transform core which is composed by floating-point numbers T0 using a scaling factor $2B-2\times\log 2(N)$ such that $T1=T0\times 2^{B-2}\times\log_2(N)$, where B=8, and the row vectors of T0, which are basis vectors, are orthogonal to each other, and the norm of each row vector is 1;
deriving an adjusted transform core matrix T2 by adding offsets on a selected set of the M unique numbers which are used to construct the adjusted primary transform core matrix T2;
calculating a cost value C as the sum of absolute values of all elements of $(T1*T1^T-2^{2B-4}\times\log_2(N)^2\times I)$, where I is an N×N identity matrix; and
updating the adjusted transform matrix T2 by adding the calculated offset values to T2, which minimizes the cost value to T2, which is output as the 8-bit, N-point primary transform core matrix.

11. The method according to claim 10, further comprising: after minimizing the cost value C by trying all possible combinations of offset values on a selected set of M unique numbers, T2 is output as the 8-bit, N-point primary transform core matrix.

12. An apparatus for utilizing an 8-bit primary transform core matrix to decode compressed video or image data or encode uncompressed video or image data, the apparatus comprising:
at least one memory configured to store computer program code; and
at least one processor configured to access the at least one memory and operate according to the computer program code, the computer program code comprising:
first applying code configured to cause the at least one processor to receive information regarding a target file for encoding or decoding, the target file for encoding or decoding being one of: a compressed video or image data file or an uncompressed video or image data file;
second applying code configured to cause the at least one processor to determine, for the encoding or decoding of the target file, whether to use a first transform core matrix that is of a first size type or a second transform core matrix that is of a second size type that is smaller than the first size type, wherein the first size type is the 8-bit primary transform core matrix, which has the core matrix that is represented by 8-bits and that has a size that is 64-point or larger;
third applying code configured to cause the at least one processor to when a result of the determination is to use the first transform core matrix of the first size type, cause or transmit information that causes the target file for encoding or decoding to be encoded or decoded using the 8-bit primary transform core matrix that has the size that is 64-point or larger; and fourth applying code configured to cause the at least one processor to when a result of the determination is to use the second transform core matrix of the second size type that is smaller than the first size type: extract the second transform core matrix of the second size type from the 8-bit primary transform core matrix that is 64-point or larger and cause or transmit information that causes the target file for encoding or decoding to be encoded or decoded using the extracted second transform core matrix of the second type, wherein when a result of the determination is to use the second transform core matrix of the second size type that is smaller than the first size type: extracting the second transform core matrix of the second size type from the 8-bit primary transform core matrix that is 64-point or larger and causing or transmitting information that causes the target file for encoding or decoding to be encoded or decoded using the extracted second transform core matrix of the second type, and wherein when the first transform core matrix is a 64-point, 8-bit primary transform core matrix, which is constructed using thirty-three integers which are used to construct a 32-point, 8-bit primary transform core matrix and an additional thirty-two integers that include: bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj and ck plus their respective sign changes, and the additional thirty-two integers {bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck} are equal to {91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2}.

13. The apparatus according to claim 12, wherein the first primary transform core matrix is a Versatile Video Coding (VVC) standard transform.

14. The apparatus according to claim 12, wherein the second primary transform core matrix is one of DCT-8, DST-1 or DCT-5.

15. The apparatus according to claim 12, wherein when deriving the N-point 8-bit DCT-8 primary transform core matrix or the N-point 8-bit DST-7 transform core matrix, the set of M unique numbers which are used to construct the N-point DCT-8 core matrix is the same set of M unique numbers which construct the N-point DST-7 core matrix.

16. The apparatus according to claim 15, wherein M equals to N.

17. The apparatus according to claim 12, wherein a left half or a right half of even or odd rows of the 8-bit primary transform core matrix form a matrix which is similar to the second transform core matrix.

18. The method according to claim 17, wherein
the 8-bit primary transform core matrix is one of: DCT-2, DCT-5, DCT-8, DST-1 and DST-7, and
the second transform core matrix is one of: DCT-2, DCT-5, DCT-8, DST-1 and DST-7.

19. The method according to claim 18, wherein the 8-bit primary transform core matrix and the second transform core matrix are the same one of: DCT-2, DCT-5, DCT-8, DST-1 and DST-7.

20. A non-transitory computer-readable storage medium storing instructions that cause one or more processors to:
receive information regarding a target file for encoding or decoding, the target file for encoding or decoding being one of: a compressed video or image data file or an uncompressed video or image data file;
determine, for the encoding or decoding of the target file, whether to use a first transform core matrix that is of a first size type or a second transform core matrix that is of a second size type that is smaller than the first size type, wherein the first size type is the 8-bit primary transform core matrix, which has the core matrix that is represented by 8-bits and that has a size that is 64-point or larger;
when a result of the determination is to use the first transform core matrix of the first size type, cause or transmit information that causes the target file for encoding or decoding to be encoded or decoded using the 8-bit primary transform core matrix that has the size that is 64-point or larger; and
when a result of the determination is to use the second transform core matrix of the second size type that is smaller than the first size type: extract the second transform core matrix of the second size type from the 8-bit primary transform core matrix that is 64-point or larger and cause or transmit information that causes the target file for encoding or decoded using the extracted second transform core matrix of the second type,
wherein when a result of the determination is to use the second transform core matrix of the second size type that is smaller than the first size type: extracting the second transform core matrix of the second size type from the 8-bit primary transform core matrix that is 64-point or larger and causing or transmitting information that causes the target file for encoding or decoding to be encoded or decoded using the extracted second transform core matrix of the second type, and
wherein when the first transform core matrix is a 64-point, 8-bit primary transform core matrix, which is constructed using thirty-three integers which are used to construct a 32-point, 8-bit primary transform core matrix and an additional thirty-two integers that include: bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj and ck plus their respective sign changes, and the additional thirty-two integers {bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck} are equal to {91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2}.

* * * * *